(12) United States Patent
Nix

(10) Patent No.: US 11,916,893 B2
(45) Date of Patent: Feb. 27, 2024

(54) EMBEDDED UNIVERSAL INTEGRATED CIRCUIT CARD SUPPORTING TWO-FACTOR AUTHENTICATION

(71) Applicant: Network-1 Technologies, Inc., New York, NY (US)

(72) Inventor: John A. Nix, Evanston, IL (US)

(73) Assignee: Network-1 Technologies, Inc., New York, NY (US)

( * ) Notice: Subject to any disclaimer, the term of this patent is extended or adjusted under 35 U.S.C. 154(b) by 0 days.

(21) Appl. No.: 17/547,990

(22) Filed: Dec. 10, 2021

(65) Prior Publication Data

US 2022/0103538 A1 Mar. 31, 2022

Related U.S. Application Data

(63) Continuation of application No. 16/453,682, filed on Jun. 26, 2019, now Pat. No. 11,233,780, which is a (Continued)

(51) Int. Cl.
*H04L 29/06* (2006.01)
*H04L 9/40* (2022.01)
(Continued)

(52) U.S. Cl.
CPC ........... *H04L 63/08* (2013.01); *H04B 1/3816* (2013.01); *H04L 9/0819* (2013.01);
(Continued)

(58) Field of Classification Search
CPC .. H04W 12/35; H04W 12/06; H04L 63/0853; H04L 63/08
See application file for complete search history.

(56) References Cited

U.S. PATENT DOCUMENTS 5,216,715 A 6/1993 Markwitz
5,642,420 A 6/1997 Kuroda et al.
(Continued)

FOREIGN PATENT DOCUMENTS

AU 2019246774 10/2019
CA 2775853 A1 12/2012
(Continued)

OTHER PUBLICATIONS

ANSI X9.63 Overview, Key Agreement and Key Transport Using Elliptic Curve Cryptography, Simon Blake-Wilson, Certicom (2000).
(Continued)

*Primary Examiner* — Dao Q Ho
(74) *Attorney, Agent, or Firm* — Amster, Rothstein & Ebenstein LLP

(57) ABSTRACT

A module with an embedded universal integrated circuit card (eUICC) can include a profile for the eUICC. The profile can include a first and second shared secret key K for authenticating with a wireless network. The first shared secret key K can be encrypted with a first key, and the second shared secret key K can be encrypted with a second key. The module can (i) receive the first key, (ii) decrypt the first shared secret key K with the first key, and (iii) subsequently authenticate with the wireless network using the plaintext first shared secret key K. The wireless network can authenticate the user of the module using a second factor. The module can then (i) receive the second key, (ii) decrypt the second shared secret key K, and (iii) authenticate with the wireless network using the second shared secret key K. The module can comprise a mobile phone.

17 Claims, 12 Drawing Sheets

Related U.S. Application Data continuation of application No. 16/110,804, filed on Aug. 23, 2018, now Pat. No. 10,382,422, which is a continuation of application No. 15/928,848, filed on Mar. 22, 2018, now Pat. No. 10,084,768, which is a continuation of application No. 14/751,119, filed on Jun. 25, 2015, now Pat. No. 9,961,060, which is a continuation of application No. 14/099,329, filed on Dec. 6, 2013, now Pat. No. 9,100,175.

(51) Int. Cl.
| | |
|---|---|
| *H04L 9/08* | (2006.01) |
| *H04L 9/32* | (2006.01) |
| *H04W 4/70* | (2018.01) |
| *H04W 12/30* | (2021.01) |
| *H04W 12/06* | (2021.01) |
| *H04B 1/3816* | (2015.01) |

(52) U.S. Cl.
CPC .......... *H04L 9/0869* (2013.01); *H04L 9/3271* (2013.01); *H04L 63/0428* (2013.01); *H04L 63/0435* (2013.01); *H04L 63/06* (2013.01); *H04L 63/062* (2013.01); *H04L 63/101* (2013.01); *H04W 4/70* (2018.02); *H04W 12/06* (2013.01); *H04W 12/35* (2021.01)

(56) References Cited

U.S. PATENT DOCUMENTS

| | | |
|---|---|---|
| 5,664,017 A | 9/1997 | Gressel et al. |
| 5,852,665 A | 12/1998 | Gressel et al. |
| 5,995,625 A | 11/1999 | Sudia et al. |
| 6,038,322 A | 3/2000 | Harkins |
| 6,256,733 B1 | 7/2001 | Thakkar et al. |
| 6,721,886 B1 | 4/2004 | Uskela |
| 6,804,357 B1 | 10/2004 | Ikonen et al. |
| 6,842,628 B1 | 1/2005 | Arnold et al. |
| 7,921,292 B1 | 4/2011 | Pauker et al. |
| 7,957,532 B2 | 6/2011 | Chen et al. |
| 8,127,142 B2 | 2/2012 | Cuppett |
| 8,352,739 B2 | 1/2013 | Park et al. |
| 8,434,139 B1 | 4/2013 | Ortiz, Jr. |
| 8,452,017 B2 | 5/2013 | Sherkin |
| 8,522,013 B2 | 8/2013 | Zhang et al. |
| 8,526,606 B2 | 9/2013 | Muthaiah |
| 8,555,067 B2 | 10/2013 | Schell et al. |
| 8,577,337 B2 | 11/2013 | O'Leary |
| 8,590,028 B2 | 11/2013 | Saxena et al. |
| 8,782,774 B1 | 7/2014 | Pahl et al. |
| 8,843,179 B2 | 9/2014 | Li et al. |
| 8,924,715 B2 | 12/2014 | Schell et al. |
| 8,948,386 B2 | 2/2015 | Campagna et al. |
| 8,965,366 B1 | 2/2015 | Somayajula et al. |
| 9,002,018 B2 | 4/2015 | Wilkins et al. |
| 9,020,479 B1 | 4/2015 | Somayajula et al. |
| 9,253,643 B2 | 2/2016 | Pattar et al. |
| 9,270,653 B2 | 2/2016 | Maria |
| 9,332,129 B2 | 5/2016 | Li et al. |
| 9,408,012 B2 | 8/2016 | Li et al. |
| 9,572,016 B2 | 2/2017 | Cormier et al. |
| 9,596,078 B2 | 3/2017 | Nix |
| 9,628,981 B2 | 4/2017 | Park et al. |
| 9,674,690 B2 | 6/2017 | Lee et al. |
| 9,698,981 B2 | 7/2017 | Nix |
| 9,794,775 B2 | 10/2017 | Huber et al. |
| 9,800,993 B2 | 10/2017 | Lee et al. |
| 9,807,605 B2 | 10/2017 | Gao et al. |
| 9,923,724 B2 | 3/2018 | Lee et al. |
| 10,169,587 B1 | 1/2019 | Nix |
| 10,621,352 B2 | 4/2020 | Nix |
| 2001/0029581 A1 | 10/2001 | Knauft |
| 2002/0018569 A1 | 2/2002 | Panjwani et al. |
| 2003/0003895 A1 | 1/2003 | Wallentin et al. |
| 2003/0211842 A1 | 11/2003 | Kempf et al. |
| 2004/0162472 A1 | 8/2004 | Berson et al. |
| 2004/0179684 A1 | 9/2004 | Appenzeller et al. |
| 2004/0221163 A1 | 11/2004 | Jorgensen et al. |
| 2005/0008159 A1 | 1/2005 | Grilli et al. |
| 2005/0021875 A1 | 1/2005 | Bouthemy et al. |
| 2005/0050323 A1 | 3/2005 | Mizrah |
| 2005/0058294 A1 | 3/2005 | Chen et al. |
| 2005/0120202 A1 | 6/2005 | Cuellar et al. |
| 2005/0138353 A1 | 6/2005 | Spies et al. |
| 2005/0193199 A1 | 9/2005 | Asokan et al. |
| 2005/0246282 A1 | 11/2005 | Naslund et al. |
| 2005/0278787 A1 | 12/2005 | Naslund et al. |
| 2006/0021063 A1 | 1/2006 | Hori |
| 2006/0056355 A1 | 3/2006 | Love et al. |
| 2006/0059344 A1 | 3/2006 | Mononen |
| 2006/0095771 A1 | 5/2006 | Appenzeller et al. |
| 2006/0129848 A1 | 6/2006 | Paksoy et al. |
| 2006/0206710 A1 | 9/2006 | Gehrmann |
| 2006/0281442 A1 | 12/2006 | Lee et al. |
| 2007/0101400 A1 | 5/2007 | Freeman et al. |
| 2007/0158439 A1 | 7/2007 | Conner et al. |
| 2007/0206799 A1 | 9/2007 | Wingert et al. |
| 2008/0016230 A1 | 1/2008 | Holtmanns et al. |
| 2008/0022089 A1 | 1/2008 | Leedom |
| 2008/0031204 A1 | 2/2008 | Sood |
| 2008/0044032 A1 | 2/2008 | Lou et al. |
| 2008/0107083 A1 | 5/2008 | Shirota et al. |
| 2008/0114978 A1 | 5/2008 | Lehtovirta et al. |
| 2008/0130879 A1 | 6/2008 | Heinonen et al. |
| 2008/0165698 A1 | 7/2008 | Dalsgaard et al. |
| 2008/0307218 A1 | 12/2008 | Logvinov |
| 2009/0028341 A1 | 1/2009 | Hamachi |
| 2009/0041110 A1 | 2/2009 | Malladi |
| 2009/0060197 A1 | 3/2009 | Taylor et al. |
| 2009/0077643 A1 | 3/2009 | Schmidt et al. |
| 2009/0113203 A1 | 4/2009 | Tsuge et al. |
| 2009/0116642 A1 | 5/2009 | Yang et al. |
| 2009/0125996 A1 | 5/2009 | Guccione et al. |
| 2009/0132806 A1 | 5/2009 | Blommaert et al. |
| 2009/0183541 A1 | 7/2009 | Sadighi et al. |
| 2009/0191857 A1 | 7/2009 | Horn et al. |
| 2009/0209232 A1 | 8/2009 | Cha et al. |
| 2009/0217348 A1 | 8/2009 | Salmela et al. |
| 2009/0268909 A1 | 10/2009 | Girao et al. |
| 2009/0274306 A1 | 11/2009 | Nolte |
| 2009/0282246 A1 | 11/2009 | Gunther |
| 2009/0313472 A1 | 12/2009 | Guccione et al. |
| 2010/0031042 A1 | 2/2010 | Di Crescenzo et al. |
| 2010/0062808 A1 | 3/2010 | Cha et al. |
| 2010/0093347 A1 | 4/2010 | Hahn et al. |
| 2010/0098253 A1 | 4/2010 | Delerablee |
| 2010/0166167 A1 | 7/2010 | Karimi-Cherkandi et al. |
| 2010/0195833 A1 | 8/2010 | Priestley et al. |
| 2010/0199334 A1 | 8/2010 | Ehrensvard et al. |
| 2010/0223461 A1 | 9/2010 | Drader et al. |
| 2010/0275028 A1 | 10/2010 | Takashima |
| 2011/0016321 A1 | 1/2011 | Sundaram et al. |
| 2011/0035584 A1 | 2/2011 | Meyerstein et al. |
| 2011/0035604 A1 | 2/2011 | Habraken |
| 2011/0055553 A1 | 3/2011 | Lee et al. |
| 2011/0158411 A1 | 6/2011 | Medvinsky et al. |
| 2011/0167272 A1 | 7/2011 | Kolesnikov |
| 2011/0213959 A1 | 9/2011 | Bodi et al. |
| 2011/0237281 A1 | 9/2011 | Busropan et al. |
| 2011/0268022 A1 | 11/2011 | Xu |
| 2011/0269422 A1 | 11/2011 | Xu et al. |
| 2011/0269461 A1 | 11/2011 | Xu et al. |
| 2011/0269472 A1 | 11/2011 | Xu et al. |
| 2011/0270747 A1 | 11/2011 | Xu |
| 2011/0291803 A1 | 12/2011 | Bajic et al. |
| 2011/0314287 A1 | 12/2011 | Escott et al. |
| 2012/0011360 A1 | 1/2012 | Engels et al. |
| 2012/0011362 A1* | 1/2012 | Lambert ............... H04L 9/0844 713/168 |
| 2012/0023336 A1 | 1/2012 | Natarajan |
| 2012/0030461 A1 | 2/2012 | Willey et al. |
| 2012/0033613 A1 | 2/2012 | Lin et al. |
| 2012/0072732 A1 | 3/2012 | Canard et al. |

(56) References Cited

U.S. PATENT DOCUMENTS

| | | | |
|---|---|---|---|
| 2012/0087493 A1* | 4/2012 | Chidambaram | H04L 9/0841 |
| | | | 713/182 |
| 2012/0089568 A1 | 4/2012 | Manley et al. | |
| 2012/0108205 A1 | 5/2012 | Schell et al. | |
| 2012/0117635 A1 | 5/2012 | Schell et al. | |
| 2012/0159153 A1 | 6/2012 | Shim et al. | |
| 2012/0170451 A1 | 7/2012 | Viswanathan et al. | |
| 2012/0190354 A1 | 7/2012 | Merrien et al. | |
| 2012/0084568 A1 | 8/2012 | Sarikaya et al. | |
| 2012/0214444 A1 | 8/2012 | McBride et al. | |
| 2012/0260086 A1 | 10/2012 | Haggerty et al. | |
| 2012/0260090 A1 | 10/2012 | Hauck et al. | |
| 2012/0260095 A1 | 10/2012 | Von Hauck et al. | |
| 2012/0263298 A1 | 10/2012 | Suh et al. | |
| 2012/0278490 A1 | 11/2012 | Sennett et al. | |
| 2012/0300932 A1 | 11/2012 | Cambridge et al. | |
| 2012/0331292 A1 | 12/2012 | Haggerty et al. | |
| 2012/0331298 A1 | 12/2012 | Xu et al. | |
| 2013/0007442 A1 | 1/2013 | Mao et al. | |
| 2013/0012168 A1 | 1/2013 | Rajadurai et al. | |
| 2013/0028184 A1 | 1/2013 | Lee et al. | |
| 2013/0091556 A1 | 4/2013 | Horn et al. | |
| 2013/0114810 A1 | 5/2013 | Kobayashi et al. | |
| 2013/0117824 A1 | 5/2013 | Naslund et al. | |
| 2013/0122864 A1 | 5/2013 | Haggerty et al. | |
| 2013/0149996 A1 | 6/2013 | King et al. | |
| 2013/0157673 A1 | 6/2013 | Brusilovsky | |
| 2013/0165073 A1 | 6/2013 | Madsen | |
| 2013/0165075 A1 | 6/2013 | Rishy-Maharaj et al. | |
| 2013/0166915 A1 | 6/2013 | desai et al. | |
| 2013/0173747 A1 | 7/2013 | Kim et al. | |
| 2013/0173926 A1 | 7/2013 | Morese et al. | |
| 2013/0179962 A1 | 7/2013 | Arial et al. | |
| 2013/0182586 A1 | 7/2013 | Paladugu et al. | |
| 2013/0183932 A1 | 7/2013 | Emilainen et al. | |
| 2013/0212637 A1 | 8/2013 | Guccione et al. | |
| 2013/0227646 A1 | 8/2013 | Haggerty et al. | |
| 2013/0231087 A1 | 9/2013 | O'Leary | |
| 2013/0283047 A1 | 10/2013 | Merrien et al. | |
| 2013/0294602 A1 | 11/2013 | Huxham et al. | |
| 2013/0305345 A1 | 11/2013 | Bugenhagen | |
| 2013/0322621 A1 | 12/2013 | Yoon et al. | |
| 2013/0331063 A1 | 12/2013 | Cormier et al. | |
| 2013/0340040 A1 | 12/2013 | Park et al. | |
| 2013/0344864 A1 | 12/2013 | Park et al. | |
| 2014/0003604 A1 | 1/2014 | Campagna et al. | |
| 2014/0040628 A1 | 2/2014 | Fort et al. | |
| 2014/0049653 A1 | 2/2014 | Leonard et al. | |
| 2014/0053241 A1 | 2/2014 | Norman et al. | |
| 2014/0073375 A1 | 3/2014 | Li et al. | |
| 2014/0082358 A1 | 3/2014 | Nakhjiri et al. | |
| 2014/0082359 A1 | 3/2014 | Nakhjiri et al. | |
| 2014/0082538 A1 | 3/2014 | Nakhjiri et al. | |
| 2014/0082539 A1 | 3/2014 | Nakhjiri et al. | |
| 2014/0087790 A1 | 3/2014 | Babbage et al. | |
| 2014/0101444 A1 | 4/2014 | Lee et al. | |
| 2014/0108801 A1 | 4/2014 | McBride et al. | |
| 2014/0115335 A1 | 4/2014 | Jorden et al. | |
| 2014/0120874 A1 | 5/2014 | Kang et al. | |
| 2014/0122878 A1 | 5/2014 | Cho et al. | |
| 2014/0140507 A1 | 5/2014 | Park et al. | |
| 2014/0140509 A1 | 5/2014 | Chastain et al. | |
| 2014/0143534 A1 | 5/2014 | Chastain et al. | |
| 2014/0143826 A1 | 5/2014 | Sharp et al. | |
| 2014/0161113 A1 | 6/2014 | Cui et al. | |
| 2014/0165155 A1 | 6/2014 | Zhang | |
| 2014/0192976 A1 | 7/2014 | Yoon et al. | |
| 2014/0219447 A1 | 8/2014 | Park et al. | |
| 2014/0219448 A1 | 8/2014 | Froels et al. | |
| 2014/0235210 A1 | 8/2014 | Park et al. | |
| 2014/0237101 A1* | 8/2014 | Park | H04W 8/205 |
| | | | 709/223 |
| 2014/0244994 A1 | 8/2014 | Yu | |
| 2014/0273913 A1 | 9/2014 | Michel et al. | |
| 2014/0281483 A1 | 9/2014 | Vigliaturo et al. | |
| 2014/0287725 A1 | 9/2014 | Lee | |
| 2014/0308991 A1 | 10/2014 | Lee et al. | |
| 2014/0329502 A1 | 11/2014 | Lee et al. | |
| 2014/0337937 A1 | 11/2014 | Truskovsky et al. | |
| 2014/0351403 A1 | 11/2014 | Lein et al. | |
| 2014/0357229 A1 | 12/2014 | Lee et al. | |
| 2015/0012743 A1 | 1/2015 | Holtmanns et al. | |
| 2015/0017910 A1 | 1/2015 | Li et al. | |
| 2015/0071139 A1 | 3/2015 | Nix | |
| 2015/0087269 A1* | 3/2015 | Lee | H04W 8/20 |
| | | | 455/411 |
| 2015/0089214 A1 | 3/2015 | Dupre | |
| 2015/0092590 A1 | 4/2015 | Zhu et al. | |
| 2015/0095514 A1 | 4/2015 | Yu | |
| 2015/0095648 A1 | 4/2015 | Nix | |
| 2015/0106616 A1 | 4/2015 | Nix | |
| 2015/0113275 A1 | 4/2015 | Kim et al. | |
| 2015/0121066 A1 | 4/2015 | Nix | |
| 2015/0121495 A1 | 4/2015 | Gao et al. | |
| 2015/0143125 A1 | 5/2015 | Nix | |
| 2015/0163056 A1 | 6/2015 | Nix | |
| 2015/0215126 A1 | 7/2015 | Ashdown | |
| 2015/0222604 A1 | 8/2015 | Ylonen | |
| 2015/0222619 A1 | 8/2015 | Hughes et al. | |
| 2015/0281964 A1 | 10/2015 | Seo et al. | |
| 2015/0350881 A1 | 12/2015 | Weiss et al. | |
| 2016/0014112 A1 | 1/2016 | Gunning et al. | |
| 2016/0057725 A1 | 2/2016 | Suh | |
| 2016/0088096 A1 | 3/2016 | Quiriconi et al. | |
| 2016/0127132 A1 | 5/2016 | Lee et al. | |
| 2016/0149903 A1 | 5/2016 | Suh | |
| 2016/0294829 A1 | 10/2016 | Angus | |
| 2017/0206532 A1 | 7/2017 | Choi | |
| 2019/0313246 A1 | 10/2019 | Nix | |
| 2019/0332774 A1 | 10/2019 | Nix | |
| 2019/0356482 A1 | 11/2019 | Nix | |
| 2020/0162247 A1 | 5/2020 | Nix | |
| 2020/0162269 A1 | 5/2020 | Nix | |
| 2020/0226258 A1 | 7/2020 | Nix | |
| 2020/0280436 A1 | 9/2020 | Nix | |
| 2021/0126801 A1 | 4/2021 | Nix | |
| 2021/0184842 A1 | 6/2021 | Nix | |
| 2021/0194681 A1 | 6/2021 | Nix | |
| 2021/0211279 A1 | 7/2021 | Nix | |
| 2021/0218560 A1 | 7/2021 | Nix | |

FOREIGN PATENT DOCUMENTS

| | | |
|---|---|---|
| CA | 2965119 | 10/2014 |
| CA | 2969829 | 12/2014 |
| CA | 3110641 A1 | 10/2019 |
| CA | 3110468 A1 | 11/2019 |
| DE | 19803936 A1 | 8/1999 |
| EA | 14868381.6 | 12/2014 |
| EP | 1981 224 | 10/2008 |
| EP | 3766222 A1 | 1/2021 |
| GB | 1608573 | 10/2014 |
| GB | 2100530 | 10/2014 |
| GB | 2518976 A | 4/2015 |
| HK | 17101082.8 | 10/2014 |
| HK | 17106540.3 | 12/2014 |
| KR | 10-2013-0026352 A | 3/2013 |
| KR | 10-2013-0026958 A | 3/2013 |
| KR | 20130026351 A | 3/2013 |
| WO | 2011138238 A1 | 11/2011 |
| WO | 2013027085 A1 | 2/2013 |
| WO | 2013/048084 A2 | 4/2013 |
| WO | 2013066077 A1 | 5/2013 |
| WO | 2019178312 A1 | 9/2019 |
| WO | 2019209598 A1 | 10/2019 |
| WO | 2019222319 A1 | 11/2019 |
| WO | 2019246206 A1 | 12/2019 |
| WO | 2020006162 A1 | 1/2020 |
| WO | 2020061023 A1 | 3/2020 |
| WO | 2020123959 A1 | 6/2020 |
| WO | 2020223319 A1 | 11/2020 |

(56) References Cited

FOREIGN PATENT DOCUMENTS

| WO | 2021007235 A1 | 1/2021 |
|---|---|---|
| WO | 2021087221 A1 | 5/2021 |

OTHER PUBLICATIONS

U.S. Appl. No. 17/647,812, filed Jan. 13, 2022, Application Undergoing Preexam Processing.
U.S. Appl. No. 17/304,922, filed Jun. 28, 2021, Ready for Examination.
U.S. Appl. No. 17/249,242, filed Feb. 24, 2021, Pending—Ready for Examination.
U.S. Appl. No. 16/879,325, filed May 20, 2020, U.S. Pat. No. 11,082,218.
U.S. Appl. No. 16/843,107, filed Apr. 8, 2020, Allowed—Notice of Allowance dated Nov. 8, 2021.
U.S. Appl. No. 16/721,153, filed Dec. 19, 2019, RCE Filed Aug. 28, 2021, Supplemental Response to Final Rejection filed Sep. 2, 2021.
U.S. Appl. No. 16/593,561, filed Oct. 4, 2019, Allowed—Notice of Allowance dated Oct. 14, 2021.
U.S. Appl. No. 16/453,682, filed Jun. 26, 2019, Allowed—Notice of Allowance dated Sep. 14, 2021 (USP to Issue Jan. 25, 2022).
U.S. Appl. No. 16/271,455, filed Feb. 8, 2019, U.S. Pat. No. 10,594,679.
U.S. Appl. No. 16/271,428, filed Feb. 8, 2019, U.S. Pat. No. 10,523,432.
U.S. Appl. No. 16/201,401, filed Nov. 27, 2018, U.S. Pat. No. 10,700,856.
U.S. Appl. No. 16/200,118, filed Nov. 26, 2018, U.S. Pat. No. 10,498,530.
U.S. Appl. No. 16/110,804, filed Aug. 23, 2018, U.S. Pat. No. 10,382,422.
U.S. Appl. No. 16/036,506, filed Jul. 16, 2018, U.S. Pat. No. 10,530,575.
U.S. Appl. No. 15/983,957, filed May 18, 2018, U.S. Pat. No. 10,177,911.
U.S. Appl. No. 15/973,012, filed May 7, 2018, U.S. Pat. No. 10,250,386.
U.S. Appl. No. 15/972,914, filed May 7, 2018, U.S. Pat. No. 10,652,017.
U.S. Appl. No. 15/928,848, filed Mar. 22, 2018, U.S. Pat. No. 10,084,768.
U.S. Appl. No. 15/010,905, filed Jan. 29, 2016, U.S. Pat. No. 9,641,327.
U.S. Appl. No. 15/680,758, filed Aug. 18, 2017, U.S. Pat. No. 10,187,206.
U.S. Appl. No. 15/162,292, filed May 23, 2016, U.S. Pat. No. 10,362,012.
U.S. Appl. No. 14/751,119, filed Jun. 25, 2015, US. Pat. No. 9,961,060.
U.S. Appl. No. 15/457,700, filed Mar. 13, 2017, U.S. Pat. No. 9,998,281.
U.S. Appl. No. 15/583,968, filed May 1, 2017, U.S. Pat. No. 10,057,059.
U.S. Appl. No. 15/043,293, filed Feb. 12, 2016, U.S. Pat. No. 9,998,280.
U.S. Appl. No. 15/642,088, filed Jul. 5, 2017, U.S. Pat. No. 10,003,461.
U.S. Appl. No. 15/130,146, filed Apr. 15, 2016, U.S. Pat. No. 9,742,562.
U.S. Appl. No. 15/162,302, filed May 23, 2016, U.S. Pat. No. 9,698,981.
U.S. Appl. No. 14/789,255, filed Jul. 1, 2015, U.S. Pat. No. 9,596,078.
U.S. Appl. No. 14/139,419, filed Dec. 23, 2013, U.S. Pat. No. 9,351,162.
U.S. Appl. No. 14/136,711, filed Dec. 20, 2013, U.S. Pat. No. 9,300,473.
U.S. Appl. No. 14/099,329, filed Dec. 6, 2013, U.S. Pat. No. 9,100,175.
U.S. Appl. No. 14/084,141, filed Nov. 19, 2013, U.S. Pat. No. 9,319,223.
U.S. Appl. No. 14/064,618, filed Oct. 28, 2013, U.S. Pat. No. 9,118,464.
U.S. Appl. No. 14/055,606, filed Oct. 16, 2013, U.S. Pat. No. 9,276,740.
U.S. Appl. No. 14/039,401, filed Sep. 27, 2013, U.S. Pat. No. 9,288,059.
U.S. Appl. No. 14/023,181, filed Sep. 10, 2013, U.S. Pat. No. 9,350,550.
Cakulev et al., "An EAP Authentication Method Based on Identity-Based Authenticated Key Exchange," Aug. 2012, pp. 1-32.
Gollmann, "Authentication—Myths and Misconceptions," Progress in Computer Science and Applied Logic, vol. 20, 2001, pp. 203-225.
Tin et al., "Provably Secure Mobile Key Exchange: Applying the Canetti-Krawczyk Approach," Information Security Research Centre, Queensland University of Technology, Australia, 2003, pp. 166-179.
Hegland et al., "A Framework for Authentication in NBD Tactical Ad Hoc Networks," IEEE Communications Magazine, Oct. 2011, pp. 64-71.
Nicholson et al., "Mobile Device Security Using Transient Authentication," IEEE Transactions on Mobile Computing, vol. 5, No. II, Nov. 2006, pp. 1489-1502.
Schwaiger et al., "Smart Card Security for Fieldbus Systems," 2003, pp. 398-406.
CSMG, Reprogrammable SIMs: Technology, Evolution and Implications, Sep. 25, 2012, pp. 1-95.
GlobalPlatform Inc., GlobalPlatform Card Specification, Version 2.2.1, Jan. 2011, pp. 1-303.
GlobalPlatform Inc., GlobalPlatform Card Security Upgrade for Card Content Management, Card Specification v 2.2.—Amendment E, Version 1.0, Nov. 2011, pp. 1-35.
GSM Association, Embedded SIM Task Force Requirements and Use Cases, Version 1.0, Feb. 21, 2011, pp. 1-38.
Kirk H.M. Wong et al., A Dynamic User Authentication Scheme for Wireless Sensor Networks, Proceedings of the IEEE International Conference on Sensor Networks, Ubiquitous, and Trustworthy Computing (SUTC'06), pp. 1-8.
Pierre E. Abi-Char, et al., A Fast and Secure Elliptic Curve Based Authenticated Key Agreement Protocol For Low Power Mobile Communications, The 2007 International Conference on Next Generation Mobile Applications, Services and Technologies (NGMAST 2007), pp. 1-6.
Jun Shao, et al., An Improved Deniable Authentication Protocol, Department of Computer Science and Engineering, Shanghai Jiao Tong University, Shanghai 200030, People's Republic of China, pp. 1-3.
Chris Foresman, Embedded SIM could cause carrier conflict for Apple, Nov. 19, 2010, pp. 1-2.
Embedded UICC Remote Provisioning Discussion, Source: Rogers Wireless, 3GPP/SA3-LI#46, Quebec City, Canada, Jul. 17-19, 2012, p. 1-39.
GSMA Launches Embedded SIM Initiative to Support the Connected Future, Nov. 18, 2010, p. 1-4.
Chang-Seop Park, On Certificate-Based Security Protocols for Wireless Mobile Communication Systems, Dankook University, IEEE Network Sep./Oct. 1997, pp. 50-55.
M. Prasad, et al., Secure Authentication Key Agreement Protocol for Long Term Evolution—Advanced, Research Scholar, Associate Professor, Department of Computer Science & Engineering, Pondicherry Engineering College, Puducherry, India, Elsevier, 2012, pp. 158-162.
Eun-Jun Yoon, et al., Secure Deniable Authentication Protocol Based on ElGamal Cryptography, 2008 International Conference on Information Security and Assurance, pp. 36-39.
Pietre-Cambacedes et al., Cryptographic key management for SCADA systems—issues and perspectives, 2008 International Conference on Information Security and Assurance, IEEE, pp. 156-161.

(56) References Cited

OTHER PUBLICATIONS

Bender et al., Evolution of SIM provisioning towards a flexible MCIM provisioning in M2M vertical industries, 16th International Conference on Intelligence in Next Generation Networks, IEEE, 2012, pp. 57-64.
Park et al., Secure Profile Provisioning Architecture for Embedded UICC, 2013 International Conference on Availability, Reliability and Security, IEEE, 2013, pp. 297-303.
Appenzeller et al., Identity-Based Encryption Architecture and Supporting Data Structures RFC 5408, 2009, pp. 1-30.
Baugher et al., Group Key Management Architecture, RFC Draft, 2001, pp. 1-20.
Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.
Boyen et al., Anonymous Hierarchical Identity-Based Encryption (Without Random Oracles), 2006.
Boyen et al., Identity-Based Cryptography Standard (IBCS) #1: Supersingular Curve Implementations of the BF and BBI Cryptosystems, RFC 5091, 2007, pp. 1-63.
Harney et al., Group Key Management Protocol (GKMP) Architecture, 1994, pp. 1-19.
Kiltz et al., CCA2 Secure IBE: Standard Model Efficiency through Authenticated Symmetric Encryption, 2008.
Krylov, What is Kerberos Authentication?, 2003, pp. 1-4.
Martin, Introduction to Identity-Based Encryption, ISBN-13 978-1-59693-238-8, 2008.
Merrian-Webster, Network, 2014.
Park et al., A New Practical Identity-Based Encryption System, 2003, pp. 1-27.
Park et al., Secure Profile Provisioning Architecture for Embedded UICC, 2013 IEEE, pp. 297-303.
Shih, Jie-Ren; Hu, Yongbo; Hsiao, Ming-Chun; Chen, Ming-Shing; Shen, Wen-Chng; Yang, Bo-Yin; Wu, An-Yeu; Cheng, Chen-Mou; "Securing M2M with Post-Quantum Public-Key Cryptography", IEEE Journal on Emerging and Selected Topics in Circuits and Systems, Mar. 7, 2013, pp. 106-116.
Voltage Security, The Identity-Based Encryption Advantage, 2015.
Yang et al., Identity-Based Key Agreement and Encryption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, 2006, pp. 1-42.
Search Report issued in UK Application No. GB2108534.5 dated Jul. 7, 2021.
TLS 1.3 Wish List Presentation, IETF 87 (Eric Rescorla), dated Aug. 1, 2013.
European Patent Office Communication with European Search Report and European Search Opinion issued in EP 21182424.8 dated Oct. 12, 2021.
European Patent Office Communication with European Search Report and European Search Opinion issued in EP 21182451.1 dated Oct. 12, 2021.
European Patent Office Communication with European Search Report and European Search Opinion issued in EP 21182432.1 dated Oct. 12, 2021.
International Search Report for PCT/US2014/068544 dated Feb. 13, 2015.
T. Pornin, Deterministic Usage of the Digital Signature Algorithm (DSA) and Elliptic Curve Digital Signature Algorithm ECDSA), Internet Engineering Task Force RFC 6979, Aug. 2013, pp. I-79.
GSMA, Fast Dormancy Best Practices Version 1.0, Jul. 27, 2011, TS.18, pp. 1-23.
N. Chu et al, Exalted: Expanding LTE for Devices, European Commission for Information Society and Media, Oct. 31, 2012, pp. 1-141.
J. Huang et al, A Close Examination of Performance and Power Characteristics of 4G LTE Networks, Mobisys' 12, Jun. 25-29, 2012, pp. 1-14.
F. Qian et al, TOP: Tail Optimization Protocol for Cellular Resource Allocation, 18th IEEE International Conference on Network Protocols (ICNP), 2010, Oct. 5-8, 2010, pp. 285-298.
ETSI, Machine-to-Machine communications (M2M), mia, dla, and mid interfaces, TS 102.921 v1.1.1, Feb. 2012, pp. 1-538.
C. Downey, Migrating Legacy M2M Systems to the Cloud, http://www.ecnmag.com/articles/2013/02/migrating-legacy-m2m-systems-cloud, Feb. 2013, pp. 1-2.
A. Wander et al, Energy Analysis of Public-Key Cryptography on Small Wireless Devices, Sun Microsystems Laboratories, pp. 1-16.
V. Martinez et al, A Survey of the Elliptic Curve Integrated Encryption Scheme, Journal of Computer Science and Engineering, vol. 2, Aug. 2010, pp. 7-13.
ETSI, UMTS;LTE; SIM/USIM Internal and External Interworking Aspects, TR 131900 v. 10.0.0, May 2011, pp. 1-41.
International Search Report and Written Opinion for PCT/US2014/062435 dated Feb. 6, 2015.
Wikipedia, RSA (algorithm), http://en.wikipedia.org/wiki/RSA_(algorithm), Sep. 9, 2013, pp. 1-12.
Wikipedia, Elliptic Curve Cryptography, http://en.wikipedia.org/wiki/Elliptic_curve_cryptography, Sep. 9, 2013, pp. 1-8.
L. Larzon, The Lightweight User Datagram Protocol (UDP-Lite), Internet Engineering Task Force RFC 3828, Jul. 2004, pp. 1-12.
Wikipedia, Digital Signature, http://en.wikipedia.orglwiki/Digital_signature, Sep. 9, 2013, pp. 1-10.
D. Cooper, Internet X.509 Public Key Infrastructure Certificate and Certificate Revocation List (CRL) Profile, Internet Engineering Task Force RFC 5280, pp. 1-133.
J. Jonsson et al, Public-Key Cryptography Standards (PKCS) #1: RSA Cryptography Specifications Version 2.1, Internet Engineering Task Force RFC 3447, Feb. 2003, pp. 1-72.
D. McGrew et al, Fundamental Elliptic Curve Cryptography Algorithms, Internet Engineering Task Force RFC 6090, Feb. 2011, pp. 1-34.
Wikipedia, Elliptic Curve Diffie-Hellman, http://en.wikipedia.org/wiki/Elliptic_curve_Diffie%E2%80%93Hellman, Sep. 24, 2013, pp. 1-2.
ETSI, Smart Cards; Embedded UICC; Requirements Specification, TS 103 383 v12.1.0, Jun. 2013, pp. 1-20.
3GPP, 3rd Generation Partnership Project; Technical Specification Group Services and System Aspects; 3GPP System Architecture Evolution (SAE); Security architecture, 3GPP TS 33.401 V12.9.0 (Sep. 2013) pp. 1-75.
3GPP, 3rd Generation Partnership Project; Technical Specification Group Core Network and Terminals; Non-Access-Stratum (NAS) protocol for Evolved Packet System (EPS); Stage 3, 3GPP TS 24.301 v12.2.0, Sep. 2013 pp. 1-6, 63-100.
ETSI, Smart Cards; UICC—Terminal Interfaces; Physical and Logical Characteristics, TS 102 221 v11.0.0, Jun. 2012, pp. 1-181.

\* cited by examiner

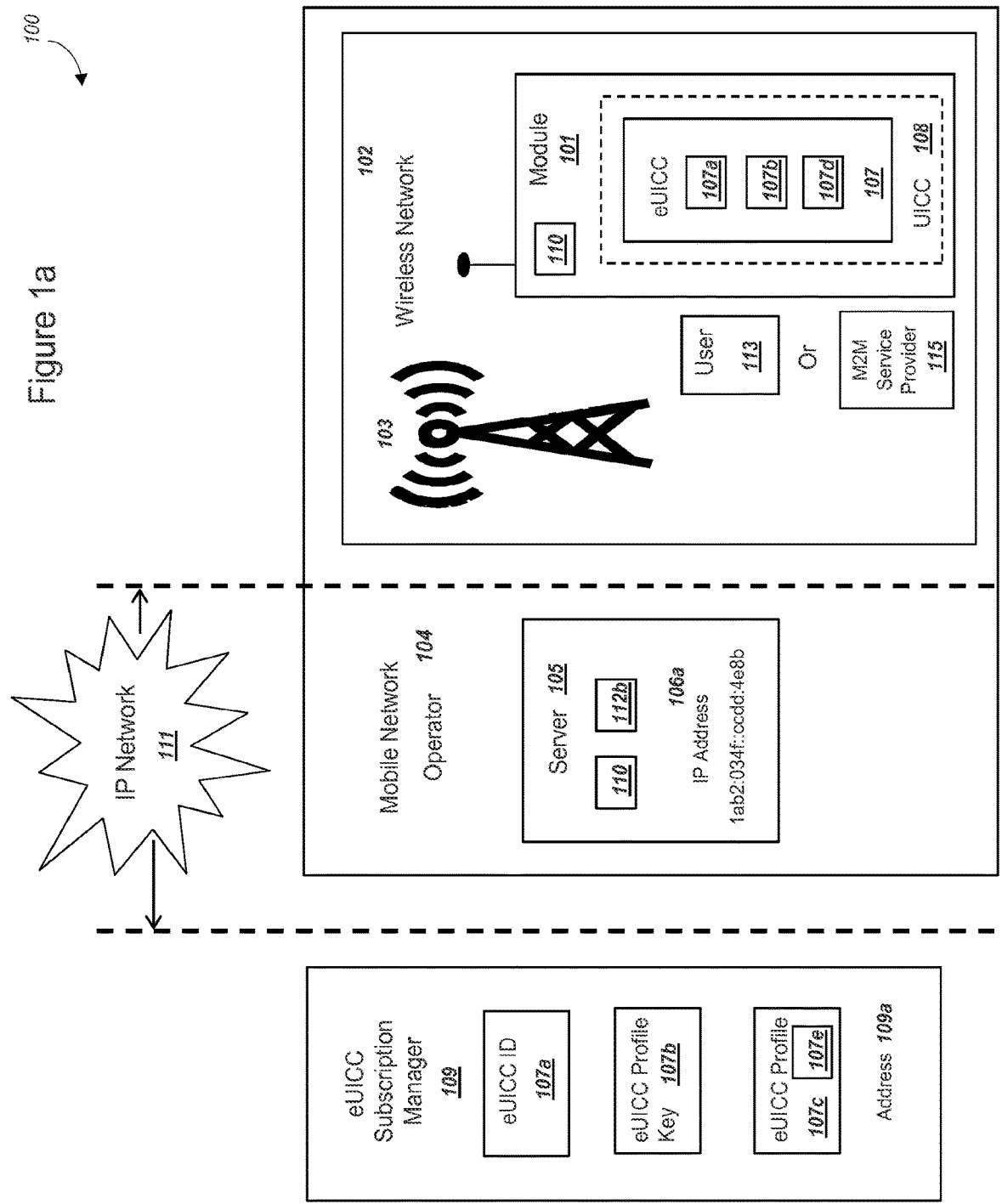

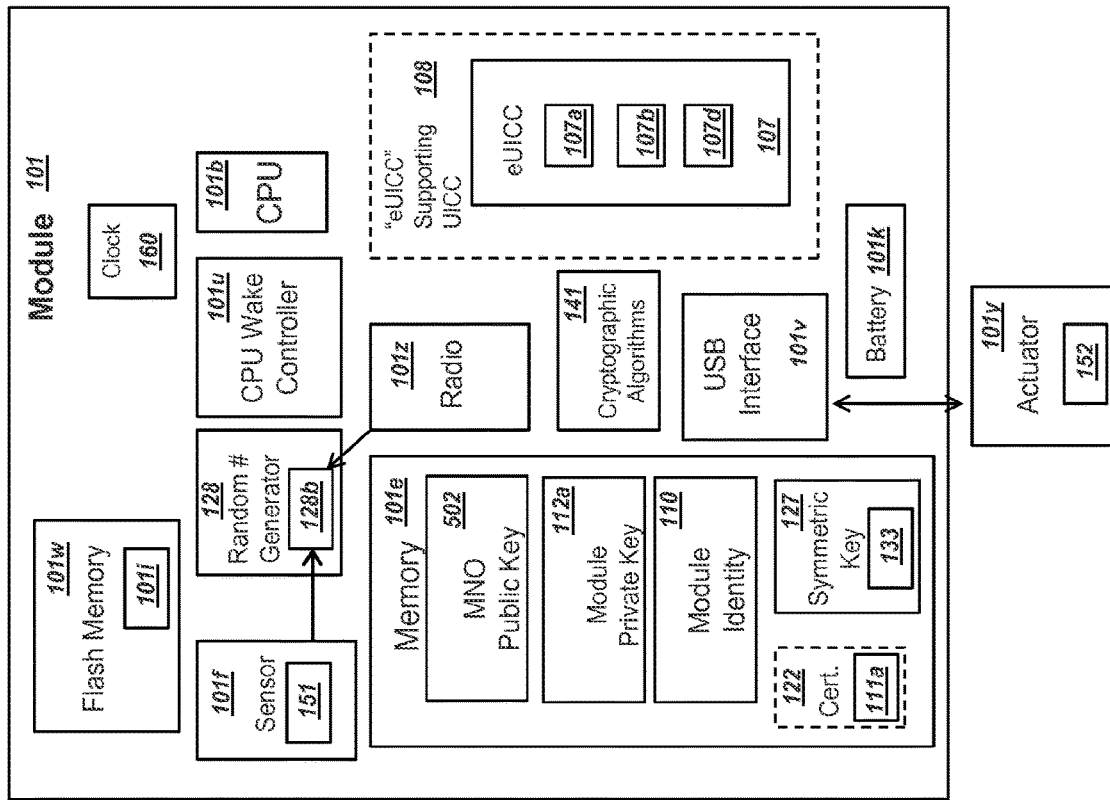
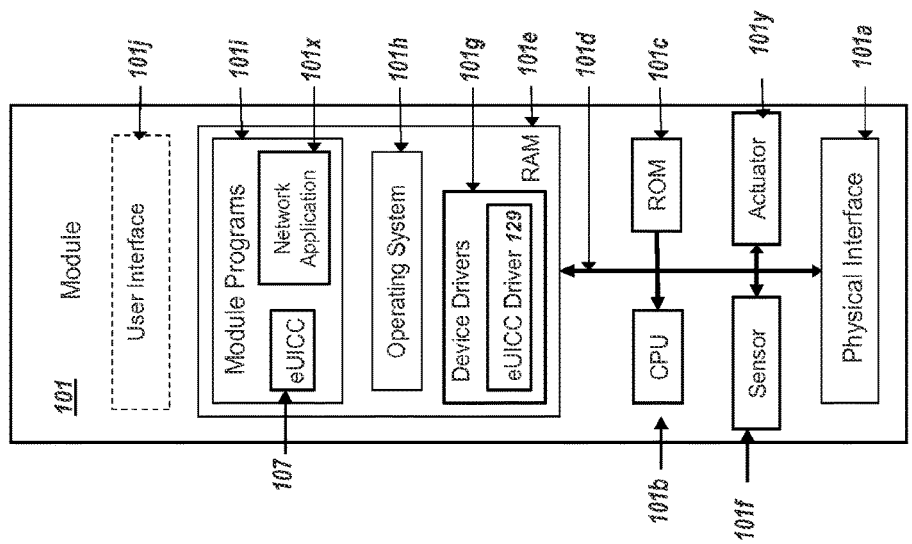

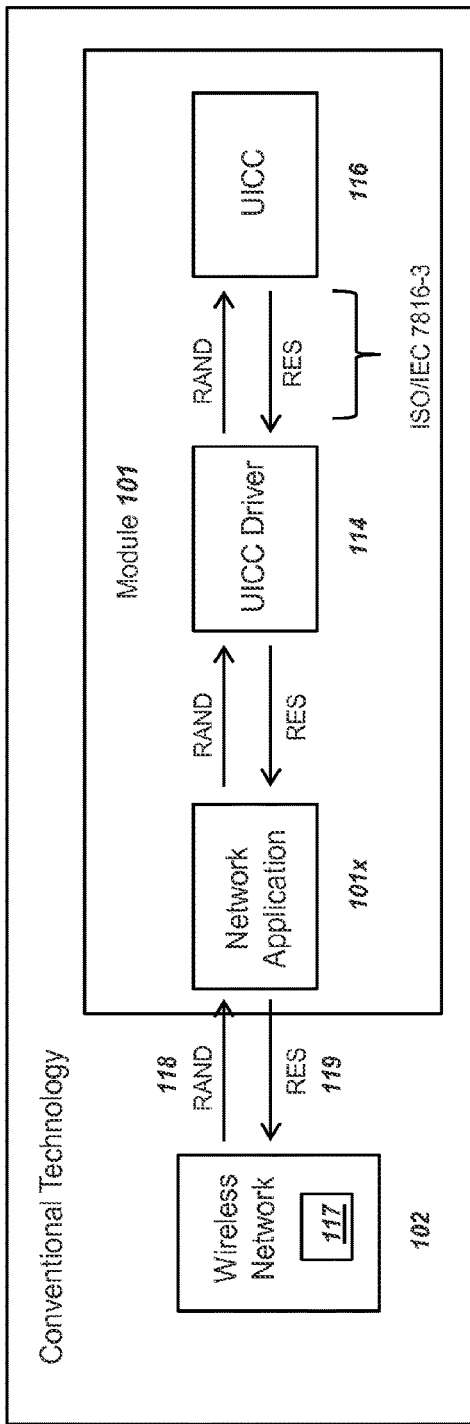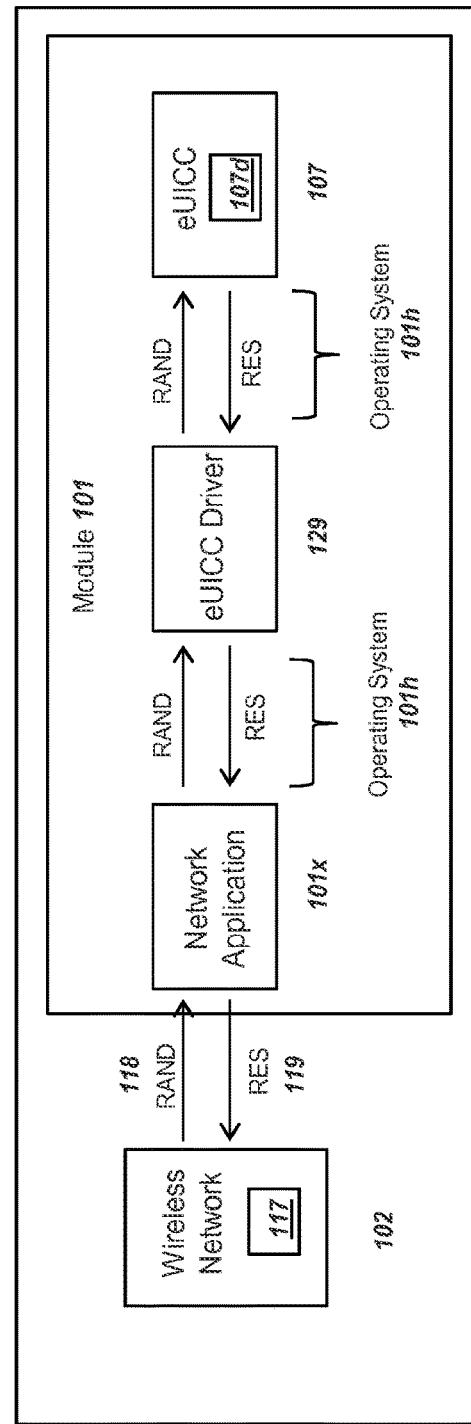

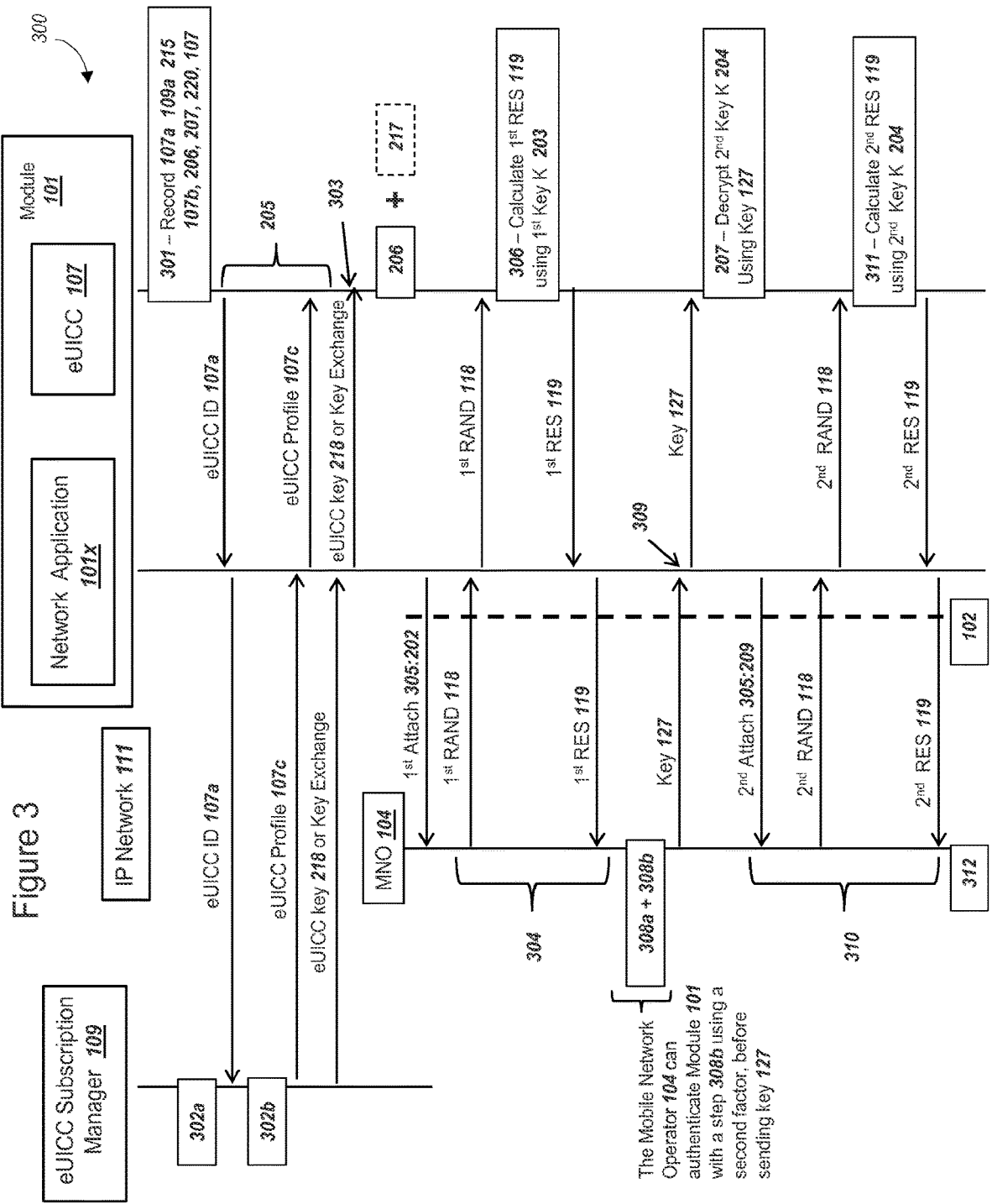

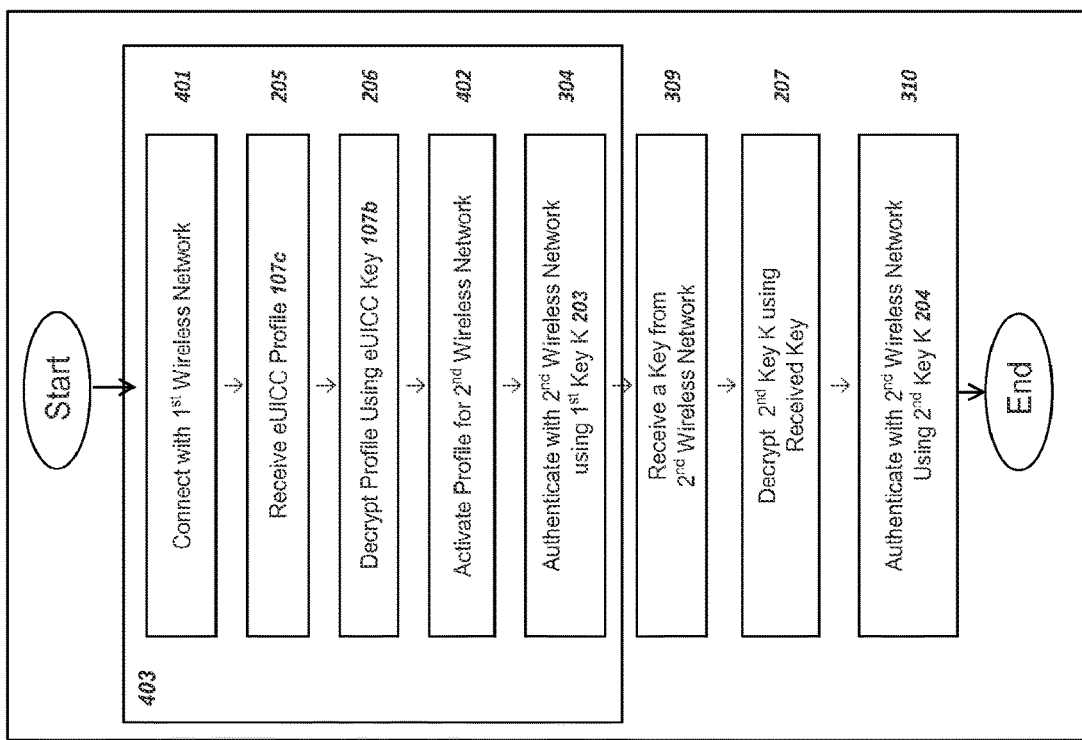

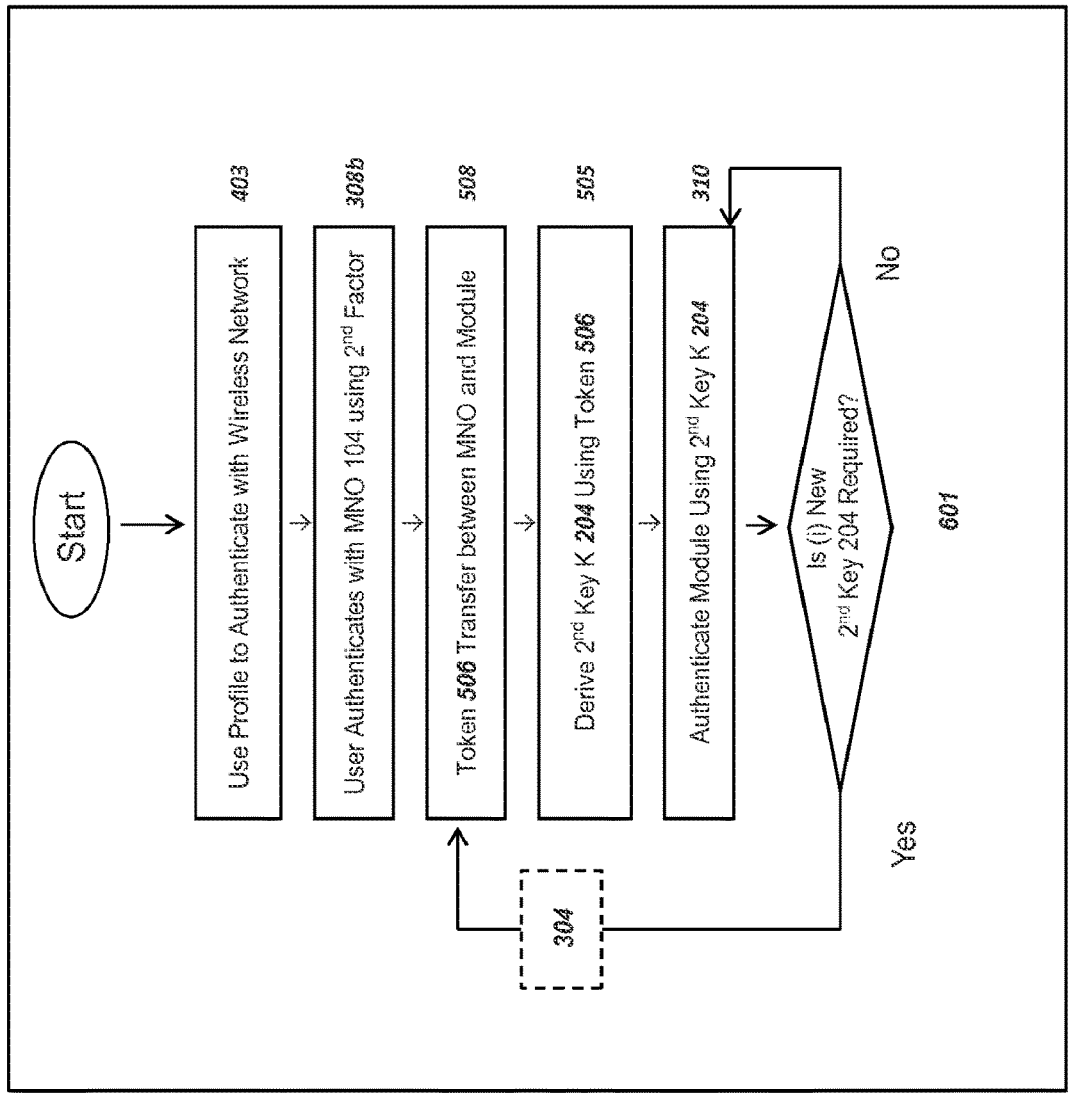

EMBEDDED UNIVERSAL INTEGRATED CIRCUIT CARD SUPPORTING TWO-FACTOR AUTHENTICATION

CROSS-REFERENCE TO RELATED APPLICATIONS

This is a continuation of U.S. patent application Ser. No. 16/453,682, filed Jun. 26, 2019, entitled "Embedded Universal Integrated Circuit Card Supporting Two-Factor Authentication," which is a continuation of U.S. patent application Ser. No. 16/110,804, filed Aug. 23, 2018, entitled "Embedded Universal Integrated Circuit Card Supporting Two-Factor Authentication," which is a continuation of U.S. patent application Ser. No. 15/928,848, filed Mar. 22, 2018, entitled "EMBEDDED UNIVERSAL INTEGRATED CIRCUIT CARD SUPPORTING TWO-FACTOR AUTHENTICATION," which is a continuation of U.S. patent application Ser. No. 14/751,119, filed Jun. 25, 2015, entitled "An Embedded Universal Integrated Circuit Card Supporting Two-Factor Authentication", now U.S. Pat. No. 9,961,060, which is a continuation of U.S. patent application Ser. No. 14/099,329, filed Dec. 6, 2013, entitled "An Embedded Universal Integrated Circuit Card Supporting Two-Factor Authentication," now U.S. Pat. No. 9,100,175, the contents of all of which are incorporated herein by reference in their entirety.

The subject matter of this application is related to the subject matter of U.S. patent application Ser. No. 14/084,141, filed Nov. 19, 2013 in the name of John Nix, entitled "Key Derivation for a Module using an Embedded Universal Integrated Circuit Card," now U.S. Pat. No. 9,319,223, which is hereby incorporated by reference in its entirety.

BACKGROUND

Technical Field

The present methods and systems relate to communications for a module, and more particularly, to methods and systems for using an embedded universal integrated circuit card (eUICC), where the methods and systems also support the authentication of a user associated with the eUICC.

Description of Related Art

The combination of "machine-to-machine" (M2M) communications and using low-cost sensors, Internet connections, and processors is a promising and growing field. Among many potential benefits, M2M technologies allow the remote monitoring and/or control of people, assets, or a location where manual monitoring is not economic, or costs can be significantly reduced by using automated monitoring as opposed to manual techniques. Prominent examples today include vending machines, automobiles, alarm systems, and remote sensors. Fast growing markets for M2M applications today include tracking devices for shipping containers or pallets, health applications such as, but not limited to, the remote monitoring of a person's glucose levels or heartbeat, monitoring of industrial equipment deployed in the field, and security systems. Many M2M applications leverage either wired Internet connections or wireless connections, and both types of connections continue to grow rapidly. M2M applications may also be referred to as "the Internet of things".

M2M communications can provide remote control over actuators that may be connected to a M2M device, such as, but not limited to, turning on or off a power switch, locking or unlocking a door, adjusting a speed of a motor, or similar remote control. A decision to change or adjust an actuator associated with an M2M device can utilize one or a series of sensor measurements. An M2M device may also be referred to as a "wireless module" or also simply a module. As one example, if a building or room is too cold, then temperature can be reported to a central server by an M2M device and the server can instruct the M2M device to turn on a switch that activates heat or adjusts a thermostat. As the costs for computer and networking hardware continue to decline, together with the growing ease of obtaining either wired or wireless Internet access for small form-factor devices, the number of economically favorable applications for M2M communications grows.

Many M2M applications can leverage wireless networking technologies. Wireless technologies such as, but not limited to, wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include $3^{rd}$ Generation Partnership Project's (3GPP) $3^{rd}$ Generation (3G) Universal Mobile Telecommunications System (UMTS) and $4^{th}$ Generation (4G) Long-term Evolution (LTE), LTE Advanced, and the Institute of Electrical and Electronics Engineers' (IEEE) 802.16 standard, also known as WiMax. The use of wireless technologies with M2M communications creates new opportunities for the deployment of M2M modules in locations less suitable for fixed-wire Internet access, but also creates a significant new class of problems that need to be solved.

One class of problems for using M2M modules with traditional wireless networks results from basic design considerations for the wireless networks, where many wireless wide-area networking standards were designed and optimized for mobile phones, including smart phones. A core element of traditional wireless WAN technologies such as 3GPP and ETSI standards over the past 20 years has included the use of a subscriber identity module (SIM) card within 2G networks and a related universal integrated circuit card (UICC) for 3G and 4G networks, including LTE networks. ETSI standards for a physical UICC as of 2013 include ETSI TR 102 216. Traditionally, these cards have been supplied by a mobile network operator (MNO) and contain a pre-shared secret key K in addition to a set of parameters for a mobile phone or user equipment to connect with the wireless network operated by the MNO. The parameters could include (i) an identity such as an IMSI, (ii) a set of frequencies for a mobile phone to scan in order to locate a beacon signal from the MNO, (iii) a preferred access list of other MNOs in order to support roaming in locations where the MNI associated with the IMSI is not available, and (iv) many other related parameters as well. The physical media and cards in the form of a UICC can be appropriate or suitable for a mobile phone or mobile handset, where an end user can readily replace or "swap out" the physical card as the mobile phone changes geographical locations or due to other preferences for the subscriber or end-user. Distributors of either mobile handsets or mobile phone service can physically insert or change an appropriate UICC for the mobile phones as well.

However, the rapid growth for "machine-to-machine" applications has created significant challenges to the traditional model of utilizing physical media such as a UICC in order to provide data and parameters for a module's connectivity to a MNO. Exemplary reasons for potential difficulties with physical media such as a UICC in M2M applications include (i) the modules may be installed in remote locations that are difficult or expensive to reach after installation, such as, but not limited to, tracking devices on shipping containers that can move globally, (ii) a manufacturer or service provider may prefer for the module to be hermetically sealed for business or technical reasons, including the physical UICC may not be easily tampered with, and (iii) a module (such as a tracking device on a 40 foot shipping container) may move between several different countries, and the lowest costs for Internet or data connectivity through the wireless WAN may be through utilizing different UICC cards from different operators, but the cost of swapping the UICC card could be prohibitive.

Other needs for changing a preferred network or network credentials without physically changing a UICC exist as well. These needs have been one motivation for the industry, including ETSI and 3GPP standards bodies, to consider an embedded UICC, also known as an "eUICC". With an eUICC, the operation of an UICC can be essentially "virtualized", such that the data and algorithms within a UICC can be processed in software and distributed through electronic media (such as, but not limited to, a file transfer or file download). Exemplary benefits and technical considerations for using an eUICC in M2M applications as of November 2013 is outlined in ETSI TS 103 383 v12.1, entitled "Smart Cards; Embedded UICC; Requirements Specification," which is herein incorporated by reference in its entirety. Note that this published standard from June 2013, and the standard is primarily in the requirements definition phase, and many of the technical specifications for implementation and operation of an eUICC will be defined in the future.

Although the use of an embedded eUICC can solve many of the issues for distributing and managing physical media such as a UICC, many additional challenges remain. Many open and remaining challenges for a eUICC pertain to securely and electronically transferring a new set of MNO network access credentials (such as an IMSI and network key K) to a module in a secure and efficient manner. A need exists in the art for a module to securely obtain network access credentials. Another need exists in the art for the obtained credentials in a eUICC to be fully compatible with the significant installed and legacy base of networks that use a pre-shared secret key K, where the key K serves as the foundation for authentication and ciphering of data for a mobile phone or user equipment, including modules using conventional technology. A successful solution to these needs for M2M applications in the form of an eUICC can also provide a working solution of the needs for regular mobile phones as well, such that a consumer mobile phone or smartphone could implement and utilize an eUICC in order to eliminate the costs and complexity of dealing with a physical UICC.

A need exists in the art for module and a mobile network operator to securely share a pre-shared secret key K without depending on physical distribution of the key K or electronic distribution of the key K through $3^{rd}$ parties, even in an encrypted form. A need exists in the art for the decryption of data within an eUICC profile to be under the control of the mobile network operator, because the mobile network operator may not control the distribution or release of profiles from an eUICC subscription manager to a module with an eUICC. As currently contemplated in November of 2013 by eUICC standards discussed above, a pre-shared secret key K and related network access credentials are transmitted to a module from an eUICC subscription manager. The pre-shared secret key K is also known as key K in 4G LTE and related networks and key Ki in 3G networks. The resulting security for the electronically transferred, pre-shared secret key K is no stronger than (i) the encryption on the channel used to transfer key K, and (ii) the security and chain of control for keys used to encrypt the communications channel transferring key K to a module or a mobile phone. A module and mobile network operator (MNO) using an electronically transferred key K for network access credentials is dependent on the communications channel for transferring key K, even though that communications channel may be outside the control of the MNO (such as at a time when key K is transferred using another MNO or a different network). Therefore, a need exists in the art for the MNO to securely and efficiently control the use of an electronically transferred key K within a profile for an eUICC, even though copying and distributing the profile may be outside the control of the MNO.

In addition, over an extended period of time such as several years, a mobile network operator could prefer for the key K to periodically rotate or change for an individual module or mobile phone in order to increase security. The continued and extended use of a single key K for all communications with a module or mobile phone can be a security risk, especially with a large volume of data transferred that could be subject to analysis for cryptographic weaknesses by potential attackers. Additionally, in the future a standard key length for key K may increase from today's current 128 bits to a longer key length such as an exemplary 256 bits. With conventional technology where key K is recorded in physical media such as a UICC, the only feasible way to change key K for a module or mobile phone is to physically distribute a new UICC card, with resulting costs and business complexities. A need exists in the art for a module, including a mobile phone, and a MNO to securely and efficiently support a change in network access credentials, including a key K for the module connecting to the MNO, without requiring a physical replacement of a UICC or equivalent physical media recording a key K.

And other needs exist in the art as well, as the list recited above is not meant to be exhaustive but rather illustrative.

SUMMARY

Methods and systems are provided for secure and efficient communication using a module to communicate with a server and a mobile operator network. The module can support "Machine to Machine" (M2M) communications, also known as "the Internet of things". The methods and systems contemplated herein can also support other applications as well, including mobile phone handsets connecting to a wireless network, where the wireless network can be associated with or the radio access portion of a mobile network operator. A module in the present invention can comprise a mobile phone such as a smartphone, and may also be referred to as a mobile device, mobile station, or user equipment. An objective of the invention is to address the challenges noted above for securing the deployment of modules that can utilize an embedded universal integrated circuit card (eUICC) and/or also PKI algorithms and keys.

The methods and systems contemplated herein can reduce the need for manual intervention with a module in order to automatically and remotely change network access credentials in order for the module to utilize new or different keys in order to connect and authenticate with a wireless network. By using an eUICC, where the eUICC can support both (i) the authentication of a user by the MNO, and (ii) the secure decryption or derivation of the key K under control of the MNO, the value and usefulness of modules can be increased for a user and a mobile operator network. An eUICC can also comprise software and/or firmware components to "virtualize" the operation of a physical UICC, such that (i) the data normally recorded in a physical UICC can be recorded in a file with encryption, and (ii) the steps for using the data in the file can be processed by an eUICC.

In a first embodiment, a mobile network operator can process a set of data for inclusion in a profile for an eUICC. Data within the profile can be equivalent or similar to the data recorded in a physical UICC, including a set of network parameters, a module network identity, and a first key K. The mobile network operator can send the data for a profile to an eUICC subscription manager. A module can include an embedded universal integrated circuit card (eUICC). The eUICC can be processed by an operating system on the module and can be recorded in a nonvolatile memory, such that the eUICC is available after a powered off state. The eUICC can include data such as an eUICC identity, an eUICC profile key, and a symmetric ciphering algorithm. A manufacturer or distributor could record the data for the eUICC before the module is received by a user. The eUICC can communicate in the module with a network application. The network application can communicate with the mobile network operator using a wireless network and a radio within the module. The module can connect with a first network, send the eUICC identity and receive an encrypted profile, and the module can record the encrypted profile in a nonvolatile memory associated with the eUICC. The first network can be a network different than the wireless network for the profile, and the first network could comprise a WiFi network, a LAN connection using a USB interface to the module, or a public land mobile network.

Continuing with this first embodiment, the encrypted profile as received by the module can include a first portion of ciphertext and a second portion of ciphertext. The module using the eUICC can decrypt the first portion of ciphertext using the eUICC profile key and the symmetric ciphering algorithm. The resulting plaintext from the decrypted first portion of ciphertext can include the set of network parameters, the first network module identity, and the first key K. The module using the eUICC can select and activate the profile in order to connect with the wireless network associated with the mobile network operator. The module can conduct a first authentication with the mobile network operator using the first network module identity and the first key K. The module can send an attach request message, including an exemplary radio resource request message with the first network module identity, and the module can receive a random number in the form of a first RAND value.

Continuing with this first embodiment, the module can forward the RAND to the eUICC with the activated profile. The eUICC can input the first RAND and the first key K into a cryptographic algorithm in order to output a response RES value. The eUICC can return the RES value to the module, and the module could forward the RES to the wireless network. The wireless network can compare the received RES with a stored, expected RES (previously calculated using the same first RAND and first key K), and if the two RES values match then the module with the eUICC and profile can be authenticated by the network. The network and the module can take additional steps for the module to have at least limited access to an IP network. With access to the IP network for the module, a user associated with the module can conduct an authentication with the mobile network operator (whereas the mobile network operator may not have control over distribution of the profile with the network access credentials including the first key K up to this point).

Continuing with this first embodiment, the mobile network operator can authenticate or verify a user or M2M service provider associated with the module. The authentication or verification could comprise steps to verify a user, including the user entering information in a web page through the IP connection established with the network in the paragraph above using the first key K. Or the user could place a telephone call to a call center, and the user could verbally confirm identification information or enter DTMF digits. Or, the MNO could authenticate or verify the identity of a user associated with the module by a representative of the MNO visually viewing physical identification of the user such as a drivers license or a passport. If the module is associated with or operated by an M2M service provider, then the MNO could exchange data with the M2M service provider in order to confirm the module with the first key K is authenticated. In either case, where the module is associated with a user or an M2M service provider, the MNO could take steps to authenticate with a second factor, where authentication with the first factor comprised receiving the RES. After successful authentication with the second factor, the MNO can confirm the identity of an entity associated with the module, whereas that identity may not be known before the authentication with the second factor since the distribution of the eUICC profile may be outside the control of the mobile network operator.

Continuing with this first embodiment, after successful authentication with the second factor, the mobile network operator can send a symmetric key to the module. The symmetric key can be encrypted with a key ciphering algorithm. Or, the symmetric key can be (i) plaintext at the application layer, and (ii) encrypted at the data-link layer using the encryption between the module and wireless network after the first authentication above with the first key K. The module can receive the symmetric key (and decrypt the symmetric key if encrypted), and subsequently decrypt the second portion of ciphertext in the eUICC profile. The second portion of ciphertext can include a second network module identity and a second key K. The module can convert the second portion of ciphertext into plaintext using the symmetric ciphering algorithm and the received symmetric key. Note that the decryption of the second portion of ciphertext in the profile without the symmetric key is not feasible, and thus the mobile network operator can retain control over the use of the second key K in the profile for the eUICC, such as not releasing the symmetric key until after a user has successfully completed authentication with the mobile network operator as contemplated in the paragraph above.

After decrypting the second portion of ciphertext, the module with the eUICC can read a plaintext second network module identity and second key K. The second key K can be recorded in a protected, nonvolatile memory. The module can disconnect from the wireless network (where the first session used the first key K), and reconnect with the wireless network using the second network module identity and the second key K. The module with the eUICC can conduct a second authentication using the second key K, including sending the second network module identity, receiving a second RAND value, calculating a second RES value using the second RAND and the second key K, and sending the second RES value. After a successful second authentication, the module can access the IP network and the public Internet through the wireless network, and subsequent authentications with the wireless network can continue to use the second network module identity and the second key K. For embodiments where the module comprises a mobile phone and the user is an individual subscribing to mobile phone services from the mobile network operator, the user can be associated with a telephone number and place/receive phone calls after a successful second authentication.

In another embodiment, the eUICC profile key, associated with decrypting the profile from the eUICC subscription manager, may not be recorded in the eUICC before the eUICC sends an eUICC identity to the module, where the module sends the eUICC identity to the eUICC subscription manager through a first network. The eUICC can record an eUICC private key and the eUICC subscription manager could record an eUICC public key. The eUICC subscription manager can (i) encrypt the profile with the eUICC profile key, and then (ii) encrypt the eUICC profile key with an asymmetric ciphering algorithm and the eUICC public key, where the output is an encrypted eUICC profile key. The eUICC can receive the encrypted eUICC profile key from the eUICC subscription manager and decrypt the encrypted eUICC key using the asymmetric ciphering algorithm and the eUICC private key. After reading the plaintext eUICC profile key, the eUICC can decrypt the encrypted profile using the plaintext eUICC profile key, in order to read a plaintext first key K and first network module identity.

In an exemplary embodiment, the first key K is a null value for a profile recorded in the eUICC in a module. The use of a null value or the number zero for a shared secret key K is contemplated in wireless WAN standards and supported by commercial wireless networks in order to support emergency services for a module without a valid UICC. With a null value for the first key K, the MNO and wireless network can provide limited access to the IP network, such that a user of the module with a null or zero value for the first key K could perform steps to authenticate or verify the user with the MNO through the IP network accesses with the first key K as a null value. The data-link layer may not be effectively ciphered due to the use of a null value for the first key K, but the application or transport layer could secure communication from a web browser on the module to a web server for the user to authenticate with the MNO. The secure communication between the web browser and web server can utilize transport layer security (TLS) or similar standards for security at the transport or application layer, even though the data-link or network layer may not be encrypted. After successful authentication via the web browser, the MNO can take steps (discussed in other embodiments) allowing the module with the eUICC to access and use a second key K and a second network module identity for subsequent secured communication between the module and the MNO.

In another embodiment, the second key K can be derived using by both the mobile network operator and the module with the eUICC using a key derivation algorithm. The eUICC could include an eUICC key exchange algorithm and the mobile network operator could include a MNO key exchange algorithm, and the key exchange algorithms can include a key derivation algorithm that accepts input of a token value, a private key, and a public key for the other node. The mobile network operator and the module with the eUICC could communicate the token value used for the key derivation algorithm (including using the connectivity through the wireless network after using the first key K in the profile). The module can record an eUICC private key, and the MNO can have access to the eUICC public key. The key derivation algorithm in the eUICC key exchange algorithm can output a second key K using the token. The MNO can obtain the same value for the second key K. In this manner, both node can derive the same second key K without electronically transferring the second key K, even in encrypted form and thereby increasing the security of a systems with an eUICC.

In an exemplary embodiment can support a module changing a key K used to (i) authenticate with a wireless network and (i) cipher/decipher data with a wireless network. The module can change key K without requiring the manual exchange of a UICC or other physical intervention. The module can use an eUICC profile and change key K while using the same eUICC profile. The module, could also comprise a mobile phone such as, but not limited to, a smart phone. After connecting with a first network, which could comprise a first wireless WAN, wireless LAN, or wired connection, the module can receive a eUICC profile for an eUICC in the module, where the eUICC profile includes a first network module identity and a first key K. The first key K can be a standards-based key K used with wireless networks, and be equivalent to a pre-shared secret key K recorded in physical UICCs for LTE networks.

After authenticating with the wireless network using the first key K, the module and MNO can share a token. The module and MNO can mutually derive a second key K using the token and a key derivation algorithm. The module can disconnect from the wireless network after attaching using the first key K, and then reconnect using the second key K which has now been mutually derived by both the module and the mobile network operator. The module or MNO could determine or evaluate if the use of a new key K is required or preferred, and share a new token for input into the key derivation algorithms to derive a mutually shared new key K. In this manner, a module can change the key K used to authenticate and cipher/decipher data with a wireless network from a first key K to a second key K. This can increase flexibility of the system and reduce costs of physically distributing a new UICC to the module (or electronically sending new eUICC profiles) in order to change a key K.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1a is a graphical illustration of an exemplary system that includes a module and a mobile network operator, in accordance with exemplary embodiments;

FIG. 1b is a graphical illustration of hardware, firmware, and software components for a module, in accordance with exemplary embodiments;

FIG. 1c is a graphical illustration of components within a module, in accordance with exemplary embodiments;

FIG. 1d is a graphical illustration for authenticating with a wireless network using a physical UICC, in accordance with conventional technology;

FIG. 1e is a graphical illustration for authenticating with a wireless network using an eUICC, in accordance with exemplary embodiments;

FIG. 3 is a simplified message flow diagram illustrating an exemplary system with exemplary data sent and received by a module with an eUICC, in accordance with exemplary embodiments;

FIG. 4 is a flow chart illustrating exemplary steps for a module to use an eUICC and authenticate with a wireless network, in accordance with exemplary embodiments;

DETAILED DESCRIPTION OF EXEMPLARY EMBODIMENTS OF THE INVENTION

FIG. 1a

Figure 1F:
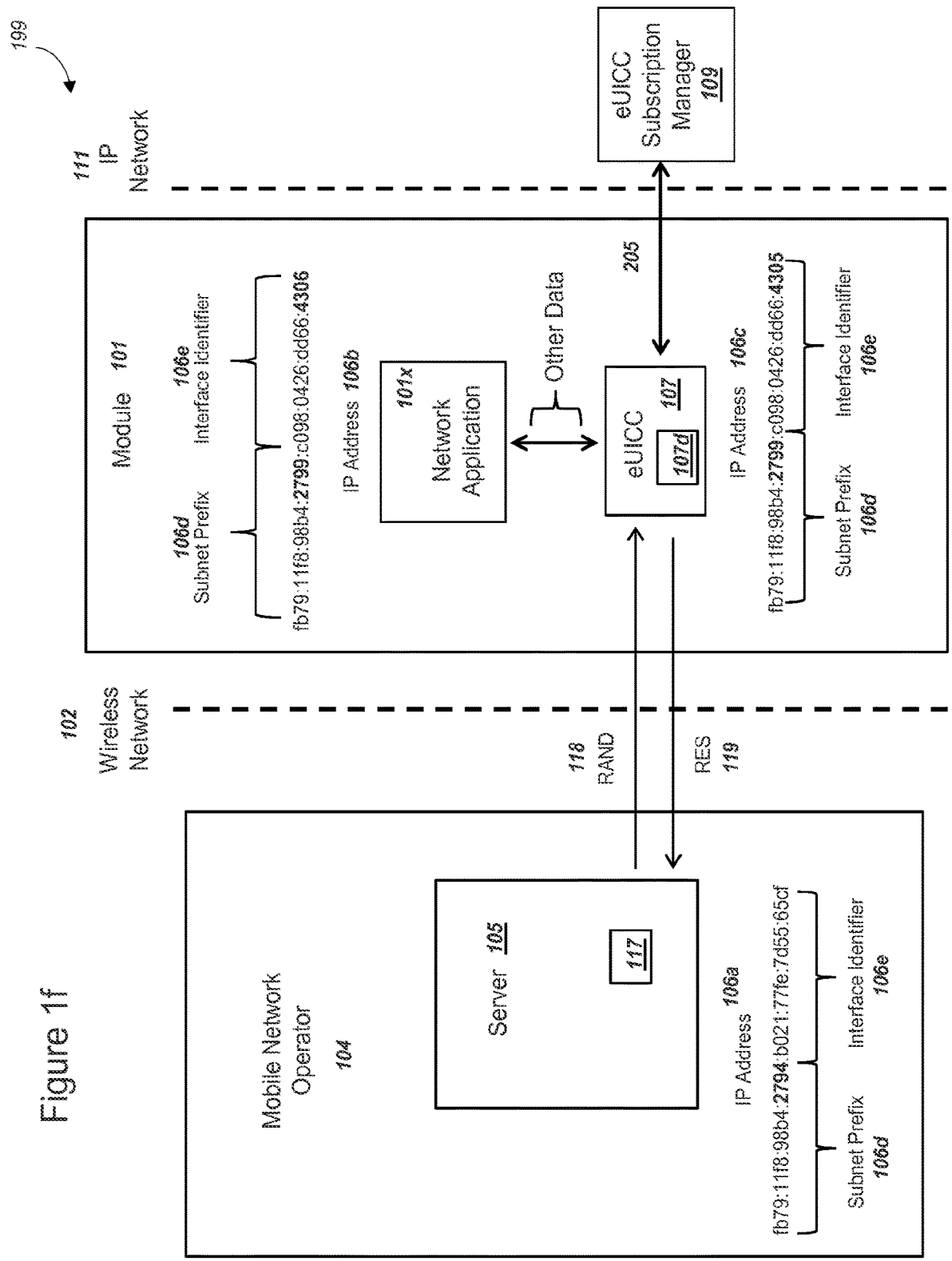
FIG. 1f is a graphical illustration of an exemplary system that includes a module, a mobile network operator, and an eUICC in accordance with exemplary embodiments.

FIG. 1a is a graphical illustration of an exemplary system that includes a module and a mobile network operator, in accordance with exemplary embodiments. The system 100 includes a module 101 operating within a wireless network 102. System 100 can also include a mobile network operator 104, an IP Network 111, and an eUICC subscription manager 109. Mobile network operator (MNO) 104 can include a server 105. For embodiments where the MNO 104 uses 4G LTE and LTE Advanced networks, server 105 could comprise a home subscriber server (HSS) and/or a mobility management entity (MME). Server 105 could be a server with related functionality as a HSS or MME for a MNO 104 that uses different wireless network standards than those based on 4G LTE. Although not illustrated in FIG. 1a, an eUICC subscription manager 109 may also include one or more servers 105, such that a first server 105 could function as an HSS in 4G LTE and LTE Advanced networks and a second server 105 could function as a MME in 4G LTE and LTE Advanced networks.

System 100 is illustrated without specific packet transmissions between module 101 and mobile network operator 104 and eUICC subscription manager 109. Examples of the communications and messages pertaining to the present invention will be illustrated in later Figures. As contemplated herein, machine-to-machine communications may comprise communication between a module 101 and a server 105, such that data can be transferred between the two with minimal manual intervention, although manual intervention can be required to set up system 100 and any occasional manual maintenance required. As contemplated herein, machine-to-machine communications may also be referred to as "the Internet of things" (IoT). Also note that module 101 may comprise a wireless module, such that module 101 can communicate with wireless network 102 using a radio and an antenna. A wireless or a wired configuration for module 101 can be utilized in the present invention.

If module 101 operates as a wireless module, module 101 and wireless network 102 can communicate using a base station 103. Module 101 and wireless network 102 can utilize a variety of wireless technologies to communicate, including WiFi, WiMax, a 2nd generation wireless wide area network (WAN) technology such as, but not limited to, General Packet Radio Services (GPRS) or Enhanced Data rates for GSM Evolution (EDGE), 3rd Generation Partnership Project (3GPP) technology such as, but not limited to, 3G, 4G LTE, or 4G LTE Advanced, and other examples exist as well including wireless networks based on WiMAX standards. A wired module 101 can connect to the IP Network 111 via a wired connection such as, but not limited to, an Ethernet, a fiber optic, or a Universal Serial Bus (USB) connection (not shown).

Generally, the communication techniques described herein can be independent of the network technologies utilized at the physical and data-link layers, so long as the underlying network provides access to the IP Network 111 and supports Internet Protocols (IP). The IP Network 111 can be an IPv4 or an IPv6 packet-switched based network that utilizes standards derived from the Internet Engineering Task Force, such as, but not limited to, RFC 786 (User Datagram Protocol), RFC 793 (Transmission Control Protocol), and related protocols. The IP Network 111 can be the public Internet comprising globally routable IP addresses, or a private network that utilizes private IP addresses. IP Network 111 as illustrated in FIG. 1a could comprise the globally routable public Internet, or IP Network 111 could also be a private Internet that is (i) not globally routable and (ii) only accessible to authorized modules and servers. As one example of a private IP Network 111, IP Network 111 could use private IP addresses for nodes on the network, and in this case IP Network 107 could be referred to as an intranet or private network. Alternatively, IP Network 111 could be a private network layered on top of the publicly routable Internet via secured and encrypted connections. The specific numbers for IP addresses and port numbers shown in FIG. 1a and other figures are illustrative and any valid IP address or port number can be used, including an IPv4 and an IPv6 address. Server 105 within mobile network operator 104 can communicate with the module 101 using IP network 111, where IP network 111 can comprise a private network that utilizes Internet Protocol standards. Module 101 can access the public Internet after authenticating with the server 105 associated with the MNO 104.

When operating in a wireless network configuration, module 101 can access the IP Network 111 via the wireless network 102. In the wireless network configuration, module 101 can be a wireless handset, a cellular phone, a smartphone, a tablet computer, a laptop, a computer with a radio, a tracking device, or a circuit board with a radio that accesses wireless network 102. Examples of wireless modules that utilize a wireless WAN such as, but not limited to, 2G and 3G networking technologies include the Motorola® G24-1 and Huawei® MC323. Example manufacturers of wireless modules in 2012 include Sierra Wireless® and Telit®. Example leading manufacturers of mobile phones in 2013 include Apple® and Samsung®. In a wired configuration (not shown), module 101 can be a computer, security camera, security monitoring device, networked controller, etc. Module 101 can include a module identity 110, which can comprise a serial number or identity code in order to identify an individual, specific module 101 among a plurality of modules 101. A more detailed depiction of exemplary components of a module 101 is included in FIG. 1b and FIG. 1c below. Module 101 could also operate as a "smartcard" such that an end user presents module 101 to merchants for payments.

Wireless network 102 may comprise either a wireless local area network (LAN) or a wireless WAN such as a public land mobile network (PLMN). Examples for technologies used in wireless LANs include an 802.11 WLAN, Bluetooth, or Zigbee among other possibilities. Module 101 operating in wireless mode could communicate with a base station 103 of a wireless network 102 using a radio and an antenna. Wireless network 102 could operate as a Mode II device according to FCC Memorandum Opinion and Order (FC-12-36) and related white space regulation documents. If module 101 supports IEEE 802.15.4, then wireless network 102 could be a Zigbee network, an ISA100.11a standards-based network, or a 6LoWPAN network as described by IETF RFC 4944. Other possibilities exist as well for the wireless technology utilized by a wireless network 102 and module 101, operating in a wireless mode, without departing from the scope of the present invention.

System 100 can include an eUICC subscription manager 109, where an eUICC subscription manager 109 can manage the recording and secure distribution of eUICC profiles 107c to a module 101. Example entities that could operate or control an eUICC subscription manager 109 include a manufacturer of module 101, an M2M service provider that manages the operation of module 101, or possibly a mobile network operator 104 could operate the eUICC subscription manager 109. Other entities could operate as an eUICC subscription manager 109 as well. An exemplary eUICC subscription manager 109 is described in ETSI TS 103 383 v12.1, entitled "Smart Cards; Embedded UICC; Requirements Specification," which is herein incorporated by reference in its entirety. An eUICC subscription manager 109 can also use a server 105 and record private keys and public keys for the server/subscription manager operation (including exemplary keys depicted and described in connection with FIG. 2d below).

In exemplary embodiments, eUICC subscription manager 109 can use an eUICC profile key 107b to cipher portions of an eUICC profile 107c, such that only module 101 with the same eUICC profile key 107b could reasonably decipher the portions of the eUICC profile 107c. In this manner, the eUICC profile 107c can remain reasonably secured. The eUICC subscription manager 109 can share the eUICC profile key 107b in several different ways, including (i) pre-sharing the eUICC profile key 107b, or (ii) the eUICC subscription manager 109 sending the eUICC profile key 107b to the eUICC 107 using an asymmetric ciphering algorithm 219 as depicted and described in connection with FIG. 2e below. An eUICC profile 107c can include an eUICC profile identity 107e in order to identify a profile among a plurality of eUICC profiles 107c. An eUICC subscription manager 109 can include an address 109a. The address 109a could comprise a domain name, such that a domain name system (DNS) or secure DNS (DNSSEC) query could resolve the name into an IP address in order for module 101 to communicate with the eUICC subscription manager 109. Or the address 109a could comprise an Internet Protocol (IP) address, and the address 109a could include or be associated with a port number, such as port number 443 for data that utilizes transport layer security.

An eUICC 107 within module 101 can comprise an embedded universal integrated circuit card (eUICC) 107. An eUICC 107 can provide the equivalent functionality as a physical UICC, where definitions for a physical UICC are included in ETSI TR 102 216 and ETSI TS 102 221 V11.0.0, and other examples for the use of a physical UICC in mobile phones and M2M modules exist as well. An eUICC 107 in FIG. 1a can support exemplary requirements for an eUICC outlined in ETSI TS 103 383 v12.1, entitled "Smart Cards; Embedded UICC; Requirements Specification," which is herein incorporated by reference in its entirety. In other words, an eUICC 107 can operate as a "virtualized" UICC, such that data operations and input/output to a physical UICC can be provided by an eUICC 107. Exemplary details of a conventional, physical UICC for authenticating a module 101 (which can be "virtualized in an eUICC 107) are depicted and described in connection with FIG. 1d below. An eUICC 107 can include an eUICC identity 107a, such that an eUICC subscription manager 109 can select and identify the eUICC 107 among a plurality of eUICCs 107. The eUICC 107 can also record an eUICC profile key 107b and an eUICC profile 107d. Profile 107d can represent a profile that is partially decrypted using the eUICC profile key 107b, as depicted and described in connection with FIG. 2a below. Additional exemplary details for the operation of an eUICC 107 within module 101 are also provided in FIG. 1b, FIG. 1c, FIG. 1e, and FIG. 1f below.

According to an exemplary embodiment, an eUICC 107 can be recorded and operate within a "eUICC supporting" physical universal integrated circuit card (UICC) 108 within module 101. This "eUICC supporting", physical UICC 108 can include a processing unit, RAM memory, ROM memory, EEPROM memory, a bus, and a physical interface (not shown in FIG. 1a, but described in FIG. 1b). An exemplary processing unit, RAM memory, ROM memory, EEPROM memory, and bus are depicted and described in connection with FIG. 1b below. The physical interface for an UICC 108 is depicted and described in connection with FIG. 1d below. The "eUICC supporting" physically UICC 108 can perform all of the functions of an eUICC 107, including (i) receiving and recording profiles 107d, (ii) receiving and recording eUICC profile keys 107b, (iii) recording an eUICC identity 107e, (iv) decrypting an eUICC profile 107c into an eUICC profile 107d as depicted and described in connection with FIG. 2a below, (v) recording a set of network parameters 201 (in FIG. 2a below) for module 101 to connect with wireless network 102, and (vi) recording keys such as a key K for conducting a message digest authentication with wireless network as depicted and described in FIG. 1d, FIG. 1e, and FIG. 3 below. An "eUICC supporting" physical UICC 108 can include a physical electrical interface of ISO/IEC 7816-3 in order to support existing physical slots for UICCs. The use of an "eUICC supporting" physical UICC 108 is optional, and can be omitted. In this case (where "eUICC supporting" physical UICC 108 is omitted), the eUICC 107 can operate as a program within module 101 as depicted and described in connection with FIG. 1b below, and the eUICC 107 would not reside within the "eUICC supporting" physical UICC 108.

The physical form-factor for an "eUICC supporting" UICC 108 could be identical to a UICC, and a difference between the two may not even be apparent upon visual inspection without special markings on the card. The physical form-factor for an "eUICC supporting" UICC 108 could comprise a "micro-SIM" or a "nano-SIM" as defined in ETSI TS 102 221 V11.0.0, which is herein incorporated by reference. When the module 101 detects a "eUICC supporting" UICC 107, the module 101 could send received eUICC profiles 107c to the "eUICC supporting" UICC 107, and also select, deselect, activate, and deactivate the different received eUICC profiles 107d recorded in the "eUICC supporting" UICC 108. When a module 101 detects that a regular UICC (i.e. not an "eUICC supporting" UICC 108) has been loaded into a slot for UICCs within the module, the module 101 could access the UICC in a regular manner implemented by mobile phones and modules for connecting to existing wireless networks in 2013, such as LTE or 3G networks. This use of conventional technology for a physical UICC is depicted and described in connection with FIG. 1d below.

A module 101 can be associated with a user 113 or an M2M service provider 115. A user 113 could be a subscriber to mobile phone services provided by the mobile network operator 104. In this case, the user could be an individual and the module 101 could comprise a mobile phone with a telephone number, an email client, and a web browser (in addition to other, standard functionality for a mobile phone). The user 113 could periodically charge the module 101 (which can comprise a mobile phone), such as typically at night and carry the module 101 during the day in order to place calls and send/receive data. Thus, the user 113 may typically be physically close to a mobile phone as module 101, but an M2M service provider 115 can be associated with module 101 but may not be physically close to module 101. For embodiments where module 101 is associated with M2M communications, such as including a sensor to collect data regarding a monitored unit, the module 101 can be associated with an M2M service provider 115. In this case, the M2M service provider 115 can be a company or a division or department within a larger company that is associated with a plurality of modules 101 for collecting data using sensors and sending the data to a server similar to server 105. The M2M service provider 115 may operate the server similar to server 105 in order to automatically collect data from the plurality of modules 101. The server for the M2M service provider 115 could communicate with module 101 using the IP network 111 and the wireless network 102 when module 101 is connected to the wireless network 102.

Other configurations besides the one illustrated in FIG. 1a are possible as well. In many common commercial relationships for the operation of mobile phone service in the United States in 2013, wireless network 102 could represent a portion of the radio access network used by a mobile network operator 104. MNO 104 could outsource portions of the operation and maintenance of a radio access network, such as a wireless network 102, to $3^{rd}$ parties. In this configuration, wireless network 102 could represent a network operated by a first company specializing in the operation of radio towers and BTS equipment. This first company could be contracted with the mobile network operator 104 in order to support mobile phone service or data services to modules 101.

In addition, server 105 could reside within wireless network 102 in a data center managed by wireless network 102. Wireless network 102 could also operate as an eUICC subscription manager 109. Although a single module 101, server 105, wireless network 102, and mobile network operator 104 are illustrated in FIG. 1a, system 100 could comprise a plurality of each of these elements. Module 101 could also record sensor data pertaining to a monitored unit (not shown). Module 101 could be mobile, such as physically attached to a truck or a pallet, and module 101 could connect to a series of different wireless networks 102 or base stations 103 as module 101 moves geographically. Other configurations are possible as well for the elements illustrated in FIG. 1a without departing from the scope of the present invention.

FIG. 1b

FIG. 1b is a graphical illustration of hardware, firmware, and software components for a module, in accordance with exemplary embodiments. FIG. 1b is illustrated to include many components that can be common within a module 101, and module 101 may also operate in a wireless configuration in order to connect with a wireless network 102. In a wireless configuration, the physical interface 101a of module 101 may support radio-frequency (RF) communications with networks including a wireless network 102 via standards such as, but not limited to, GSM, UMTS, mobile WiMax, CDMA, LTE, LTE Advanced, and/or other mobile-network technologies. In a wireless configuration, the physical interface 101a may also provide connectivity to local networks such as, but not limited to, 802.11 WLAN, Bluetooth, or Zigbee among other possibilities. In a wireless configuration, module 101 could use a physical interface 101a be connected with both a wireless WAN and wireless LAN simultaneously. In a wired configuration, the physical interface 101a can provide connectivity to a wired network such as, but not limited to, through an Ethernet connection or USB connection. As contemplated herein, a physical interface 101a can include a network interface (such as a radio or an Ethernet port), such that module 101 can use the network interface in order to connect with a network and communicate with the network. A network interface can also comprise a physical interface 101a as contemplated herein.

The physical interface 101a can include associated hardware to provide the connections such as, but not limited to, radio-frequency (RF) chipsets, a power amplifier, an antenna, cable connectors, etc., and additional exemplary details regarding these components are described below in FIG. 1c. Device driver 101g can communicate with the physical interfaces 101a, providing hardware access to higher-level functions on module 101. Device drivers 101g may also be embedded into hardware or combined with the physical interfaces 101a. Module 101 may preferably include an operating system 101h to manage device drivers 101g and hardware resources within module 101. The operating systems described herein can also manage other resources such as, but not limited to, memory and may support multiple software programs operating on module 101 at the same time.

The operating system 101h can include Internet protocol stacks such as, but not limited to, a User Datagram Protocol (UDP) stack, Transmission Control Protocol (TCP) stack, a domain name system (DNS) stack, etc., and the operating system 101h may include timers and schedulers for managing the access of software to hardware resources. The operating system shown of 101h can be appropriate for a low-power device with limited memory and CPU resources (compared to a server 105). An example operating system 101*h* for module 101 includes Linux, Android® from Google®, Windows® Mobile, or Open AT® from Sierra Wireless®. Additional example operating systems 101*h* for module 101 include eCos, uC/OS, LiteOs, and Contiki, and other possibilities exist as well without departing from the scope of the present invention.

A module program 101*i* may be an application programmed in a language such as, but not limited to, C, C++, Java, and/or Python, and could provide functionality to support regular mobile phone functionality. The module program 101*i* could include a network application 101*x*, where network application 101*x* comprises the user equipment protocol for accessing and communicating with the wireless network 102. For embodiments where module 101 connects with a wireless network 102 comprising an LTE network, the network application 101*x* can receive, process, and send signals with the wireless network 102 for user equipment messages in ETSI TS 136 331 v.10.7 entitled "LTE; Evolved Universal Terrestrial Radio Access (E-UTRA); Radio Resource Control (RRC); Protocol Specification", which is herein incorporated by reference. In other words, network application 101*x* can comprise software for accessing and communicating with the wireless network 102. Although network application 101*x* is depicted in FIG. 1*b* as operating as software within RAM memory 101*e*, the network application 101*x* could be included in firmware or a processor or application associated with a radio 101*z* (described in FIG. 1*c*). Exemplary messages sent and received by a network application 101*x* are also depicted and described in connection with FIG. 3 below.

A module program 101*i* could also include software for M2M applications such as, but not limited to, remote monitoring of sensors and remote activation of actuators. Module program 101*i* could also include a software routine, subroutine, linked library, or software module, according to one preferred embodiment. As contemplated herein, a module program 101*i* can include an application operating within a smartphone, such as, but not limited to, an iPhone® or Android®-based smartphone, and in this case module 101 could comprise a smartphone. The application functioning as a module program 101*i* could be downloaded from an "app store" associated with the smartphone. A set of device drivers 101*g* could include an eUICC driver 129, such that a network application 101*x* or other software or firmware within module 101 communicating with the eUICC 107 could send and receive data with the eUICC driver 129. Additional details regarding an exemplary eUICC driver 129 are depicted and described in connection with FIG. 1*e* below.

Many of the logical steps for operation of module 101 or eUICC 107 can be performed in software and hardware by various combinations of physical interface 101*a*, device driver 101*g*, operating system 101*h*, and a module program 101*i*. As depicted in FIG. 1*b*, module program 101*i* can include an eUICC 107 and a network application 101*x*. When module 101 or eUICC 107 is described herein as performing various actions such as acquiring an IP address, connecting to the wireless network, monitoring a port, transmitting a packet, sending a message, receiving a response, or encrypting or signing data, specifying herein that module 101 or eUICC 107 performs an action can refer to software, hardware, and/or firmware operating within module 101 illustrated in FIG. 1*b* or FIG. 1*c* performing the action.

Note that module 101 may also optionally include user interface 101*j* which may include one or more devices for receiving inputs and/or one or more devices for conveying outputs. User interfaces are known in the art and thus user interfaces are not described in detail here. User interface 101*j* could comprise a touch screen if module 101 operates as a smartphone or mobile phone. For embodiments where module 101 comprises a module for M2M applications and is associated with an M2M service provider 115, then module 101 can optionally omit a user interface 101*j*, since no local user 113 input may be required for many M2M applications, although a user interface 101*j* could be included with module 101. For embodiments where module 101 comprises a mobile phone and is associated with a user 113, the user interface 101*j* could comprise a touch screen on the front of a mobile phone.

Module 101 may be a computing device that includes computer components for the purposes of collecting data from a sensor 101*f* or triggering an action by an actuator 101*y*. Module 101 may include a central processing unit (CPU) 101*b*, a random access memory (RAM) 101*e*, and a system bus 101*d* that couples various system components including the random access memory 101*e* to the processing unit 101*b*. The system bus 101*d* may be any of several types of bus structures including a memory bus or memory controller, a peripheral bus, and a local bus using any of a variety of bus architectures including a data bus. Note that the computer components illustrated for the module 101 in FIG. 1*b* may be selected in order to minimize power consumption and thereby maximize battery life, if module 101 includes a battery and is not attached to external power. In addition, the computer components illustrated for the module 101 in FIG. 1*b* may also be selected in order to optimize the system for both long periods of sleep or idle states relative to active communications and also may be optimized for predominantly uplink (i.e. device to network) communications with small packets or messages. The computer components illustrated for the module 101 in FIG. 1*b* may also be general-purpose computing components, and specialized components may not be required in order to utilize many of the embodiments contemplated herein.

Module 101 may include a read-only memory (ROM) 101*c* which can contain a boot loader program. Although ROM 101*c* is illustrated as "read-only memory", ROM 101*c* could comprise long-term memory storage chipsets or physical units that are designed for writing once and reading many times. As contemplated within the present invention, a read-only address could comprise a ROM 101*c* memory address or another hardware address for read-only operations accessible via bus 101*d*. Changing data recorded in a ROM 101*c* can require a technician have physical access to module 101, such as, but not limited to, removing a cover or part of an enclosure, where the technician can subsequently connect equipment to a circuit board in module 101, including replacing ROM 101*c*. ROM 101*c* could also comprise a nonvolatile memory, such that data is stored within ROM 101*c* even if no electrical power is provided to ROM 101*c*. Although not illustrated in FIG. 1*b*, but illustrated in FIG. 1*c* below, module 101 could also include a flash memory 101*w*. Module program 101*i*, network application 101*x*, operating system 101*h*, eUICC 107, or device drivers 101*g* could be stored in flash memory 101*w* within module 101 when the module is powered off. These components and/or instructions could be moved from a flash memory 101*w* (not shown in FIG. 1*b* but shown in FIG. 1*c*) into RAM 101*e* when the module is powered on by a bootloader program recorded in the ROM 101*c*. Note that ROM 101*c* could be optionally omitted or included in a memory unit within CPU 101*b* (not shown).

Although the exemplary environment described herein employs ROM 101c and RAM 101e, it should be appreciated by those skilled in the art that other types of computer readable media which can store data that is accessible by a module 101, such as, but not limited to, memory cards, subscriber identity module (SIM) cards, local miniaturized hard disks, and the like, may also be used in the exemplary operating environment without departing from the scope of the invention. The memory and associated hardware illustrated in FIG. 1b provide nonvolatile storage of computer-executable instructions, data structures, program modules, module program 101i, and other data for computer or module 101. Note the module 101 may include a physical data connection at the physical interface 101a such as, but not limited to, a miniaturized universal serial bus adapter 101v (illustrated in FIG. 1c), firewire, optical, or other another port.

The computer executable instructions such as, but not limited to, module program 101i, network application 101x, eUICC 107, operating system 101h, or device driver 101g can be initially loaded into memory such as, but not limited to, ROM 101c or RAM 101e through the physical interface 101a before module 101 is given to an end user, shipped by a manufacturer to a distribution channel, or installed by a technician. In addition, the computer executable instructions such as, but not limited to, module program 101i, network application 101x, operating system 101h or device driver 101g could be transferred wirelessly to module 101. In either case (wired or wireless transfer of computer executable instructions), the computer executable instructions such as module program 101i, network application 101x, operating system 101h, or device driver 101g could be stored remotely on a disk drive, solid state drive, or optical disk (external drives not shown).

A number of program modules may be stored in RAM 101e, ROM 101c, or possibly within CPU 101b, including an operating system 101h, device driver 101g, an http client (not shown), a DNS client, and related software. Further, the module program 101i and/or network application 101x can perform the various actions described in the present invention for the module 101 through instructions the module program 101i and/or network application 101x provide to the CPU 101b. A user may enter commands and information into module 101 through an optional user interface 101j, such as a keypad, keyboard (possibly miniaturized for a mobile phone form-factor), and a pointing device. Pointing devices may include a trackball, an electronic pen, or a touch screen.

The module 101, comprising a computer, may operate in a networked environment using logical connections to one or more remote computers, such as the server 105 illustrated in FIG. 1a. Server 105 can also function as a general purpose server to provide files, programs, disk storage, remote memory, and other resources to module 101 usually through a networked connection. Additional remote computers with which module 101 communicates may include another module 101 or mobile device, an M2M node within a capillary network, a personal computer, other servers, a client, a router, a network PC, a peer device, a base station 103, or other common network node. It will be appreciated that the network connections shown throughout the present invention are exemplary and other means of establishing a wireless or wired communications link may be used between mobile devices, computers, servers, corresponding nodes, and similar computers. Although a single module program 101i is depicted in FIG. 1b, module 101 could include a plurality of module programs 101i.

The module program 101i, eUICC 107, and network application 101x operating within module 101 illustrated in FIG. 1b can provide computer executable instructions to hardware such as CPU 101b through a system bus 101d in order for a module 101 to (i) connect with a wireless network 102, (ii) authenticate with a mobile network operator 104 associated with the wireless network 102, and (iii) send or receive packets with a server 105 or a server associated with an eUICC subscription manager 109. The module program 101i and/or network application 101x can enable the module 101 or eUICC 107 to transmit or send data from the eUICC 107 or module 101. The eUICC 107 or module 101 can send data by recording data in memory such as RAM 101e, where the data can include cryptographic data such as a RAND and RES values, a destination IP:port number, a packet or packet header value, an encryption or ciphering algorithm and key, a digital signature algorithm and key, etc. The data recorded in RAM 101e can be subsequently read by the operating system 101h or the device driver 101g. The operating system 101h or the device driver 101g can write the data to a physical interface 101a using a system bus 101d in order to use a physical interface 101a to send data to the wireless network 102 and IP network 111 using a radio 101z (shown in FIG. 1c). Alternatively, the module program 101i and/or network application 101x can write the data directly to the physical interface 101a using the system bus 101d.

The module program 101i, eUICC 107, network application 101x, and/or operating system 101h can include steps to process the data recorded in memory such as, but not limited to, encrypting data, selecting a destination address, or decrypting ciphertext data. The data recorded in memory could also include an eUICC profile 107c or eUICC profile 107d, as described in FIG. 1a above and FIG. 2a below. The eUICC profiles 107d can include instructions and data for connecting with wireless network 102, including network parameters and network access credentials. The module 101 can use the physical interface 101a such as, but not limited to, a radio to transmit or send the data associated with a profile 107d to a base station 103. For those skilled in the art, other steps are possible as well for a module program 101i or operating system 101h to communicate with a wireless network 102 using data associated with an UICC (where an eUICC 107 records data normally associated with a physical UICC) without departing from the scope of the present invention.

Conversely, in order for module 101, network application 101x, or eUICC 107 to receive a packet or message from MNO 104 or wireless network 102, the physical interface 101a can use a radio to receive data from a base station 103. The received data can include information from MNO 104 and may comprise a datagram, a source IP:port number, a packet or header value, an instruction for module 101, an acknowledgement to a packet that module 101 sent, a digital signature, and/or encrypted data. The received data can also include radio resource control (RRC) messages, and related layer 1 and layer 2 access and control messages for module 101 to access the wireless network 102. The operating system 101h or device driver 101g can use a system bus 101d and CPU 101b to record the received data in memory such as RAM 101e, and the module program 101i or operating system 101h may access the memory in order to process the received data and determine the next step for the module 101 after receiving the data. The steps within this paragraph may also describe the steps a module program 101i, eUICC 107, or network application 101x can perform in order to receive a message from wireless network 102 that includes a RAND value. For those skilled in the art, other steps are possible as well for a module program 101*i*, network application 101*x*, module 101, and/or eUICC 107 to receive a message from a mobile network operator 104 or wireless network 102 within the scope of the present invention.

Module program 101*i* can include an eUICC 107, which can provide the functionality or CPU 101*b* instructions for module 101 to access data normally within a physical UICC, such as network parameters and network access credentials. An eUICC 107 as illustrated in FIG. 1*a* and FIG. 1*b* can be implemented within module 101 in several different ways, including (i) as depicted in FIG. 1*b* a module program 101*i* stored in RAM 101*e* during operation, but also recorded in a nonvolatile memory, such as, but not limited to, either flash memory 101*w* (described in FIG. 1*c*) or ROM 101*c* at other times than normal operation (such as during periods of power off), (ii) firmware within CPU 101*b* or another specialized processing unit within module 101, (iii) an "eUICC supporting" physical UICC 108 within module 101 that contains the eUICC 107, or (iv) a specialized circuit within a surface mount package that is soldered directly onto a circuit board of the module 101, including an 8-lead small outline non-leaded (SON-8) package. For the embodiment where an eUICC 107 comprises a module program 101*i*, the eUICC 107 could be loaded and installed within nonvolatile memory 101*w* in module 101 using the steps and procedures described for a module program 101*i* in FIG. 1*b*. Other possibilities exist as well for the physical implementation of an eUICC 107 within a module 101 without departing from the scope of the present invention. An eUICC 107 may also be referred to as an "electronic UICC", an "electronic SIM" (eSIM), or an "embedded SIM" (also eSIM).

For embodiments where an eUICC 107 can be loaded into a RAM 101*e* or flash 101*w* memory, a CPU 101*b* could designate the RAM 101*e* or flash 101*w* memory containing the instructions or data for an eUICC 107 to be a protected memory. When (i) loaded with appropriate data (such as, but not limited to a eUICC profile 107*d* described in FIG. 2*a* below), and (ii) a profile for a MNO 104 is selected and activated, then an eUICC 107 can provide the equivalent functionality of a physical UICC. The eUICC 107, using an activated eUICC profile 107*d*, can provide the module 101 with (i) network access credentials 202 and 203, and (ii) network parameters 201 in order to connect with wireless network 102. The eUICC 107, using an activated eUICC profile 107*d*, can record a first key K 203 (described in FIGS. 2*a* and 3 below) and also a first network module identity 202. The eUICC 107 can support standard steps by module 101 for network authentication contemplated in 3GPP TS 33.401 V12.9.0 and related standards, including inputting a RAND value into the eUICC 107 and outputting a RES value.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices. In addition, the terms "mobile node", "mobile station", "mobile device", "M2M module", "M2M device", "networked sensor", "industrial controller", or "user equipment" can also refer to module 101 or its functional capabilities. Other possibilities exist as well for the configuration or combination of components illustrated in FIG. 1*b* without departing from the scope of the present invention.

FIG. 1*c*

FIG. 1*c* is a graphical illustration of components within a module, in accordance with exemplary embodiments. FIG. 1*c* is illustrated to show a combination of components useful for leveraging the efficient and secure communication techniques described in the present invention. In addition to the components illustrated in FIG. 1*b* above, module 101 can include a an eUICC 107, a battery 101*k*, a MNO public key 502, a wireless module private key 112*a*, a connection to an actuator 101*y*, a USB interface 101*v*, a CPU wake controller 101*u*, a flash memory 101*w*, a symmetric key 127, a random number generator 128, cryptographic algorithms 141, a radio 101*z*, and other components illustrated in FIG. 1*c*. Not all of the components illustrated in FIG. 1*c* are required for many exemplary embodiments, and some of the components illustrated in FIG. 1*c* may also be optionally omitted in some exemplary embodiments.

The CPU 101*b* can comprise a general purpose processor appropriate for the low power consumption requirements of a module 101, and may also function as a microcontroller. CPU 101*b* could be a processor with an ARM® core, or possibly an ATOM® core or processors, and other possibilities exist as well. The CPU 101*b* can include registers, a cache memory, and arithmetic logic units. Clock 160 can comprise a crystal oscillator generating sine or square wave outputs at a frequency to drive a system bus 101*d*, CPU 101*b*, and RAM 101*e*, in addition to other functionality. In exemplary embodiments, clock 160 can comprise a temperature-compensated crystal oscillator (TCXO), a voltage-controlled crystal oscillator (VCXO), or a voltage-controlled temperature-compensated crystal oscillator (VCTCXO), and other possibilities exist as well. Clock 160 could include circuits and logic to keep time while module 101 is both in an active state and a dormant state.

Sensor 101*f* could be a device to collect environmental data or data regarding (i) a monitored unit for M2M applications or (ii) user 113 for applications where module 101 comprises a mobile phone and user 113 is an individual person such as a mobile phone subscriber. Sensor 101*f* could collect data such as, but not limited to, temperature, humidity, pressure, visible light levels, radiation, shock and/or vibration, voltage, current, weight, pH levels, orientation/motion, or the presence of specific chemicals. Sensor 101*f* could also be a microphone. Sensor 101*f* could be a magnetic strip reader for credit cards and similar cards, or an antenna for either near-field RF communications, such as, but not limited to, reading an RF identity tag. An antenna for a sensor 101*f* could also collect longer-range RF signals, such as, but not limited to, reading long-range radio frequency identity tags. Sensor 101*f* could also collect biometric data such as, but not limited to, heart rate, glucose levels, body temperature, or other health measurements for a user 113. The sensor 101*f* can provide data to the CPU 101*b* in the form of analog or digital data, which can be communicated via a system bus 101*d* or physical interface 101*a* and other electrical interfaces are possible as well. A sensor measurement can comprise the analog or digital data collected by CPU 101*b* from sensor 101*f*.

A sensor measurement from sensor 101*f* can include processing of the analog or digital data input CPU 101*b* by sensor 101*f*, such as, but not limited to, averaging over time, using mathematic formulas to convert the raw data from sensor 101*f* into a usable form. Module 101 may also collect sensor data or sensor values using a sensor 101*f* and CPU 101*b*, where the data or values are derived from electrical signals output by a sensor 101*f*. A sensor measurement can comprise the sensor data or sensor values. If module 101 comprises a "point of presence" payment terminal, then a sensor measurement could comprise data read from a payment card. As contemplated herein, the terms "sensor measurement" and "sensor data" can be used interchangeably, and can also be considered functionally equivalent. Although a single sensor 101*f* is shown in FIG. 1*c*, a module 101 could include multiple sensors. Each of the multiple sensors 101*f* could include a sensor identity 151, which could comprise a number or string to identify the sensor 101*f*. A sensor 101*f* could be external to module 101, and also a plurality of sensors 101*f* may be used and they also can connect to module 101 when module 101 uses radio 101*z* as a base station for a WiFi network.

Actuator 101*y* could be a device to control a parameter or state for a monitored unit in M2M applications for module 101, such as, but not limited to, changing a voltage or current, activating a switch or relay, turning on or off a microphone or speaker, activating or deactivating a light, and other examples are well known in the art. Actuator 101*y* could also be a speaker. Actuator 101*y* could be controlled by module 101 via a digital or analog output from CPU 101*b*, which could also be transmitted or sent via system bus 101*d* or a physical interface 101*a*. Although actuator 101*y* is illustrated as external to wireless module 101 in FIG. 1*c*, actuator 101*y* could also be internal to module 101, and module 101 could include multiple actuators 101*y*. A module 101 could include multiple actuators 101*y* each with an actuator identity 152. Sensors and actuators are well known to those of ordinary skill in the art, and thus are not described in additional detail herein.

Module 101 can include a Universal Serial Bus (USB) interface 101*v*. In accordance with an exemplary embodiment, module 101 can comprise a wireless module and include a radio 101*z*. Note that the use of a radio 101*z* is not required for module 101, which could also obtain a connection to the IP Network 111 via a wired line such as Ethernet. Although not illustrated, radio 101*z* could include antennas for reception and transmission of RF signals, and even multiple antennas could be used. Although a single radio 101*z* is illustrated in module 101, module 101 could also contain multiple radios 101*z*. Radio 101*z* can support wireless LAN standards such as, but not limited to, WiFi, Bluetooth, and Zigbee, or similar wireless LAN standards. Note that module 101 may also operate as a base station in a wireless LAN, such as, but not limited to, an 802.11 base station. When module 101 operates a wireless LAN, radio 101*z* can function as either a client/node and/or a base station 103 to support communication from other wireless nodes in physical proximity, such as, but not limited to, other nodes within an exemplary 50 meters. The other wireless nodes could comprise a sensor 101*f* and/or actuator 101*y*, and in this case a sensor could be referred to as a "networked sensor" and an actuator could be referred to as a "networked actuator".

In accordance with exemplary embodiments, module 101 can store module private key 112*a*, MNO public key 502, and module identity 110, and a symmetric key 127 in memory/RAM 101*e* during operation, such as when CPU 101*b* is active and the module 101 is connected to a network such as a wireless network 102 during data transmissions. Module private key 112*a* preferably is recorded in nonvolatile memory such as, but not limited to, flash memory 101*w*, so that module 101 has access to its private key 112*a* after the private key has been derived or loaded, including times when a battery 101*k* has been fully drained or removed from module 101 (if module 101 does not utilize a persistent power source such as land-line power). Symmetric key 127 can be a secure, shared private key for use with symmetric encryption or symmetric ciphering algorithms 211 (in FIG. 2*c* below). Symmetric key 127 may also include an expiration time 133, such that symmetric key 127 may only be used by module 101 and/or eUICC 107 during a limited period of time, such symmetric key 127 remaining only valid for a day, or a week, or during a session (where the session comprises multiple messages and/or responses between a module 101 and a wireless network 102), etc.

Module identity 110 is preferably a unique identifier of module 101, and could comprise a number or string such as, but not limited to, a serial number, an international mobile subscriber identity number (IMSI), international mobile equipment identity (IMEI), or an Ethernet media access control (MAC) address. According to an exemplary embodiment, module identity 110 can also comprise a serial number or string that is written into hardware of module 101 upon manufacturing or distribution of module 101 (also depicted and described in connection with a step 511 in FIG. 5*b* below). In this case, module identity 110 could be recorded in a read only memory 101*c*, where read only memory 101*c* could not be easily erased or otherwise tampered with. Read only memory 101*c* could also comprise a protected memory and the address for accessing the module identity 101 within the ROM 101*c* could comprise a protected address.

A protected address can comprise an address accessible to a CPU 101*b* and readable by CPU 101*b* where the data within the protected address is not modified, changed, or updated by a CPU 101*b* under normal operating conditions. Also note that the protected address can comprise one form of a nonvolatile memory, where a memory records data. In exemplary embodiments module identity 110 may preferably be permanently or persistently associated with the physical hardware of module 101, which can be helpful for the security procedures contemplated herein. Module identity 110 can function as a basic identifier for services from mobile network operator 104, eUICC subscription manager 109, wireless network 102, M2M service provider 115, or server 105 in order to properly identify module 101 among a plurality of modules. Module private key 112*a* and an associated module public key 112*b* could be unique to module 101 and uniquely associated with module identity 110, according to a preferred embodiment.

MNO public key 502 in module 101 could be obtained from downloading the key over the IP Network 111, or optionally also written into nonvolatile memory of module 101 upon manufacture or distribution. MNO public key 502 could be obtained using a domain name or Internet address that is recorded in nonvolatile memory upon the configuration of module 101, such as, but not limited to, during installation or distribution, and module 101 could fetch the MNO public key 502 upon connecting to a wireless network 102 or other connection to the IP Network 111. Additional elements besides those depicted in FIG. 1*c* could also be recorded in volatile memory 101*e*, which could comprise a RAM 101*e*. For example, cryptographic algorithms 141 could also be recorded in RAM 101*e* as well. Note that values and related data can also be recorded in both RAM 101*e* and nonvolatile memory 101*w* at the same time, such that data in nonvolatile memory 101*w* allows module 101 to access the data after a shutdown state, but moving the same data into RAM 101*e* during an active state allows module 101 to more quickly perform operations using a CPU 101*b*. Other possibilities exist as well for the storage location of various values and data elements illustrated in FIG. 1*c* without departing from the scope of the present invention.

Module 101 may also contain cryptographic algorithms 141, which may comprise a suite of algorithms or subroutines that can be utilized for (i) deriving a pair of keys comprising a public key and a private key, (ii) encrypting data using public keys, (iii) decrypting data using private keys, (iv) processing secure hash signatures using private keys, and (v) verifying secure hash signatures using public keys, and related software, firmware, or subroutines for implementing a cryptographic system, including symmetric ciphering algorithms. Cryptographic algorithms 141 could utilize publicly available software libraries within tools such as, but not limited to, OpenSSL maintained by The OpenSSL Project (http://www.openssl.org/), libgcrypt maintained by The Free Software Foundation (http://www.gnu.org/software/libgcrypt/), and similar libraries such as, but not limited to, libmcrypt and Crypto++. Note that cryptographic algorithms 141 could also use proprietary cryptographic libraries as well. In addition to implementing asymmetric encryption/ciphering, such as, but not limited to, used with RSA and ECC cryptography, cryptographic algorithms 141 can provide symmetric ciphering where a shared private key is utilized to both encrypt and decrypt, such as, but not limited to, with the Advanced Encryption Standard (AES) cipher suite.

As illustrated in FIG. 1*c*, module 101 may also contain a random number generator 128. Random number generator 128 may contain a seed 128*b*. The creation of random numbers with a high degree of entropy may be important the use of cryptographic algorithms 141. A plurality of the data as a source for a random number seed 128*b* could be appended together into a "module random seed file" with a combined series or list of states (i.e. a plurality of sensor 101*f* measurements, radio 101*z* measurements, clock 160 times or values, memory 101*e* or memory 101*w* states, operating system 101*h* states, actuator 101*y* states, and/or hardware 101*a* or 101*d* states). Note that values or data for each of the elements listed in the previous sentence could be utilized in a "module random seed file" instead of or in addition to a state. The use of a "module random seed file" with a random number generator 128 is also depicted and described in connection with FIG. 1*d* of U.S. patent application Ser. No. 14/084,141, filed Nov. 19, 2013 in the name of John Nix, which is hereby incorporated by reference in its entirety.

FIG. 1*d*

FIG. 1*d* is a graphical illustration for authenticating with a wireless network using a physical UICC, in accordance with conventional technology. FIG. 1*d* illustrates the components and interfaces for using a physical UICC in order to a module 101 conduct an authentication with a wireless network 102 according to wireless WAN standards which use a pre-shared secret key K recorded in the physical UICC 116. The wireless network could be an LTE, LTE Advanced, or a 3G network, and also based on related standards. With a 3G network, the pre-shared secret key K is also known as "Ki". The module 101 can include a network application 101*x*, a UICC driver 114, and a physical interface supporting the ISO/IEC 7816-3 electrical standards, such as the third edition published on Nov. 1, 2006. The physical UICC 116 can be a smart card in the form factor of a mini-SIM, micro-SIM, or nano-SIM, connected to the physical interface such as ISO/IEC 7816-3 and related electrical standards. The physical interface can include six electrical contacts known as C1 through C6, where C1 provides a power supply to the physical UICC 116, C2 provides a reset signal input, C3 provides a clock signal input, etc. The network application 101*x* can comprise software or firmware for the module 101 to communicate with the wireless network 102 using the standards that include layer 2 messages between module 101 and wireless network 102 such as, but not limited to, radio resource control (RRC) messages, security mode commands, ciphering, and authentication. The network application 101*x* can communicate with a radio 101*z* (described in FIG. 1*c*) using the system bus 101*d*.

A network application 101*x* in a FIG. 1*d* can be similar or equivalent to a network application 101*x* depicted and described in connection with FIG. 1*b*. The UICC driver 114 can comprise a driver within a set of drivers 101*g* within module 101, where drivers 101*g* are also depicted and described in connection with FIG. 1*b*. A physical UICC 116 can support other and additional functionality for a module 101 than the authentication functionality depicted in FIG. 1*b*, such as, but not limited to, (i) recording a set of network parameters equivalent to a set of network parameters 201 in FIG. 2*a* below in order to module 101 to identify and select a wireless network 102, (ii) recording an address book with a list of phone numbers for user 113, (iii) recording a list of recent SMS messages and telephone numbers dialed, and/or (iv) recording and implementing a personal identification number (PIN) in order for a user 113 to authenticate and access the module 101 with the UICC 116, and other functionality of a physical UICC 116 is possible as well. The physical UICC 116 can also include (i) an IP Multimedia Services Identity Module (ISIM) application and data and/or a (ii) Universal Subscriber Identity Module (USIM) application for the module 101 to utilize when communicating with the wireless network 102.

After power-up of the module 101 from a powered off state, the module 101 can use the UICC driver 114 to read data from the physical UICC 116 such as a set of network parameters 203 (depicted in FIG. 2*a* below) as well as an IMSI or equivalent value as a network module identity. The set of network parameters 203 or IMSI in a physical UICC 116 may not be encrypted (or associated with an eUICC profile 107*d*) and the set of network parameters can be directly read by the UICC driver 114. The module 101 can use the set of network parameters to tune a radio 101*z* to particular frequencies for the wireless network 102 and search for a beacon signal from a base station 103. The beacon signal can include codes such as a mobile country code (MCC) and mobile network code (MNC) that can match values in either the network parameters or IMSI. Upon finding and selecting a base station 103, the module 101 can send a random access channel (RACH) message and subsequently an identity value recorded in the physical UICC 116 such as an IMSI, temporary mobile subscriber identity (TMSI), a globally unique temporary identity (GTUI), or a similar value to identify the module 101 using the physical UICC 116 with the wireless network 102.

In order to authenticate a module 101 with the wireless network 102, the wireless network 102 can record a set of authentication tokens or vectors associated with a network identity sent by the module 101, such as a GTUI value. An authentication vector 117 for the module's 101 network identity can comprise a vector or set of values that includes a random number (RAND) 118, response (RES) 119, a network authentication token (AUTN), and a sequence number. The value AUTN and sequence number is not shown in FIG. 1*d* and subsequent figures such as FIG. 1*e* and FIG. 3, but the value AUTN and sequence number can be used by module 101 with a physical UICC 116 or eUICC 107 in order to authenticate the wireless network 102. The sequence number can prevent replay attacks and the AUTN value can comprise a digital signature or message digest value the physical UICC 116 or eUICC 107 can also calculate using the RAND 118 value in order for the module 101 to authenticate the wireless network 102. The values for the authentication vector 117 that includes a RAND 118 and a RES 119 can be calculated by a home subscriber server (HSS) for the mobile network operator 104 associated with the wireless network 102 and provided by the mobile network operator 104 to servers associated with the wireless network 102. An exemplary format for the use of a RAND 118 with a response RES 119 is described in ETSI standard TR 131 900 v.10.0.0 and related documents. Other possibilities exist as well for the format, structure, and data elements within an authentication vector 117 without departing from the scope of the present invention.

In order to conduct an authentication of module 101, after receiving a RACH message and the network module identity such as an IMSI, TMSI, or GTUI value, the wireless network 102 can send a RAND 118 from the authentication vector 117. The module 101 can receive the RAND 118 value using the network application 101x and the radio 101z. The network application 101x can send the RAND 118 value to the UICC driver 114, and the UICC driver 114 can send the RAND 118 value through the physical interface such as ISO/IEC 7816-3 to the physical UICC 116. After receiving the exemplary RAND 118 message, in order to conduct an authentication, module 101 using a physical UICC 116 could take steps to demonstrate to a wireless network 102 that the physical UICC 106 records the same pre-shared secret key K for the network module identity as recorded by a mobile network operator 104 associated with the wireless network 102. Physical UICC 116 can properly respond to the RAND 118 using message digest algorithms by calculating a secure hash value RES 119 using the RAND 118 and the recorded secret key K. The physical UICC 116 could use algorithms specified in ETSI TS 135 205-209, as well as subsequent and related standards, in order for the physical UICC 116 to calculate a secure hash value such as a RES 119. The calculation and processing of a RES 119 using a RAND 118 and a secret key K is also depicted and described in connection with steps 306 and 311 of FIG. 3. Other possibilities exist as well for a physical UICC 116 or an eUICC 107 to calculate a RES 119 value using a RAND 118 and a secret key K without departing from the scope of the present invention.

After the calculation of a RES 119 value in response to the RAND 118, the physical UICC 116 can send the RES 119 to the UICC driver 114 through the physical interface such as ISO/IEC 7816-3. The device driver 114 can send the RES 119 value to the network application 101x and the network application 101x can send the RES 119 value to the wireless network 102 using a radio 101z and the base station 103. The wireless network 102 can take steps to compare the received RES 119 with a recorded RES 119 value in the authentication vector 117. If the received RES 119 matches the recorded RES 119 in the authentication vector 117 then the module 101 with the physical UICC 116 can be considered authenticated. The authentication of module 101 by wireless network 102 is also depicted and described in connection with a step 308a of FIG. 3. After successful authentication, the module 101 and wireless network 102 can then take subsequent steps for a module 101 to have access to the IP network 111 including the public Internet, as well as configuring services such as voice and SMS.

FIG. 1e

FIG. 1e is a graphical illustration for authenticating with a wireless network using an eUICC, in accordance with exemplary embodiments. A module 101 with an eUICC 107 can perform the equivalent steps for authentication with a wireless network 102, such that a module 101 can use an eUICC 107 instead of a physical UICC 116. The wireless network 102 can perform the same steps as (i) recording an authentication vector 117 from a mobile network operator 104 associated with the wireless network 102, (ii) receiving a RACH message and a network module identity such as a GTUI or TMSI from the module 101, (iii) sending values from the authentication vector 117 including a RAND 118, and (iv) receiving a RES 119 and comparing the received RES 119 with a recorded RES 119 in the authentication vector 117 in order to authenticate the module 101 using an eUICC 107 instead of a physical UICC 116. In other words, the use of an eUICC 107 by module 101 can be transparent to a wireless network 102, such that a module 101 with an eUICC 107 instead of a physical UICC 116 can be fully "backward compatible" with standards, software, and infrastructure deployed on a wireless network 102.

A module 101 in FIG. 1e can include a network application 101x, an eUICC driver 129, an eUICC 107, and an operating system 101h. The network application 101x can be equivalent or similar to a network application 101x depicted and described in connection with FIG. 1d and FIG. 1b above. The use of an eUICC 107 instead of a physical UICC 116 within module 101 can also be transparent to network application 101x, via the use of eUICC driver 129. In other words, in exemplary embodiments, the same or equivalent network application 101x can be used for either (i) a module 101 with a physical UICC 116 or (ii) a module 101 with an eUICC 107, since the eUICC driver 129 can perform the identical input and output functions as a UICC driver 114 when communicating with the network application 101x. The use of an eUICC driver 129 is also depicted and described in connection with FIG. 1b above. The eUICC driver 129 can communicate with the network application 101x using the operating system 101h. The internal communication between network application 101x and eUICC driver 129 using an operating system 101h could comprise sharing memory 101e, such that network application 101x writes messages such as, but not limited to, an exemplary RAND 118 value into the shared memory 101e and eUICC driver 129 reads the values from the shared memory 101e. In another embodiment, the internal communication between network application 101x and eUICC driver 129 using an operating system 101h could comprise using loopback UDP ports within operating system 101h, such that network application 101x sends a UDP datagram with the RAND 118 value using a first UPD loopback port, and the eUICC driver 129 receives the UDP datagram with the RAND 118 value using a second UDP loopback port. Similar steps could be taken as well for an eUICC driver 129 to send data such as a RES 119 to the network application 101x using the operating system 101h.

As illustrated in FIG. 1e, eUICC driver 129 can also communicate with the eUICC 107 using the operating system 101h. Two differences between conventional technology illustrated in FIG. 1d and the exemplary embodiment illustrated in FIG. 1e include (i) the eUICC driver 129 communicates with the eUICC 107 using operating system 101h instead of a physical interface such as ISO/IEC 7816-3 and related electrical standards, and (ii) the eUICC 107 can operate as a separate program or application within memory 101e or memory 101w instead of a physically separate application operating on a physical UICC 116. The eUICC driver 129 can communicate with the eUICC 107 using the equivalent steps and procedures for an network application 101x to communicate with an eUICC driver 129 described in the paragraph above, including using shared memory or sending UDP loopback messages on internal UDP loopback ports. Other possibilities for the communication between eUICC driver 129 and eUICC 107 exist as well without departing from the scope of the present invention. In addition, although eUICC driver 129 and eUICC 107 are depicted in FIG. 1e and FIG. 1b as separate elements, programs, and/or processes for a module 101, the eUICC driver 129 could be optionally combined with an eUICC 107 such that the network application 101x can communicate directly with the eUICC 107 using the operating system 101h.

The eUICC 107 can include an eUICC profile 107d which can contain the same information used by a physical UICC 116 in FIG. 1d above, including a set of network parameters, a network module identity, and a key K. In other words, the data recorded in a eUICC 107 in the form of a profile 107d can allow and support the eUICC 107 in FIG. 1e to operate in an equivalent manner as a physical UICC in FIG. 1d for the authentication steps illustrated in FIG. 1d and FIG. 1e. Although not illustrated in FIG. 1e, the eUICC 107 could also perform the similar or equivalent functions of a physical UICC including (i) recording a set of network parameters equivalent to a set of network parameters 201 in FIG. 2a below in order to module 101 to identify and select a wireless network 102, (ii) recording an address book with a list of phone numbers for user 113, (iii) recording a list of recent SMS messages and telephone numbers dialed, and/or (iv) recording and implementing a personal identification number (PIN) in order for a user 113 to authenticate and access the module 101 with the eUICC 107. Other functionality of an eUICC 107 for a module 101 is possible as well without departing from the scope of the present invention.

As illustrated in FIG. 1e, the network application 101x in module 101 can receive a RAND 118 value from wireless network 102 in order to authenticate the module 101. The network application 101x can send the RAND 118 value to the eUICC driver 129. The eUICC 107 can read a RAND 118 value from the network application 101x using the eUICC driver 129. After receiving the exemplary RAND 118 message, in order to conduct an authentication, module 101 using an eUICC 107 could take steps to demonstrate to a wireless network 102 that the module 101 records the same pre-shared secret key K for the network module identity as recorded by a mobile network operator 104 associated with the wireless network 102. eUICC 107 can properly respond to the RAND 118 using message digest algorithms by calculating a secure hash value RES 119 using the RAND 118 and the recorded secret key K from the profile 107d. The eUICC 107 could use algorithms specified in ETSI TS 135 205-209, as well as subsequent and related standards, in order for the eUICC 107 to calculate a secure hash value such as a RES 119. The calculation and processing of a RES 119 using a RAND 118 and a secret key K for an eUICC 107 is also depicted and described in connection with steps 306 and 311 of FIG. 3. Other possibilities exist as well for an eUICC 107 to calculate a RES 119 value using a RAND 118 and a secret key K, without departing from the scope of the present invention. As illustrated in FIG. 1e, the eUICC 107 can send the RES 119 to the eUICC driver 129, and the eUICC driver 129 can send the RES 119 to the network application 101x. The network application 101x can then send the RES 119 to the wireless network 102, and the wireless network 102 could perform a step 308a as depicted and described in connection with FIG. 3 in order to authenticate the module 101 using the eUICC 107 and profile 107d.

FIG. 1f

FIG. 1f is a graphical illustration of an exemplary system that includes a module, a mobile network operator, and an eUICC in accordance with exemplary embodiments. System 199 in FIG. 1f can include a mobile network operator 104 and a module 101. The mobile network operator 104 can communicate with the module 101 using a wireless network 102, and the wireless network 102 could comprise the radio access portion of the mobile network operator 104, such as a collection of base stations 103 using licensed radio spectrum such as, but not limited to, the 700 Mhz band for LTE, and other possibilities exist as well for the wireless network 102. The mobile network operator 104 can include a server 105 with an IP address 106a. The server 105 with MNO 104 in FIG. 1f can comprise a Mobility Management Entity (MME) in LTE networks, or equivalent functionality to receive authentication requests from modules 101 with other wireless wide-area networking technology. The MME can support radio bearer activation/deactivation processes for the module 101 and authenticating the module 101 by recording an authentication vector 117, where the authentication vector 117 can be received from an HSS.

The server 105 can comprise a server as depicted and described in connection with server 105 in FIG. 1k and FIG. 1m of U.S. patent application Ser. No. 14/084,141, filed Nov. 19, 2013 in the name of John Nix, which is hereby incorporated by reference in its entirety. The IP address 106a can include a subnet prefix 106d and an interface identifier 106e. The IP address 106a can comprise an IPv6 address, where the subnet prefix 106d comprises the first 64 bits of a 128 bit IPv6 address, and the interface identifier 106e can comprise the last 64 bits of a 128 bit IPv6 address as shown in FIG. 1f. Other nodes connected to the wireless network 102 can also include IPv6 addresses with different values for the subnet prefix 106d and the interface identifier 106e. A module 101 can include both a network application 101x and an eUICC 107, where a network application 101x is depicted and described in connection with FIG. 1b and an eUICC 107 is depicted and described in connection with FIG. 1a, FIG. 1b, FIG. 1c, and FIG. 1e.

In an exemplary embodiment, different elements within module 101 can be associated with different IP addresses. The network application 101x can be associated with an IP address 106b and the eUICC 107 can be associated with an IP address 106c. The wireless network 102 could assign the module 101 the subnet prefix 106d used by module 101 with wireless network 102, and an operating system 101h could assign the interface identifier 106e used by the network application 101x and the eUICC 107. Other possibilities exist as well for the source of IP addresses in a system 199, but an end result can comprise the eUICC 107 having a unique IPv6 address 106c such that a server 105 such as an MME can communicate with the eUICC 107 directly by sending a packet with a RAND 118 value from server 105 address 106a to eUICC 107 address 106c.

Although not illustrated in FIG. 1f, the exemplary IP addresses for server 105 and eUICC 107 can be associated with port numbers, such that server 105 can use a first port number with the IP address 106a when sending a RAND 118, and eUICC 107 could use a second port number with the IP address 106c when receiving the RAND 118. Server 105 can use a third port number when receiving a RES 119, and eUICC 107 could use a fourth port number when sending the RES 119. The first and third port numbers could be the same value or number, and the second and fourth port numbers could be the same value or number. In an exemplary embodiment, the RAND 118 and RES 119 in system 199 can be formatted according to the UDP Lite protocol, as specified in IETF RFC 3828, which is also incorporated by reference herein. The term "UDP Lite" described in the present invention may also refer to any connectionless protocol supported on IP Network 111 and wireless network 102 where checksums may be partially disabled, thereby supporting the transfer of bit errors within a datagram.

As illustrated in FIG. 1f, an eUICC 107 operating in module 101 could be an application with a unique IPv6 address 106c, and the network application 101x utilize a different IPv6 address 106b. The two IP addresses could be on the same subnet 106d used by a module 101, and the network application 101x could communicate with the eUICC 107 locally within module 101 using the two different IPv6 addresses 106b and 106c. The network application 101x could communicate with the eUICC 107 locally for exemplary "other data" depicted in FIG. 1f, which could comprise the storing of an address book in the eUICC 107, reading a set of network parameters by the network application 101x from the eUICC 107 with the eUICC profile 107d, etc. In an exemplary embodiment, the eUICC 107 could communicate with the mobile network operator 104 for authentication, thus potentially bypassing the network application 101x for separate handling of RAND 118 and RES 119 values depicted in FIG. 1e above. The authentication messages comprising a RAND 118 and a RES 119 could be communicated between the eUICC 107 with IP address 106c to the mobile network operator 104 with IP address 106a without the use of a network application 101x.

The eUICC 107, with an associated IP address 106c could also communicate with the eUICC subscription manager 109 by sending a packet from IP address 106c to an IP address of a server associated with the eUICC subscription manager, such as the exemplary data for a step 205 depicted and described in connection with FIG. 2a and FIG. 3 below. Note that the eUICC 107 with the IP address 106c can communicate with the eUICC subscription manager 109 without the wireless network 102, but rather through an IP network 111. The connectivity for the IP network 111 could be provided by a different wireless network 102 than the wireless network 102 associated with the MNO 104. Although the use of a specific, unique IP address 106c for eUICC 107 is illustrated in FIG. 1f, an eUICC 107 does not require a separate IP address 106c in other embodiments, and the eUICC 107 could share an IP address 106b with a network application 101x or other processes or elements within module 101.

FIG. 2a

Figure 2A:
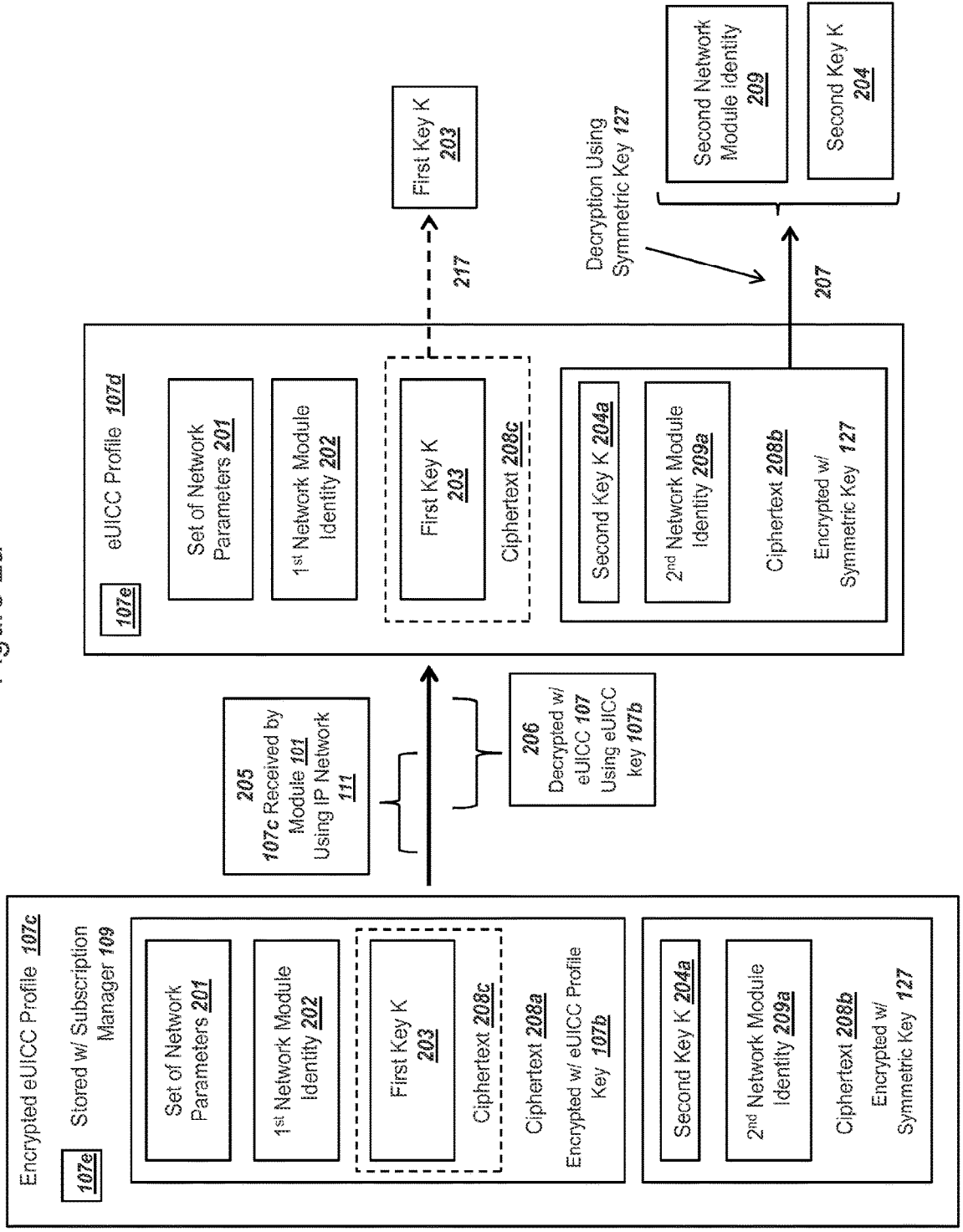
FIG. 2a is a graphical illustration of an exemplary profile for an eUICC, including encrypted data, decryption steps, and decrypted data for the profile, in accordance with exemplary embodiments.

FIG. 2a is a graphical illustration of an exemplary profile for an eUICC, including encrypted data, decryption steps, and decrypted data for the profile, in accordance with exemplary embodiments. Two exemplary forms of an eUICC profile are illustrated in FIG. 2a: an encrypted eUICC profile 107c and an eUICC profile 107d. As contemplated herein, an eUICC profile, such as the exemplary eUICC profile 107c and 107d, can be similar to profiles for an eUICC contemplated in ETSI specification TS 103 383 v12.2.0 and related standards, but with differences to the currently published standards, as described below. An eUICC profile 107d can comprise the data from an encrypted eUICC profile 107c, where (i) a first portion of the data, comprising ciphertext 208a, has been decrypted, and (ii) a second portion of the encrypted eUICC profile 107c, comprising ciphertext 208b remains encrypted. Thus, an encrypted eUICC profile 107c can include a first portion, or ciphertext 208a and a second portion, or ciphertext 208b as depicted in FIG. 2a. As contemplated herein, an encrypted eUICC profile 107c can be referred to as "profile 107c", and the eUICC profile 107d can be referred to as "profile 107d". Both profile 107c and profile 107d can include a profile identity 107e. Profile identity 107e can comprise a number or string such that various elements illustrated in FIG. 1a can properly refer to, select, and or identity a profile 107c or profile 107d, including elements such as a mobile network operator 104, eUICC subscription manager 109, module 101, and/or an eUICC 107.

A profile 107c or profile 107d in exemplary systems herein, including systems 100, 300, and 500 can comprise several different possible embodiments. The profiles could be recorded in a file or data set, and stored in nonvolatile memory associated with an eUICC 107, such as, but not limited to, a flash memory 101w. As transferred across a wireless network 102 and/or IP network 111, the encrypted eUICC profile 107c can be segmented into separate datagrams and transferred using a transport layer protocol such as TCP. An application layer protocol such as transport layer security (TLS) and additional ciphering at the data-link layer could be utilized as well, in addition to sending and receiving the data for a profile 107c as ciphertext 208a and 208b. The exemplary forms for a profile 107c and 107d in FIG. 2a can represent data for a file recorded in a module, such as, but not limited to, (i) storing in a volatile memory 101e when the profiles 107c or 107d are being processed or accessed by a CPU 101b, or (ii) storing in an nonvolatile memory such as flash memory 101w when the profile 107c and 107d are stored long term, including times when a battery 101k may be removed from module 101.

Note that profile 107c with at least two distinct portions, comprising ciphertext 208a and ciphertext 208b, could be recorded in separate segments or in distinct location within module 101 or with an eUICC subscription manager 109, and the two or multiple portions together can comprise a profile 107c. In other words, the portions of ciphertext 208a and 208b (and other data in a profile 107c or profile 107d) can be recorded in different locations while comprising a profile 107c. Other possibilities exist as well for the structure and recording of the exemplary data for a profile 107c and 107d without departing from the scope of the present invention. Although the label "Stored w/Subscription Manager 109" is depicted with an encrypted eUICC profile 107c, the encrypted eUICC profile 107c can also be stored as the format depicted in FIG. 2a within a module 101 or an eUICC 107, until at least a step 206 is performed to decrypt the first ciphertext 208a, as described in this FIG. 2a and FIG. 3 below.

A first portion of profile 107c can include ciphertext 208a, where ciphertext 208a can include a set of network parameters 201, a first network module identity 202, and a first key K 203. Ciphertext 208a can include these elements in a ciphered string or file, such that a third party would not feasibly be able to ready the plaintext within ciphertext 208a without a key such as eUICC profile key 107b. Ciphertext 208a can comprise the set of network parameters 201, the first network module identity 202, and the first key K 203 as plaintext ciphered with a eUICC profile key 107b, as depicted and described in connection with FIG. 2b below. The set of network parameters 201 could comprise a list of values and settings for a module 101 to utilize in connecting with a mobile network operator 104. The set of network parameters 201 could include a list of numbers or strings for values such as (i) allowed frequencies or frequency bands to scan, (ii) preferred access lists for roaming onto other wireless networks, (iii) criteria for a module 101 to select base stations 103 in idle mode, (iv) support for emergency services, (v) supported languages or character encoding, (vi) codes to search for in beacons broadcast by a wireless network 102, (vii) parameters for a radio 101z to use when connecting to a wireless network 102, (viii) names or addresses for a server 105 associated with a MNO 104 in order for a module 101 to send data, etc.

A first network module identity 202 within a ciphertext 208a in profile 107c can comprise a subscriber identity or related identifier of module 101 when connected to a MNO 104 through a wireless network 102. In an exemplary embodiment, the first network module identity 202 can comprise an international mobile subscriber identity (IMSI), a globally unique temporary identity (GTUI), a media access control (MAC) address, a temporary mobile subscriber identity (TMSI) or a similar number or string to identify a module 101 with wireless network 102. Note that a network module identity such as the first network module identity 202 can be different than a module identity 110, such that a network module identity can be assigned by a mobile network operator 104, while a module identity 110 can be assigned by manufacturer. In other words, a network module identity such as the first network module identity 202 can change over time for a module 101, while the module identity 110 can remain the same. The eUICC identity 107a can also remain the same value or number while a network module identity changes.

A first key K 203 within a ciphertext 208a in profile 107c can comprise a standards-based shared secret key K for use in wireless WAN networks based on ETSI, 3GPP, and related standards. As currently specified in ETSI/3GPP standards for LTE and LTE Advanced networks, the shared secret key K, (i) recorded in a SIM or UICC, and a MNO 104 HSS, and (ii) described in 3GPP TS 33.401 V12.9.0 and related standards, comprises a pseudo-random number with a length of 128 bits. The length of key K for standards-based wireless networks 102 may be extended in the future. The use of shared secret key K for authentication of a module 101, and also for ciphering and data integrity, with a wireless network 102 that implements ETSI and/or 3GPP standards is also defined in the specifications ETSI TS 135 205-209 and related standards. Both the first key K 203 and the second key K 204 can comprise a shared secret key K as described in 3GPP TS 33.401 V12.9.0 FIGS. 6.2-1 and related standards. A mobile network operator 104 using the function of an authentication center, possibly within a home subscriber server (HSS) can generate or process authentication vectors 117 comprising an random number (RAND), an authentication token (AUTN), a response (RES), and a sequence number using the first key K 203 recorded in a eUCC profile 107c or 107d for the first network module identity 202. Likewise, authentication vectors 117 can be generated by a HSS and sent to a MME for the second network module identity 209a with the second key K 204.

In exemplary embodiments, the first key K 203 depicted in FIG. 2a is also depicted and described as operating as a standards-based shared secret key K in FIG. 3 below at a step 306. Using the properties of a standards-based key K, a module 101 or an eUICC 107 can use the first key K 203 and a first random number RAND 118 received to process or calculate a first response RES 119. Step 306 with a first key K 203 can comprise an authentication for a module 101 (comprising a "mobile phone", "mobile station", or "user equipment") within standards such as 3GPP TS 33.401 V12.9.0 and related standards using a shared secret key K. As contemplated herein, the use of the term "random number" can comprise a pseudo-random number with a high degree of information entropy that may not be purely mathematically random, but can be considered a random number and referred to as a random number for the purposes herein.

In an exemplary embodiment, as described in FIG. 2e and step 302a of FIG. 3 below, the first key K 203 can be optionally recorded in ciphertext 208a with an additional layer of encryption, such that the first key K 203 is recorded as a ciphertext 208c within ciphertext 208a. In other words, upon conversion of ciphertext 208a into plaintext using a profile deciphering algorithm 206, the first key K 203 can retain an additional layer of encryption as ciphertext 208c with other data in a profile 107d that may be plaintext. This optional additional layer of encryption for the first key K 203 is also depicted within the profile 107d, where ciphertext 208c optionally remains in profile 107d after the conversion of ciphertext 208a into plaintext using a step 206. As described below, the optionally additional layer of encryption for ciphertext 208c with the first key K 203 can be (i) processed into plaintext first key K 203 (ii) after a subsequent deciphering with an asymmetric ciphering algorithm 219 as illustrated in FIG. 2e.

Note that the additional layer of encryption for the first key K 203, in the form of using a ciphertext 208c, can be optionally omitted and the first key K 203 could be plaintext after the conversion of the first portion of profile 107c as ciphertext 208a into plaintext in a profile 107d using a step 206. Thus, the dashed lines around the first key K 203 as a ciphertext 208c indicate the use of ciphertext 208c is optional, depending on the security requirements for an MNO 104 when distributing electronically the first key K 203. In another embodiment as described in FIG. 3, the first key K 203 can comprise a null value, such as the value for a key K in order to support emergency services if module 101 has no valid UICC, and in this case the use of additional encryption via ciphertext 208c can be omitted for a first key K 203. In a related embodiment, the first key K 203 can be omitted entirely from a profile 107c and profile 107d, and the eUICC 107 can subsequently use a null value for the first key K 203.

A second portion of profile 107c can include ciphertext 208b, where ciphertext 208b can include a second key K 204a and a second network module identity 209a. Ciphertext 208b can be ciphered with a symmetric key 127, where the ciphering and deciphering of a portion of ciphertext 208b is depicted and described in connection with FIG. 2c below. In an exemplary embodiment, the second network module identity 209a can comprise an international mobile subscriber identity (IMSI), a globally unique temporary identity (GTUI), a media access control (MAC) address, or similar number or string to identify a module 101. In exemplary embodiments, the second network module identity 209a can be a different number or value than the first network module identity 202. Although the second network module identity 209a is illustrated in FIG. 2a as internal to ciphertext 208b, the second module identity 209a could be external to ciphertext 208b, such as, but not limited to, the second network module identity 209a being within a profile 107c or profile 107d and external to ciphertext 208b. In other words, in exemplary embodiments, the second network module identity 209a may optionally not be ciphered with the symmetric key 127, while the second key K 204a can be ciphered with the symmetric key 127. As contemplated herein, the term second network identity 209a comprises an encrypted second network identity 209a, where the second network identity 209 is the plaintext version of the encrypted second network identity 209a. Likewise, the term second key K 204a comprises an encrypted second key K 204a, where the second key K 204 is the plaintext version of the encrypted second key K 204a.

In another exemplary embodiment, the second network module identity 209 can comprise the same number or value as the first network module identity 202, or the second network module identity 209 can be optionally omitted. In this case, if (A) the second network module identity 209 comprises the same number or value as the first network module identity 202, or the second network module identity 209 is optionally omitted, then (B) the mobile network operator 104 can preferably support the use of two different shared secret keys K (i.e. first key K 203 and second key K 204) for the same network module identity 202. However, given the current functionality of an HSS and related infrastructure for wireless networks 102, the use of two different network module identities (i.e. the first network module identity 202 and the second network module identity 209) with two different shared secret keys K (i.e. first key K 203 and second key K 204, respectively) may be more compatible or suitable for deployed and operational HSS infrastructure.

A second key K 204a (as an encrypted form of plaintext second key K 204) within a ciphertext 208b in profile 107c can comprise a standards-based shared secret key K for use in wireless WAN networks based on ETSI, 3GPP, and related standards. The use of a second key K 204a (in an unencrypted form of second key K 204) can be equivalent to a first key k 203, but comprise a different random number. The second key K 204 can comprise a random number that is 128 bits in length in order to support 4G networks such as LTE that are widely deployed in 2013, although the length of either first key K 203 or second key K 204 may be a longer number in the future, such an exemplary 256 bits and other possibilities exist as well for the key length. A second key K 204 can also be used with standards-based authentication with a wireless network 102, where the second key K 204 in FIG. 2a is also depicted and described as operating as a standards-based shared secret key K in FIG. 3 below at a step 311.

The list of exemplary data for encrypted eUICC profile 107c and an eUICC profile 107d comprises an exemplary set, and the profiles could also include additional data to the exemplary data illustrated in FIG. 2a. The additional data for a profile 107c or 107d could include (i) a set of cryptographic parameters for eUICC 107, (ii) a set of cryptographic algorithms, such as the exemplary cryptographic algorithms described within ETSI TS 135 205-209 and related standards, (iii) a name or address for an eUICC subscription manager 109 associated with the profile 107c, (iv) a name or address for a server 105 associated with a mobile network operator 104, (v) a digital signature of the profile 107d processed with a private key from either eUICC subscription manager 109 or MNO 104, (vi) a date or timestamp for processing the profile 107c or 107d, (vii) and similar or related values for a module 101 and/or eUICC 107 to utilize the profiles. This exemplary additional data which is not depicted in FIG. 2a could be included within or external to any of ciphertext 208a and ciphertext 208b.

Note that the profile identity 107e may preferably be external to ciphertext 208a and ciphertext 208b, in order that module 101 and/or eUICC 107 can take steps to identify a profile 107c or 107d. In addition, although a single profile 107c and profile 107d are illustrated in FIG. 2a, a module 101 and/or an eUICC 107 could include a plurality of profiles 107c and/or 107d, where each of the plurality of profiles could comprise different data associated with different wireless networks 102. In an exemplary embodiment, more than one profile 107c or profile 107d could be associated with the same wireless network 102, such that a mobile network operator 104 can prefer for the same module 101 to utilize different network access credentials over time, such that the same module 101 could use a different key K and a different network module identity with the same wireless network 102 or mobile network operator 104 over time. Different profiles 107c or 107d can also be identified by the use of a different profile identity 107e. Each profile 107c can be associated with an eUICC profile key 107b as an encryption key (shown in FIG. 2b below), although multiple profiles 107c could also share the same eUICC profile key 107b.

A module 101 can receive a profile 107c using a step 205. A profile 107c can be recorded with an eUICC subscription manager 109 before being received by a module 101. As depicted in FIG. 2a, a module 101 can receive the profile 107c at a step 205 using the IP network 111. The use of a step 205 by a module 101 is depicted and described in connection with FIG. 3 below. The module 101 can receive the profile 107c using a network that is different than wireless network 102 associated with the network access credentials comprising the first key K 203 and the first network module identity 202. In an exemplary embodiment, module 101 can receive the profile 107c in a step 205 using an initial wireless network 102, where module 101 connects with and authenticates with the initial wireless network 102 using an initial eUICC profile 107d different than the eUICC profile 107d depicted in FIG. 2a. Or, module 101 could receive a profile 107c using a wireless LAN network or a wired connection via a physical interface 101a such as a USB interface 101v. In another exemplary embodiment, module 101 can receive the profile 107c from a manufacturer, distributor, end user, or technician taking steps to load the profile 107c into a nonvolatile memory within module 101 or eUICC 107. Upon receipt of a profile 107c by module 101, the module 101 can record or store the profile 107c with an eUICC 107.

A module 101 can use an eUICC 107 to decrypt the first portion or ciphertext 208a in a profile 107c using a step 206. Before a step 206, a module 101 can receive an eUICC profile key 107b, where the eUICC profile key 107b can comprise a symmetric ciphering key. The use of a step 206 by module 101 and/or eUICC 107 is also depicted and described in connection with FIG. 2b and FIG. 3 below. Note that both eUICC subscription manager 109 and module 101 can record profile 107c with ciphertext 208a for a period of time, and the step 206 can be taken (i) after receiving eUICC profile key 107b and (ii) before module 101 authenticates with a wireless network 102 using the eUICC profile 107c. A step 206 can covert the ciphertext 208a into plaintext, such that an eUICC 107 can read the values in order to authenticate with a wireless network 102 using the first key K 203. By encrypting the first network module identity 202 and the first key K 203, these network access credentials can remain secure, such that a profile 107c can be transferred in normal physical media (such as disks, drives, or files transferred electronically) or in communications channels outside the control of a mobile network operator 104 and/or eUICC subscription manager 109.

As depicted in FIG. 2a, after a step 206 to convert profile 107c into profile 107d, where the ciphertext 208a is decrypted using the eUICC profile key 107b, the ciphertext 208b with the second key K 204a can remain encrypted and thus the second key K can continue to remain secure within a profile 107d. In addition, although ciphertext 208b is depicted in a profile 107c as external to, or separate from, ciphertext 208a, ciphertext 208b could optionally be included within ciphertext 208a. In this case, where ciphertext 208b is within ciphertext 208a for a profile 107c, the result of a step 206 to generate a profile 107d can remain the same, where the ciphertext 208a can be decrypted by step 206 and ciphertext 208b remains encrypted in the resulting profile 107d from a step 206.

A module 101 can use an eUICC 107 to decrypt the second portion or ciphertext 208b in a profile 107d using a step 207. Before a step 207, a module 101 can take the previous steps 205 and 206 in order to record a profile 107d with an eUICC 107. Before a step 207, module 101 can receive a symmetric key 127, where the symmetric key 127 can comprise a symmetric ciphering key. In exemplary embodiments, module 101 can receive the symmetric key 127 from a mobile network operator 104 after a user associated with module 101 performs a separate authentication step 308b as depicted and described in connection with FIG. 3 and FIG. 4 below. By a mobile network operator 104 only sending symmetric key 127 after the second authentication step 308b, the second key K 204 can remain secured, while a user is allowed to access the wireless network 102 (perhaps temporarily or with other constraints such as limiting access to the Internet but allowing emergency calls) using the first key K 203.

In this manner and by using a second, separate authentication step 308b before sending symmetric key 127, the decryption of network access credentials such as the second key K 204 can remain in the control of a mobile network operator 104, thereby increasing the security of exemplary systems illustrated herein, such as systems 100, 300, and 500. By ciphering the second key K 204 with symmetric key 127, security over conventional technology for an eUICC can be increased for both a user and a mobile network operator. With conventional technology for an eUICC, where only the first key K 203 is used for authentication and ciphering of data between module 101 and wireless network 102, the decryption of the first key K 203 can be outside the control of a mobile network operator 104. With conventional technology contemplated for an eUICC, an end user outside the control or a contractual relationship with mobile network operator 104, including possibly fraudulent users or imposters of valid users, could (i) take steps to obtain a plaintext first key K 203 and associated plaintext first network module identity 202 and (ii) use the credentials to fraudulently access the wireless network 102. In contrast and as contemplated herein, the symmetric key 127 to decrypt the second key K 204a can preferably be only made available to users who authenticate with mobile network operator using a step 308b as described below (or an equivalent step or related commercial arrangements between a user and a mobile network operator 104).

In exemplary embodiments, use of two sets of network access credentials comprising at least the first key K 203 and the second key K 204 allows a user with an eUICC profile 107c to connect to the wireless network 102 using the first key K 203, such that the module 101 can have connectivity to the mobile network operator 104 via the wireless network 102 (and also IP network 111) in order to conduct separate authentication steps 308b. The security steps for a mobile network operator 104 to control the decryption of the first key K 203 can be lowered (thus making the distribution of profile 107c simpler, less costly, and less complex), while a mobile network operator 104 can retain full control over the decryption of the second key K 204a into a usable second key K 204 associated with the second network module identity 209.

The use of a step 207 by module 101 with an eUICC is also depicted and described in connection with FIG. 2c and FIG. 3 below. A module 101 can record profile 107d with ciphertext 208b for a period of time, and the step 207 can be taken (i) after recording profile 107d, and (ii) before module 101 authenticates with a wireless network 102 using the second key K 204. A step 207 can covert the ciphertext 208b into plaintext, such that an eUICC 107 can read the values in order to authenticate with a wireless network 102 using the second key K 204.

A step 207 can convert the encrypted second key K 204a into a plaintext key K 204. As illustrated in FIG. 2a, a step 207 can also convert the encrypted network module identity 209a into a plaintext network module identity 209 as well. As discussed above in this FIG. 2a, the network module 209 can be optionally omitted from a step 207, such that the plaintext network module identity 209 could be recorded in a profile 107d, and the plaintext network module identity 209 could be included in the first portion, or ciphertext 208a, in a profile 107c. In another embodiment, the second network module identity 209 can be received by module 101 from wireless network 102 after the module authenticates using the first key K 203. Although not illustrated in FIG. 2a, an eUICC 107 can continue to record the plaintext network module identity 209 and plaintext second key K 204 in an eUICC profile after the second key K 204 is decrypted using the symmetric key 127. The module 101 can record the second key K 204 in a protected memory address within ROM 101c or nonvolatile memory 101w.

For embodiments where the first key K 203 is recorded within a ciphertext 208c in a profile 107d after a step 206, the first key K 203 can be converted from ciphertext 208c into a plaintext first key K 203 using a key deciphering step 217 as depicted and described in connection with FIG. 2e below. The key deciphering step 217 could use an asymmetric ciphering algorithm 219 with input of (i) ciphertext 208c and (ii) the eUICC private key 215 in order to output the plaintext first key K 203. As described above, the use of a ciphertext 208c can be optionally omitted, and the first key K 203 could be recorded as plaintext in a profile 107d. In this case, a step 217 for data in profile 107d can be omitted, and thus step 217 with ciphertext 209c is depicted in FIG. 2a with a dashed line.

Although the first key K 203 and the second key K 204a are depicted in FIG. 2a as recorded within an eUICC profile 107c or eUICC profile 107d, the first key K 203 and the second key K 204a can be (i) recorded in a nonvolatile memory of module 101, such as, but not limited to, a flash memory 101w, and (ii) without the use of an eUICC 107. In other words, embodiments contemplated herein can be used without an eUICC 107, such that (i) a module 101 can use a first key K 203 to authenticated with a wireless network 102, (ii) after authentication with the first key K 203, the module can receive a symmetric key 127 to decrypt the second key K 204a into second key K 204, and (iii) the module can authenticate with the wireless network 102 using the second key K 204. In other words, an eUICC 107 can be omitted and a module 101 can perform the same steps for (i) receiving encrypted network access credentials and (ii) decrypting the encrypted network access credentials without requiring the use of an eUICC 107.

In embodiments where a module 101 does not include an eUICC 107, the module can record the first key K 203 and the encrypted second key K 204a in a file or memory address without requiring the use of a profile 107c and 107d. For example, the first key K 203 could be recorded in a regular, physical UICC, and the second key K 204a could also be recorded in a regular, physical UICC as well. The regular, physical UICC could (i) receive the symmetric key 127 and decrypt the second key K 204a, and (ii) subsequently record the decrypted second key K 204. The module 101 and UICC could use the decrypted second key K 204 to authenticate with the wireless network 102 where the first key K 203 was previously used. Other possibilities exist as well for a module 101 to (i) use a first key K 203 and an encrypted second key K 204a without departing from the scope of the present invention.

FIG. 2b

Figure 2B:
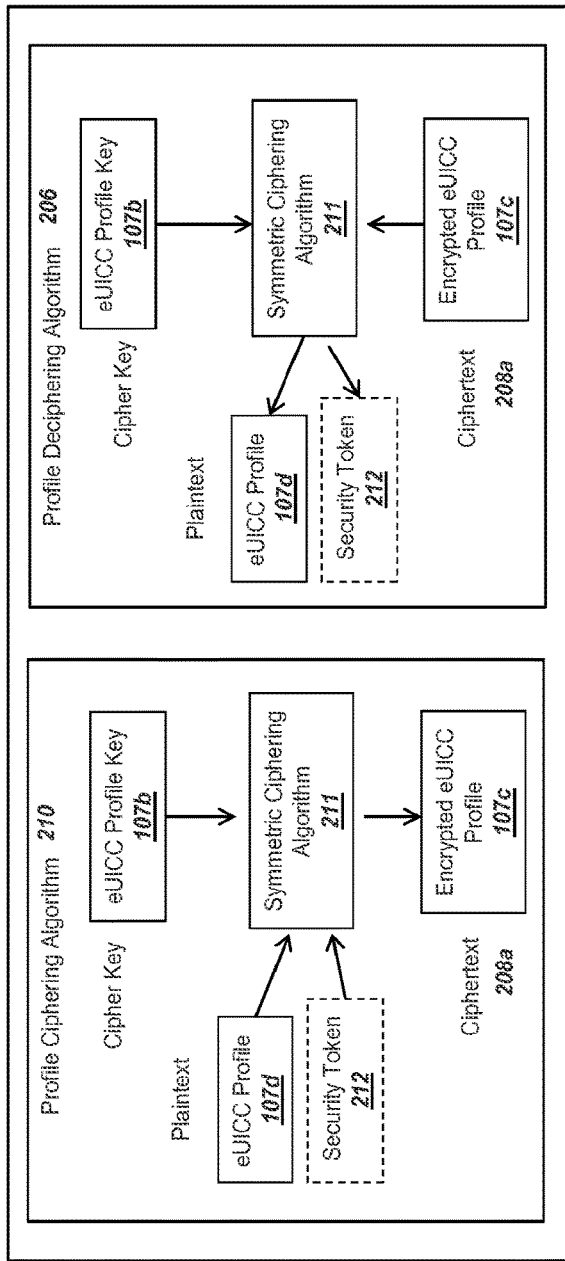
FIG. 2b is a graphical illustration for ciphering and deciphering a profile using a symmetric ciphering algorithm with input of a key, in accordance with exemplary embodiments.

FIG. 2b is a graphical illustration for ciphering and deciphering a profile using a symmetric ciphering algorithm with input of a key, in accordance with exemplary embodiments. An eUICC profile 107d can be (i) ciphered using a profile ciphering algorithm 210 and (ii) deciphered with a profile deciphering algorithm 206. Both the profile ciphering algorithm 210 and the profile deciphering algorithm 206 can include a symmetric ciphering algorithm 211 and the use of an eUICC profile key 107b. An eUICC subscription manager 109, or another node outside a module 101 as illustrated in FIG. 1a, can use a profile ciphering algorithm 210 to encrypt an eUICC profile 107c. The processing and computational steps for performing a profile ciphering algorithm 210 could be conducted on a server associated with the eUICC subscription manager 109. The server associated with the eUICC subscription manager 109 can be similar to a server 105 illustrated in FIG. 1a, with the difference being the server associated with the eUICC subscription manager 109 can be co-located, associated with, or under the operational control of an eUICC subscription manager 109. Data for an eUICC profile 107d used in a profile ciphering algorithm 210 can comprise the exemplary data illustrated for a profile 107d in FIG. 2a above, and an eUICC subscription manager 109 could receive the data for the profile 107d from a mobile network operator 104. The mobile network operator 104 could process, generate, or derive the exemplary values in a profile 107d that can include the network parameters 201, the first network module identity 202, the first key K 203, and the ciphertext 208b. As contemplated herein, the MNO 104 could also function as a eUICC subscription manager 109, and thus in embodiments the profile 107d could be generated by a MNO 104 as well.

Symmetric ciphering algorithm 211 in a profile ciphering algorithm 210 can utilize a key such as an eUICC profile key 107b to encrypt or cipher data. Examples of symmetric ciphers for a symmetric ciphering algorithm 210 include (i) an Advanced Encryption Standard (AES) cipher, as specified in Federal Information Processing Standards (FIPS) Publication 197, and (ii) Triple Data Encryption Standard (Triple DES), as described in NIST Special Publication 800-67 Revision 1, "Recommendation for the Triple Data Encryption Algorithm (TDEA) Block Cipher (Revised January 2012)". Other symmetric ciphers and/or combinations of symmetric ciphers can be utilized as well for a symmetric ciphering algorithm 210 without departing from the scope of the present invention. In general, a symmetric ciphering algorithm 211 in a profile ciphering algorithm 210 (and other steps for symmetric ciphering contemplated herein) can accept input of plaintext and a key, and using the two sets of input data, the symmetric ciphering algorithm 211 can perform multiple rounds of mixing, substituting, rotating, and/or perform XOR functions with the input in order to produce a ciphertext output. Although not illustrated in FIG. 2b and FIG. 2c, a set of cryptographic parameters can also be input into symmetric ciphering algorithms 211 in order to specify parameters or configurations of the symmetric ciphering algorithm 211, such as, but not limited to, the selection of 128, 192, or 256 bits with AES.

A cipher key used with a symmetric ciphering algorithm 211, such as, but not limited to, the exemplary eUICC profile key 107b can comprise a random or pseudo-random number, with an appropriate length or number of bits for the symmetric ciphering algorithm 211. The exemplary eUICC profile key 107b for use in a profile ciphering algorithm 210 could be shared between an eUICC subscription manager 109 and an eUICC 107 in a module 101 in several different ways. The eUICC profile key 107b could be recorded in or with the eUICC 107 upon manufacturing of module 101. The eUICC profile key 107b could be securely received by a module 101 using a wireless network 102 from the eUICC subscription manager 109 before the module 101 performs a step that includes a profile deciphering algorithm 206. An encrypted eUICC profile key 107b could be received by module 101 and then decrypted by module 101 using an asymmetric ciphering algorithm 219 as depicted and described in connection with FIG. 2e below. The eUICC profile key 107b could also be derived by a module 101 and an eUICC subscription manager 109 (or another server performing the steps in a profile ciphering algorithm 210) using a key exchange such as, but not limited to, a Diffie-Hellman key exchange or an Elliptic Curve Diffie-Hellman key exchange.

Other possibilities exist as well for a module 101 and an eUICC subscription manager 109 (or another server performing the steps in a profile ciphering algorithm 210) to securely share a eUICC profile key 107b without departing from the scope of the present invention. In addition, although a single eUICC profile key 107b is illustrated in FIG. 2b, an eUICC subscription manager 109 and an eUICC 107 could use multiple eUICC profile keys 107b, including embodiments where a first encrypted eUICC profile 107c is associated with a first eUICC profile key 107b and a second encrypted eUICC profile 107c is associated with a second eUICC profile key 107b. Further, each encrypted eUICC profile 107c could be uniquely associated with a different eUICC profile key 107b. Each of the different eUICC profile keys 107b could be securely transferred between the eUICC 107 and the eUICC subscription manager 109 using either (i) asymmetric ciphering 219 as illustrated in FIG. 2e below, or (ii) a key exchange, as depicted and described in connection with step 303 of FIG. 3 below.

With a profile ciphering algorithm 210, the symmetric ciphering algorithm 211 can accept input of (i) the eUICC profile key 107b, and (ii) and an eUICC profile 107d plus an optional security token 212, in order to output an encrypted eUICC profile 107c. The encrypted eUICC profile 107c can be reasonably secured, such that deciphering the profile 107c without the eUICC profile key 107b would be infeasible. After ciphering with a symmetric ciphering algorithm 211, deciphering the ciphertext without the cipher key would require extensive dedicated computational resources such as hundreds of servers or more for many years or longer. The optional security token 212 can include a string or number in order to enhance the security of the ciphertext output by a symmetric ciphering algorithm 211. The optional security token 211 could comprise a random number or other value, such that the input and output of a symmetric ciphering algorithm 211 is properly padded, where the length of input and output are appropriate for the symmetric ciphering algorithm.

Although the input of eUICC profile 107d is depicted in FIG. 2b with a label of "plaintext", the eUICC profile 107d in a profile ciphering algorithm 210, the "plaintext" eUICC profile 107d can include encrypted data such as ciphertext 208b, where ciphertext 208b can include encrypted data ciphered with a different key than eUICC profile key 107b. In other words, a profile 107c can include multiple layers of ciphering, where different layers use different cipher keys, and the exemplary a profile ciphering algorithm 210 with the eUICC profile key 107b can be used to encrypt the ciphertext 208a illustrated in FIG. 2a above. As noted above with FIG. 2a, ciphertext 208b can be either (i) included inside ciphertext 208a, or (ii) remain external to ciphertext 208a.

After a server associated with an eUICC subscription manager 109 generates the output of an encrypted profile 107c from a profile ciphering algorithm 210, the encrypted profile 107c can be transferred to module 101 through either unsecured channels, or channels that are not under the full control of an eUICC subscription manager 109 or a mobile network operator 104 associated with the profile 107c. The module 101 can receive the profile 107c through an IP network 111, including using the public Internet, or a manufacturer, distributor, technician, or end user could load the profile 107c into the module (such as, but not limited to, using a USB interface 101v). This initial loading of profile 107c by a manufacturer, distributor, technician, or end user may be required for the first use or startup of a module 101, but then module 101 may preferably receive additional or subsequent profiles 107c at later times using IP network 111 and other automated, electronic means using a network including a wireless network 102.

A module 101 or an eUICC 107 within module 101 can process the encrypted profile 107c using a profile deciphering algorithm 206 as depicted in FIG. 2b and also depicted and described in FIG. 2a. Note that the module 101 or eUICC 107 could record the encrypted profile 107c for a period of time, and take the steps to decrypt the profile 107c in a profile deciphering algorithm 206 after receiving the eUICC profile key 107b associated with the profile 107c. Or the eUICC profile key 107b could be recorded in a module 101 or with an eUICC 107 before profile 107c is received, and the steps for a profile deciphering algorithm 206 could be performed after the receipt of an instruction from an eUICC subscription manager 109 or at a specified time or under specified conditions (such as a module 101 needing or preferring to connect to a wireless network 102 for the first time). An exemplary use and sequence for a profile deciphering algorithm 206 is depicted and described in connection with FIG. 3 below. Other possibilities exist as well for the time that a module 101 or an eUICC 107 can process a profile deciphering algorithm 206 without departing from the scope of the present invention. As contemplated herein, the use of the term "step 206" can refer to the use of a profile deciphering algorithm 206, and a "step 207" can refer to the use of a key K deciphering algorithm 207, etc.

A profile deciphering algorithm 206 can include a symmetric ciphering algorithm 211. The symmetric ciphering algorithm 211 can be equivalent to or the same as the symmetric ciphering algorithm 211 in a profile ciphering algorithm 210 operated by a server and as described above. The symmetric ciphering algorithm 211 can accept input of the eUICC profile key 107b as a cipher key. The module 101 or eUICC 107 could securely receive the eUICC profile key 107b using the steps described above in connection with a profile ciphering algorithm 210. An exemplary transfer or key exchange for module 101 to receive eUICC profile key 107b is also described in FIG. 2e and FIG. 3 below. The symmetric ciphering algorithm 211 in a profile deciphering algorithm 206 can also accept input of the encrypted eUICC profile 107c, which could comprise ciphertext 208a.

The symmetric ciphering algorithm 211 in a profile deciphering algorithm 206 can decrypt the ciphertext 208a in order to output the profile 107d, where the ciphertext 208a is converted to plaintext. Ciphertext 208b in a profile 107c can remain encrypted using the symmetric key 127 after a profile deciphering algorithm 206. In other words, the profile deciphering algorithm 206 can convert a portion of the profile 107c into plaintext, where the portion comprises ciphertext 208a. As depicted in FIG. 2a above, exemplary plaintext in a profile 107d resulting from a profile deciphering algorithm 206 can include a first network module identity 202 and the first key K 203. The resulting plaintext from a profile deciphering algorithm 206 can also optionally include a security token 212. Security token 212 could comprise the string or value also optionally input into the symmetric ciphering algorithm 211 in a profile ciphering algorithm 210. The security token 212 can include a padding value to make the length of the security token 212 and profile 107d a desired value for the symmetric ciphering algorithm 211 or other requirements such as making the encrypted profile 107c a desired length.

FIG. 2c

Figure 2C:
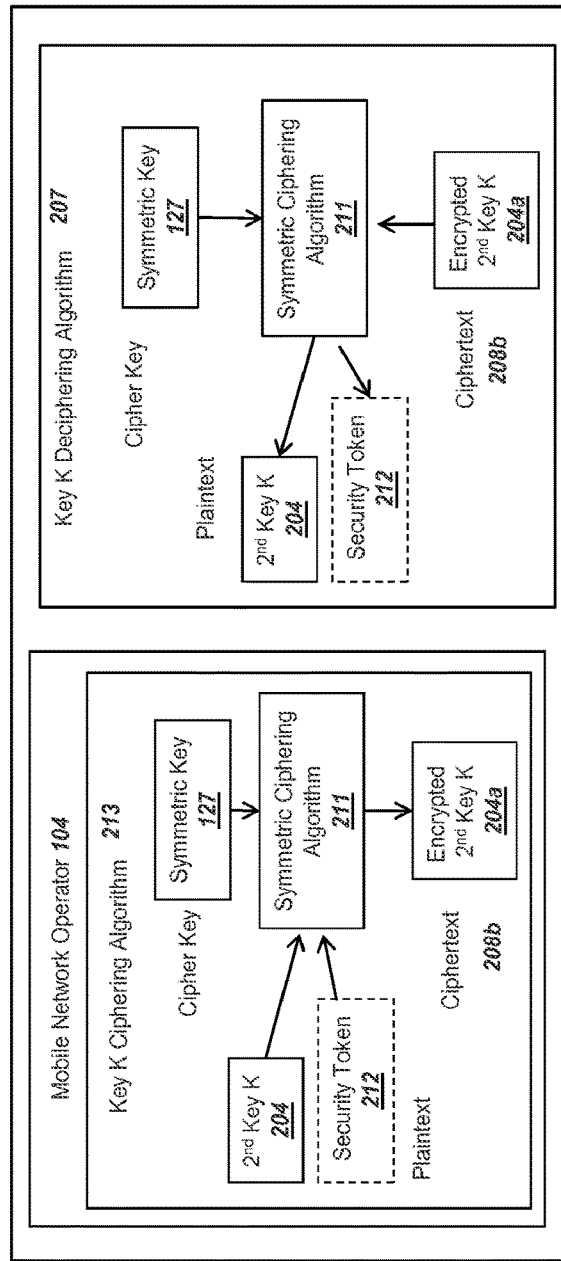
FIG. 2c is a graphical illustration for ciphering and deciphering a key K using a symmetric ciphering algorithm with input of a key, in accordance with exemplary embodiments.

FIG. 2c is a graphical illustration for ciphering and deciphering a key K using a symmetric ciphering algorithm with input of a key, in accordance with exemplary embodiments. A second key K 204a can be (i) ciphered using a key K ciphering algorithm 213 and (ii) deciphered with a key K deciphering algorithm 207. Both the key K ciphering algorithm 213 and the key K deciphering algorithm 207 can include a symmetric ciphering algorithm 211 and the use of a symmetric key 127. A mobile network operator 104 can use a key K ciphering algorithm 213 to encrypt the second key K 204a. The processing and computational steps for performing a key K ciphering algorithm 213 could be conducted on a server associated with the mobile network operator 104 such as a server 105 illustrated in FIG. 1a. Other possibilities exist as well for the location or association of a computer to process a key K ciphering algorithm 213 without departing from the scope of the present invention.

A key K ciphering algorithm 213 can include a symmetric ciphering algorithm 211. The symmetric ciphering algorithm 211 can similar to the symmetric ciphering algorithm 211 as depicted and described in connection with FIG. 2b above. A symmetric ciphering algorithm 211 can include a collection of different symmetric ciphers, such that a first symmetric cipher comprising the AES cipher could be used in a FIG. 2b, while a different symmetric cipher could be used in a FIG. 2c. Or, the same algorithm within symmetric ciphering algorithm 211 can be used in a symmetric ciphering algorithm 211 in FIG. 2b and FIG. 2c. The symmetric ciphering algorithm 211 in a key K ciphering algorithm 213 can accept input of a symmetric key 127 and plaintext in the form of a second key K 204. The second key K 204 could represent a random number, such as, but not limited to, an exemplary 128 random number currently used as a shared secret key K in standard LTE networks and a different length for second key K 204 could be used as well. The second key K 204 could be derived or processed by the function of an authentication center with a home subscriber server (HSS). Although not illustrated in FIG. 2c, but as illustrated in FIG. 2a, the plaintext as input into a symmetric ciphering algorithm 211 can also include a second network module identity 209. The input into a symmetric ciphering algorithm 211 for a key K ciphering algorithm 213 can also include a number, value, or string for a security token 212. The use of a security token 212 is depicted and described in connection with FIG. 2b above. Thus, a mobile network operator 104 could also use a key K ciphering algorithm 213 to encrypt other data in addition to a second key K 204.

The symmetric key 127 input into a symmetric ciphering algorithm 211 in a key K ciphering algorithm 213 can comprise a random number processed or generated by a server 105, where the server 105 is associated with a mobile network operator 104. The server processing or deriving a symmetric key 127 can comprise or be associated with an HSS for an LTE or LTE advanced network. As illustrated in FIG. 2c, the symmetric key 127 can comprise a cipher key for the symmetric ciphering algorithm 211. A cipher key used with a symmetric ciphering algorithm 211, such as, but not limited to, the exemplary symmetric key 127 can comprise a random or pseudo-random number, with an appropriate length or number of bits for the symmetric ciphering algorithm 211 in a key K ciphering algorithm 213. Using the input of the symmetric key 127 and the plaintext second key K 204, the symmetric ciphering algorithm 211 could output an encrypted second key K 204a. As illustrated in FIG. 2c and FIG. 2a above, the encrypted second key K 204a could be included in ciphertext 208b. The symmetric ciphering algorithm 211 in a key K ciphering algorithm 213 may also optionally include a security token 212, as illustrated.

After processing the ciphertext 208b, the mobile network operator 104 can either (i) include the ciphertext 208b in a profile 107d and send the profile 107d to an eUICC subscription manager 109, or (ii) send the ciphertext 208b directly an eUICC subscription manager 109 for the eUICC subscription manager 109 to include the ciphertext 208b in a profile 107d. Ciphertext 208b could be recorded in or with an eUICC profile 107d, where an eUICC subscription manager 109, or another server associated with an eUICC subscription manager 109 can subsequently encrypt the eUICC profile 107d using a profile ciphering algorithm 210 depicted and described in connection with FIG. 2b above. Other possibilities exist as well for the timing an sequence of steps for transferring and recording a ciphertext 208b output from a key K ciphering algorithm 213 without departing from the scope of the present invention. After profile 107d with ciphertext 208b has been created, the profile 107d can be ciphered with a profile ciphering algorithm 210 to create an encrypted profile 107c, as illustrated in FIG. 2b above.

The exemplary symmetric key 127 for use in a key K ciphering algorithm 213 could be shared between a module 101 with an eUICC 107 and the mobile network operator 104 in several different ways. The symmetric key 127 could be sent from the mobile network operator 104 (possibly using a server 105) to a module 101 after (i) the module properly authenticates with the mobile network operator 104 and/or a wireless network 102 associated with the MNO 104 using the first key K 203, and (ii) a user 113 associated with the module 101 authenticates with the MNO 104. Note that if MNO 104 sends the symmetric key 127 to module 101 after module 101 uses the first key K 203 to authenticate, then the ciphering or encryption of the channel used to send the symmetric key K 127 can be within the control of MNO 104 (whereas the communications channel and ciphering keys used to send encrypted profile 107c may be outside the control of MNO 104). The symmetric key K 127 could also be derived by a module 101 and an MNO 104 using a key exchange, where the symmetric key K 127 could be derived using a RAND 118 value received by the module 101 after authenticating with the first key K 203, where the module 101 and/or eUICC 107 derives the symmetric key K 127 using the RAND 118 value and the first key K 203. Other possibilities exist as well for a module 101 and a mobile network operator 104 to securely share a symmetric key 127 without departing from the scope of the present invention.

A module 101 or an eUICC 107 within module 101 can process the ciphertext 208b using a key K deciphering algorithm 207 as depicted in FIG. 2c. Note that the module 101 or eUICC 107 could record the ciphertext 208b for a period of time, and take the steps to decrypt the ciphertext 208b with a key K deciphering algorithm 207 after receiving or deriving the symmetric key 127. Or the symmetric key 127 could be recorded in a module 101 or with an eUICC 107 before ciphertext 208b is decrypted, and the steps for a key K deciphering algorithm 207 could be performed after the receipt of an instruction from the MNO 104 to decrypt the second key K 204a. An exemplary use and sequence for a key K deciphering algorithm 207 is depicted and described in connection with FIG. 3 below. Other possibilities exist as well for the time that a module 101 or an eUICC 107 can process a key K deciphering algorithm 207 without departing from the scope of the present invention.

A key K deciphering algorithm 207 can include a symmetric ciphering algorithm 211. The symmetric ciphering algorithm 211 can be equivalent to or the same as the symmetric ciphering algorithm 211 in a key K ciphering algorithm 213 performed by an MNO 104 and as described in this FIG. 2c above. The symmetric ciphering algorithm 211 can accept input of the symmetric key 127 as a cipher key. The module 101 or eUICC 107 could securely receive or derived the symmetric key 127 using the steps described above in connection with a key K ciphering algorithm 213. The symmetric ciphering algorithm 211 in a key K deciphering algorithm 207 can also accept input of the encrypted key K 204a, which could comprise ciphertext 208b. Additional data, such as, but not limited to a second module identity 209a could optionally be included within ciphertext 208b.

The symmetric ciphering algorithm 211 in a key K deciphering algorithm 207 can decrypt the ciphertext 208b in order to output the plaintext second key K 204, such that the ciphertext 208b is converted to plaintext. The resulting plaintext from a key K deciphering algorithm 207 can also optionally include a security token 212. Security token 212 could comprise the string or value also optionally input into the symmetric ciphering algorithm 211 in a key K ciphering algorithm 213. The security token 212 can include a padding value to make the length of the security token 212 and second key K 204a a desired value for the symmetric ciphering algorithm 211 or other requirements such as making the ciphertext 208b a desired length.

FIG. 2d

Figure 2D:
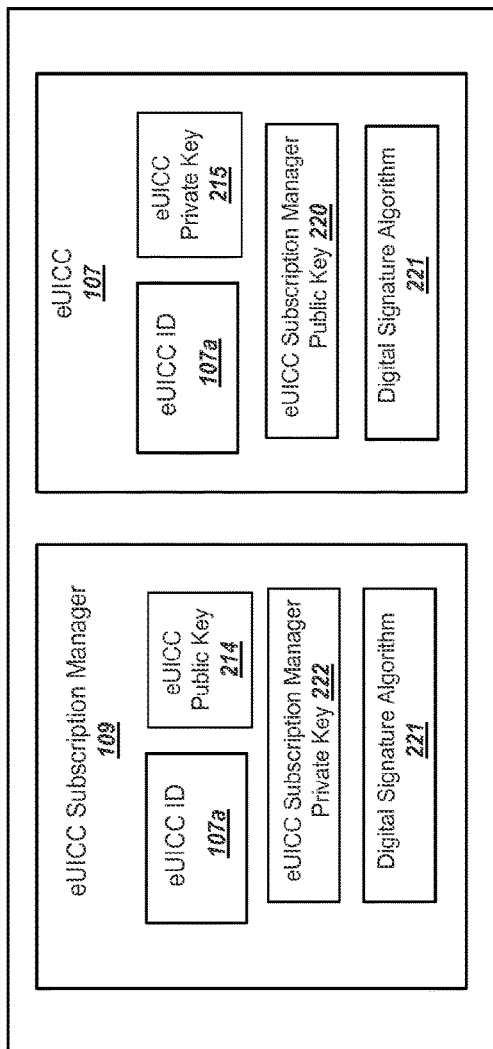
FIG. 2d is a graphical illustration of a public key and a private key for an eUICC, in accordance with exemplary embodiments.
Figure 2E:
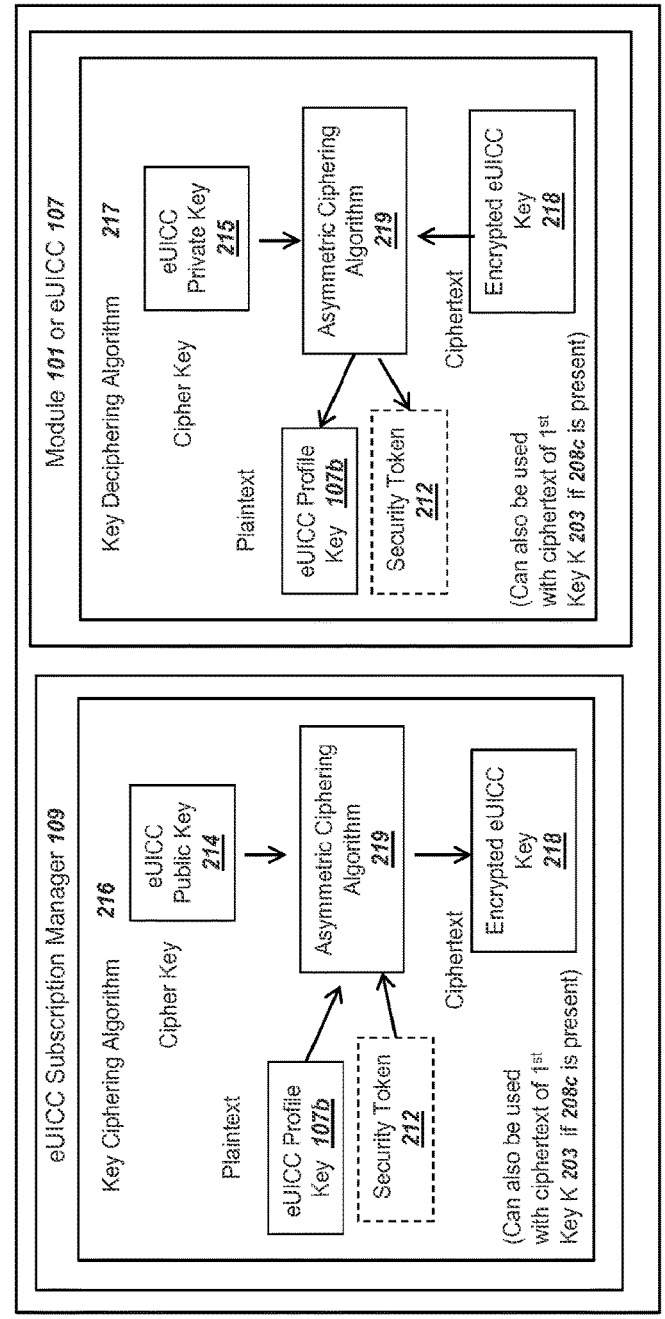
FIG. 2e is a graphical illustration for ciphering and deciphering a key for an eUICC using an asymmetric ciphering algorithm using a PKI key pair, in accordance with exemplary embodiments.

FIG. 2d is a graphical illustration of a public key and a private key for an eUICC, in accordance with exemplary embodiments. An eUICC 107 within a module 101 can include an eUICC private key 215, which can be associated with an eUICC public key 214. The eUICC private key 215 and eUICC public key 214 can comprise a public key infrastructure (PKI) key pair for eUICC 107. The eUICC subscription manager 109 can record the eUICC public key 214 along with an eUICC identity 107a, such that the eUICC subscription manager 109 can properly associate one of a plurality of eUICC public keys 214 with the proper eUICC 107. Although not illustrated in FIG. 2d, an eUICC subscription manager 109 could record the eUICC public key 214 and an associated eUICC identity 107a in a database.

The use of an eUICC ID 107*a* is also depicted and described in connection with FIG. 3 below.

The eUICC private key 215 and eUICC public key 214 could be processed using RSA algorithms or elliptic curve cryptography (ECC) algorithms, and other possibilities exist as well for the format of PKI keys without departing from the scope of the present invention. An ECC key length of 283 bits provides security similar to an RSA key length of approximately 2048 bits, and in an exemplary embodiment the eUICC key pair can utilize an ECC algorithm, although an RSA algorithm or other algorithms for PKI keys could also be utilized by an eUICC 107. The eUICC private key 215 can be processed or derived using a random number. eUICC public key 214 can comprise a key recorded in an X.509 certificate that also includes a module identity 110 and/or eUICC identity 107*a*, although the use of an X.509 certificate with an eUICC public key 214 is not required. The eUICC public key 214 in the form of an X.509 certificate can optionally be signed by a certificate authority. The keys can support standards such as, but not limited to, the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards.

Several possibilities exist for the source of an eUICC private key 215 and eUICC public key 214. The eUICC private key 215 and eUICC public key 214 be generated using standard software tools such as, but not limited to, Openssl, libmcrypt, and/or and Crypto++, and other tools to generate public and private keys exist as well. Public and private keys as contemplated herein could be recorded in a file such as, but not limited to, a *.pem file (Privacy-enhanced Electronic Mail), a file formatted according to Basic Encoding Rules (BER), Canonical Encoding Rules (CER), or Distinguished Encoding Rules (DER), or as text or binary file. Other formats for public and private keys may be utilized as well, including proprietary formats. A module 101 could derive the PKI key pair using a set of cryptographic algorithms and a key pair generation algorithm. The module 101 could derive the PKI key pair using a random number generator 128 and a set of cryptographic algorithms 141, where the random number generator 128 uses input from a sensor 101*f* and/or a clock 160 in order to obtain a random number with a high degree of information entropy.

A manufacturer of module 101 or an eUICC subscription manager 109 could also derive the eUICC private key 215 and eUICC public key 214 in a server, and load the eUICC private key 215 into a nonvolatile memory of module 101 before distribution of the module 101. The manufacturer of module 101 could send or make available the eUICC public key 214 to an eUICC subscription manager 109. The module 101 could send record the eUICC public key 214 and send the eUICC public key 214 along with the eUICC identity 107*a* (possibly with or in the form of a module identity 110) to an eUICC subscription manager 109 before the module 101 receives the encrypted eUICC profile 170*c*.

Although FIG. 2*d* illustrates an eUICC private key 215 and eUICC public key 214, a module 101 could use a PKI key pair associated with module 101 instead of being associated with an eUICC 107 in order to use an asymmetric ciphering algorithm as depicted in FIG. 2*e* below. In other words, a module 101 and an eUICC subscription manager 109 could use a module private key 112*a* and a module public key 112*b* in order to obtain the same functionality of an eUICC private key 215 and an eUICC public key 214. A module private key 112*a* and a module public key 112*b* for a module 101 could have the same properties and characteristics for an eUICC private key 215 and an eUICC public key 214 as described herein. Other possibilities exist as well for the source or use of a PKI key pair for an eUICC private key 215 and eUICC public key 214 without departing from the scope of the present invention.

In exemplary embodiments, both the eUICC subscription manager 109 and the eUICC 107 can include a set of digital signature algorithms 221, in order to sign and verify messages between (i) an eUICC 107 and eUICC subscription manager 109, and (ii) eUICC subscription manger 109 and MNO 104. Digital signature algorithms 221 can also verify signatures such as, but not limited to, comparing that (i) a first secure hash value received from a sending node matches (ii) a second secure hash value calculated using a recorded public key associated with the sending node. Digital signature algorithms 221 can utilize algorithms in National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". The use of ECDSA algorithm within a set of digital signature algorithms 221 may be preferred if keys such as, but not limited to, eUICC private key 215 and eUICC public key 214 are based on elliptic curve cryptography. Digital signature algorithms 221 could also include an RSA digital signature algorithm (DSA) for use with RSA-based public and private keys. Other PKI standards or proprietary techniques for securely generating digital signatures and verifying digital signatures may be utilized as well in digital signature algorithms 221. As depicted and described in connection with FIG. 3 below, a digital signature algorithm 221 can be used in a step 205 in order to authenticate an eUICC 107 operating in a module 101 with an eUICC subscription manager 109.

As illustrated in FIG. 2*d*, the eUICC subscription manager 109 may also be associated with an eUICC subscription manager public key 220 and an eUICC subscription manager private key 222, and the two keys can comprise a PKI key pair for the eUICC subscription manager 109. The eUICC subscription manager public key 220 and an eUICC subscription manager private key 222 can be formatted and processed by algorithms equivalent or similar to the algorithms and format for the eUICC public key 214 and the eUICC private key 215 described in this FIG. 2*d* above. The eUICC subscription manager public key 220 can optionally be signed by a certificate authority. An eUICC 107 can use the digital signature algorithms 221 and the eUICC subscription manager public key 220 to verify a digital signature from the eUICC subscription manager 109. Although not illustrated in FIG. 2*d*, the eUICC 107 or module 101 could also record a public key associated with the mobile network operator 104, and use the public key associated with the mobile network operator 104 to verify a digital signature from the mobile network operator 104 using the digital signature algorithms 221.

FIG. 2*e*

FIG. 2*e* is a graphical illustration for ciphering and deciphering a key for an eUICC using an asymmetric ciphering algorithm using a PKI key pair, in accordance with exemplary embodiments. An eUICC subscription manager 109 could process or calculate a key ciphering algorithm 216 and a module 101 or eUICC 107 could process or calculate a key deciphering algorithm 217. The eUICC key ciphering algorithm 216 can use an asymmetric ciphering algorithm 219 with an input of (i) an eUICC public key 214 as a cipher key and (ii) the eUICC profile key 107b as plaintext in order to output ciphertext of an encrypted eUICC key 218. The plaintext eUICC profile key 107b can comprise a random number of appropriate length for processing a profile ciphering algorithm 210 and profile deciphering algorithm 206 as depicted and described in connection with FIG. 2b above. As illustrated in FIG. 2e, the input into a key ciphering algorithm 216 could also include an optional security token 212, where a security token 212 is depicted and described in connection with FIG. 2b above.

An asymmetric ciphering algorithm 219 within a key ciphering algorithm 216 and a key deciphering algorithm 217 an comprise an algorithm for utilizing public key infrastructure (PKI) techniques to both (i) encrypt plaintext with a public key and (ii) decrypt plaintext with a private key. Example algorithms within asymmetric ciphering algorithm 219 include an RSA algorithm and an elliptic curve cryptography (ECC) algorithm, and other asymmetric ciphering algorithms could be utilized as well. The use and application of RSA algorithms and cryptography are described within IETF RFC 3447 titled "Public-Key Cryptography Standards (PKCS) #1: RSA Cryptography Specifications Version 2.1", herein incorporated by reference, among other published standards for the use of RSA algorithms. The use of an RSA algorithm in an asymmetric ciphering algorithm 219 for encryption and decryption, can also be processed according to the description of the RSA algorithm according to the Wikipedia entry for "RSA (algorithm)" as of Sep. 9, 2013, which is incorporated by reference herein. The use and application of an ECC algorithm for asymmetric ciphering algorithm 219 can conform with algorithms within IETF RFC 6090 titled "Fundamental Elliptic Curve Cryptography Algorithms" (herein incorporated by reference), among other published standards using ECC. Asymmetric ciphering algorithm 219 can also utilize elliptic curve cryptography algorithms for the Wikipedia entry for "Elliptic curve cryptography" as of Sep. 9, 2013, which is incorporated by reference herein.

ECC algorithms (with corresponding ECC-based PKI keys) may utilized for asymmetric ciphering algorithm 219 according to exemplary preferred embodiments in order to maintain high security with smaller key lengths, compared to RSA, thereby helping to comparably reduce the message lengths, radio frequency spectrum utilization, and processing power required by module 101. RSA algorithms (with corresponding RSA-base PKI keys) for asymmetric ciphering algorithm 219 may be utilized in other embodiments in order to maintain compatibility with deployed or legacy software and systems that supports RSA based keys and algorithms.

After an eUICC subscription manager 109 uses a eUICC key ciphering algorithm 216 to convert a plaintext eUICC profile key 107b into a ciphertext as an encrypted eUICC key 218, the eUICC subscription manager can send the ciphertext to the module 101. The eUICC subscription manager could send the ciphertext as an encrypted eUICC key 218 to module 101 using an IP network 111, and the IP network 111 could comprise the public Internet. In this manner, the module 101 can securely receive the encrypted eUICC key 218 in order to perform, process, or calculate a key deciphering algorithm 217. Third parties with access to the encrypted eUICC key 218 would not feasibly be able to read the plaintext eUICC profile key 107b, even with access to the eUICC public key 214. The module 101 could receive the encrypted eUICC key 218 along with an eUICC profile identity 107e in order to determine a profile 107c associated with the encrypted eUICC key 218, where a subsequent step (after deciphering the encrypted eUICC key 218) could comprise a profile deciphering algorithm 206. The module 101 could receive the encrypted eUICC key 218 either before or after receiving the profile 107c.

After receiving the encrypted eUICC key 218, the module 101 or eUICC 107 could decrypt the encrypted eUICC key 218 using a key deciphering algorithm 217. A key deciphering algorithm 217 can include a asymmetric ciphering algorithm 219. The asymmetric ciphering algorithm 219 can be equivalent to or the same as the asymmetric ciphering algorithm 219 in a key ciphering algorithm 216 operated or processed by an eUICC subscription manager 109 as described in this FIG. 2e above. The asymmetric ciphering algorithm 219 in a key deciphering algorithm 217 can accept input of the eUICC private key 215 as a cipher key. The asymmetric ciphering algorithm 219 in a key deciphering algorithm 217 can also accept input of the encrypted eUICC key 218 as a ciphertext. The key deciphering algorithm 217 can use an asymmetric ciphering algorithm 219 with an input of (i) an eUICC private key 215 as a cipher key and (ii) the encrypted eUICC key 218 as ciphertext in order to output plaintext of an eUICC profile key 107b. As illustrated in FIG. 2e, the plaintext could also optionally include a security token 212. After processing a plaintext eUICC profile key 107b from a key deciphering algorithm 217, module 101 or eUICC 107 could use the plaintext eUICC profile key 107b in order to perform a profile deciphering algorithm 206 as illustrated in FIG. 2b.

Although exemplary embodiments can include the use of a key ciphering algorithm 216 and a key deciphering algorithm 217 in order to securely transfer the eUICC profile key 107b from an eUICC subscription manager 109 to a module 101, a key ciphering algorithm 216 and a key deciphering algorithm 217 can be omitted in other exemplary embodiments. For example, if the eUICC subscription manager and module 101 or eUICC 107 support the use of a secure key exchange such as Diffie-Hellman or ECDH, then the eUICC profile key 107b could be mutually derived by the two nodes and the encrypted eUICC key 218 would not need to be transferred through an IP network 111 between the two nodes.

In another embodiment, as depicted in FIG. 2e, the key ciphering algorithm 216 and key deciphering algorithm 217 may also be used with ciphertext 208c with an encrypted first key K 203 and a plaintext of the first key K 203, if a profile 107d includes ciphertext 208c with encrypted first key K 203. In this case, a mobile network operator 104 could perform the key ciphering algorithm 216 with input of (i) the plaintext first key K 203 and (ii) the eUICC public key 214 in order to output ciphertext 208c. The ciphertext 208c can include the encrypted first key K 203, although the ciphertext 208c could also include other data such as the network parameters 201. The MNO 104 could send the ciphertext 208c (with the encrypted first key K) to the eUICC subscription manager 109 in a step 302b in FIG. 3 for inclusion in the profile 107d and profile 107c. As depicted in FIG. 2e, a module 101 or eUICC 107 could perform the key deciphering algorithm 217 on the ciphertext 208c with the first encrypted key K 203 in order to obtain the plaintext first key K 203. In this manner, the first key K 203 is not shared as plaintext with any entities besides the MNO 104 and a module 101 with the eUICC 107. In other words, a MNO 104 can use a key ciphering algorithm 216 to prevent the sharing of a plaintext first key K 203 with an eUICC subscription manager 109.

In addition, although FIG. 2e illustrates an eUICC subscription manager as performing the eUICC key ciphering algorithm 216 and the module 101 or eUICC 107 as performing the eUICC key deciphering algorithm 217, an alternative embodiment contemplates that the eUICC subscription manager 109 performs the eUICC key deciphering algorithm 217 and the module 101 or eUICC 107 performs the eUICC key ciphering algorithm 216. In this alternative embodiment, the module 101 can (i) derive the eUICC profile key 107b, and (ii) send the ciphertext comprising the encrypted eUICC key 218 to the eUICC subscription manager 109. In this alternative embodiment, the module 101 can (i) use the eUICC subscription manager public key 220 to cipher the derived eUICC profile key 107b, (ii) send the encrypted eUICC profile key 107b to the eUICC subscription manager 109, and (iii) the eUICC subscription manager 109 can decrypt the encrypted eUICC profile key 107b using the eUICC subscription manager private key 222. In this alternative embodiment, the eUICC subscription manager 109 could (i) use the eUICC key deciphering algorithm 217 to decrypt the encrypted eUICC key 218 received from the module 101, and then (ii) subsequent encrypt the profile 107d into a profile 107c using a profile ciphering algorithm 210 as depicted and described in connection with FIG. 2b above.

FIG. 3

FIG. 3 is a simplified message flow diagram illustrating an exemplary system with exemplary data sent and received by a module with an eUICC, in accordance with exemplary embodiments. System 300 can include an eUICC subscription manager 109, an IP network 111, a mobile network operator 104, a module 101. A module 101 can include a network application 101x and an eUICC 107. The network application 101x can perform the operations for communicating with the wireless network 102 (i) at the data-link layer using standards for PLMN networks such as, but not limited to exemplary radio resource control standards within ETSI TS 136 331 v.10.7 entitled "LTE; Evolved Universal Terrestrial Radio Access (E-UTRA); Radio Resource Control (RRC); Protocol Specification", which is herein incorporated by reference, and (ii) at the network layer using Internet Protocol. Other standards for communication at the data-link layer between a network application 101x and a mobile network operator 104 can be utilized as well without departing from the scope of the present invention. The (i) mobile device 101, using the network application 101x, and (ii) the mobile network operator 104 can send and receive data using the wireless network 102 depicted and described in connection with FIG. 1a. Although a single module 101 is illustrated in system 300 in FIG. 3, a system 300 could include a plurality of modules 101.

The network application 101x and the eUICC 107 can send and receive data locally within the module 101 using an operating system 101h and/or a system bus 101d. The network application 101x and the eUICC 107 can send and receive data locally within the module 101 using an eUICC driver 128 as depicted and described in connection with FIG. 1b and FIG. 1e. The module 101, using a network application 101x, can send and receive data with the eUICC subscription manager 109 using the IP network 111. As illustrated in FIG. 3, the module 101 can send and receive data with the eUICC subscription manager 109 in a step 205 using an initial network.

The initial network could comprise a different wireless network 102 than a wireless network 102 (i) for the mobile network operator 104, and (ii) used for a first authentication 304 and a second authentication 310. In other words, module 101 can send and receive data for an eUICC profile 107c through a initial network that is different than the wireless network 102 associated with the mobile network operator 104. The network application 101x could support different standards for wireless networking technologies, such that the different wireless network 102 used to access the eUICC subscription manager 109 could comprise exemplary networks such as WiFi or LTE Advanced, and the network application 101x could use LTE to communicated with the mobile network operator 104. Other possibilities exist as well for the network application 101x to support communication with a variety of different networks without departing from the scope of the present invention.

The left side of network application 101x in FIG. 3 for communication with the mobile network operator 104 can comprise communication through a radio 101z with the wireless network 102, and the right side of network application 101x can comprise internal communication within module 101 as described in the paragraph above and also FIG. 1e above. The internal communication between network application 101x and eUICC 107 using an operating system 101h could comprise either (i) sharing memory 101e, where module 101 writes data such as, but not limited to, an exemplary RAND 118 value and eUICC 107 reads the values from the shared memory 101e, or (ii) using loopback UDP ports within operating system 101h, such that network application 101x sends a UDP datagram with the RAND 118 value using a first UPD loopback port, and the eUICC 107 receives the UDP datagram with the RAND 118 value using a second UDP loopback port. For an operating system 101h within module 101 using IPv4 addresses, the addresses used for the UDP loopback ports could comprise addresses in the range of the 127.0.0.0/8 address block. For an operating system 101h within module 101 using IPv6 addresses, the addresses used for the UDP loopback ports could comprise an ::1 address. In another embodiment illustrated in FIG. 1f above, the eUICC 107 can communicate with the MNO 104 directly for embodiments where the eUICC 107 includes an IP address 106c.

At a step 301, a module 101 can record an eUICC identity 107a, an address 109a of an eUICC subscription manager 109, and an eUICC private key 215 associated with the eUICC 107. A manufacturer, distributor, technician, end user, or installer of module 101 could record the data for a step 301 in module 101, or the data could be downloaded or accessed separately via an IP network 111, including the public Internet. Other data could be included in a step 301 as well, such as, but not limited to, the software or firmware comprising the eUICC 107, an eUICC profile key 107b, an eUICC public key 214, an eUICC subscription manager public key 220, an eUICC driver 128, an initial profile 107d or 107c, and policy rules for allowing access to the profiles, and other additional data could be included in a step 301 as well. Additional optional data for recording with an eUICC 107 in a step 301 are depicted on the second line of step 301 in FIG. 3.

In an exemplary embodiment, a manufacturer of module 101 records the exemplary data for an eUICC 107 in a step 301, such that a module 101 can being operations and connecting to an initial wireless network 102 upon power-up in order to establish initial communications, including allowing the communication with the eUICC subscription manager 109 through the initial wireless network 102. As noted above in this FIG. 3, an initial wireless network 102 used for the eUICC 107 to access the eUICC subscription manager 109 can be different than the wireless network 102 used to access the mobile network operator 104. The address 109a of an eUICC subscription manager 109 could comprise either an IP address or a domain name, and in an exemplary embodiment the address 109a comprises a domain name and the module 101 can query for the IP address associated with the domain name for address 109a via either a domain name system (DNS) query or a secured DNS query (DNSSEC). A module 101 can connect with an initial wireless network 102 (different than the depicted wireless network 102 in FIG. 3) after a step 301 in order to communicate with an eUICC subscription manager 109.

At a step 302a, an eUICC subscription manager 109 could record data for the eUICC 107. The data could include (i) an eUICC identity 107a, (ii) a profile 107c, (iii) an eUICC public key 214, (iv) an eUICC subscription manager public key 220 and private key 222, (v) an eUICC profile key 107b with an associated eUICC profile identity 107e, (vii) a module identity 110 (for embodiments where the module identity 110 for the eUICC 107 is known before the eUICC 107 sends and receives data with the eUICC subscription manager 109), (viii) and parameters for a symmetric ciphering algorithm 211 and an asymmetric ciphering algorithm 219 used by the eUICC 107. The parameters for a symmetric ciphering algorithm 211 and an asymmetric ciphering algorithm 219 used by the eUICC 107 could specify the ciphers used, such as (i) selecting an exemplary 128 or 192 bit keys for use with an AES cipher for a symmetric ciphering algorithm 211 used with a eUICC 107 and eUICC identity 107a, and (ii) selecting an exemplary elliptic curve or RSA algorithm for use with an asymmetric ciphering algorithm 219. The eUICC subscription manager 109 could also record related data for the operation of eUICC 107 with eUICC subscription manager 109 in a step 302a.

At a step 302a, the eUICC subscription manager 109 could receive the profile 107d from the mobile network operator 104, and an exemplary profile 107d is depicted and described in connection with FIG. 2a. Or, eUICC subscription manager 109 could receive a subset of data for the exemplary profile 107d from the MNO 104 in a step 302a without receiving the entire profile 107d. As one example, the MNO 104 may not know the eUICC profile identity 107e for the eUICC profile 107d, and thus the MNO 104 may not send the complete profile 107d but the MNO 104 could send data for the profile 107d to the eUICC subscription manager 109 in a step 302a. In an exemplary embodiment, the eUICC subscription manager 109 could receive a subset of data for the profile 107d using the IP network 111 over a secured link or connection to the MNO 104. The profile 107d in a step 302a could include both ciphertext 208b and plaintext of a set of network parameters 201, a first network module identity 202, and a first key K 203. As depicted and described in connection with FIG. 2a, the ciphertext 208b could comprise an encrypted second key K 204a. The ciphertext 208b could also include the second network module identity 209a. In an exemplary embodiment, the plaintext first key K 203 could be optionally omitted from being received from an MNO 104 in a step 302a, and the eUICC subscription manager 109 can receive the first key K 203 in the form of a ciphertext 208c below in a step 302b. The eUICC subscription manager 109 could use a server or a plurality of servers similar to a server 105 in order to take the processing and communication steps described herein for an eUICC subscription manager 109 in this step 302a and also additional steps for an eUICC subscription manager 109 described throughout FIG. 3.

After a module 101 powers up and established connectivity with the IP network 111, an eUICC 107 operating in a module 101 could then perform a step 205 in order to receive an eUICC profile 107c using the IP network 111. The use and operation of a step 205 is also depicted and described in connection with FIG. 2a above. In a step 205, an eUICC 107 could send an eUICC identity 107a to the eUICC subscription manager 109. The module 101 could use a network application 101x to send the eUICC identity 107a, such as the network application 101x writing data with the eUICC identity 107a to a physical interface 101a, and the physical interface 101a could include a radio 101z. Or, using the exemplary embodiment illustrated in FIG. 1f above, the eUICC 107 could be associated with an IP address 106c, and the eUICC 107 could send the eUICC identity 107a to the eUICC subscription manager 109 without using a separate network application 101x associated with the wireless network 102. During a step 205 for a module 101 or eUICC 107, an eUICC subscription manager 109 could receive the eUICC identity 107a and perform a step 302b. In an exemplary embodiment, both a module identity 110 and an eUICC identity 107a could be sent by an eUICC 107 or a module 101 in a step 205. Or, the eUICC identity 107a could comprise a module identity 110, and the module identity 110 could be sent in a step 205. Other possibilities exist as well for identifying a module 101 or an eUICC 107 with an eUICC subscription manager 109 without departing from the scope of the present invention.

In an exemplary embodiment, a message with the eUICC identity 107a in a step 205 could include a digital signature, where the digital signature is processed using (i) the eUICC private key 215 recorded in a step 301 and (ii) a digital signature algorithm 221. The message with the eUICC identity 107a and a digital signature in a step 205 could preferably include a random number or string, including a nonce or a "number used once" such as, but not limited to, an exemplary security token 212 in order to prevent replay attacks.

An eUICC subscription manager 109 can take several actions in a step 302b after receiving an identity for the eUICC 107 or module 101. A first action in a step 302b could comprise authenticating an eUICC 107 or a module 101 based on the eUICC identity 107a received in the message. In a step 302b, eUICC subscription manager 109 can authenticate the message with eUICC identity 107a according to message digest, or using the eUICC profile key 107b which could be recorded in the eUICC 107 in a step 301 above. In addition, the eUICC subscription manager could authenticate using a digital signature algorithm 221, where the message with the eUICC identity 107a could include a digital signature, as described in the paragraph above.

Both the eUICC 107 and the eUICC subscription manager 109 could use the eUICC profile key 107b as a cipher key with a symmetric ciphering algorithm 211 to encrypt/decrypt data sent with the eUICC identity 107a, where the successful encryption and decryption of data with eUICC identity 107a using the eUICC profile key 107b on both ends could be confirmation that the eUICC 107 or module 101 is authenticated, since both parties would only be able to mutually successfully encrypt and decrypt by sharing the same eUICC profile key 107b. In another embodiment, the eUICC profile key 107b could be used as a private key with a digital signature algorithm 211 (instead of the eUICC private key 215), in order for the eUICC 107 with the eUICC 107a to be authenticated. For embodiments where the module 101 with the eUICC 107 sends a digital signature with the eUICC identity 107a, the eUICC subscription manager 109 could use the eUICC identity 107a to select the eUICC public key 214 or eUICC profile key 107b from a database. In this manner, the eUICC subscription manager 109 could communicate with a plurality of eUICCs 107 and select the appropriate keys using the eUICC identity 107a.

A second action in a step 302b could comprise the eUICC subscription manager 109 authenticating with an eUICC 107 or a module 101. The eUICC subscription manager 109 could also authenticate with an eUICC 107 at a step 302b within a step 205, such that eUICC 107 can confirm an identity of the eUICC subscription manager 109, using any of the same or equivalent steps described in the paragraph above for an eUICC 107 to authenticate with an eUICC subscription manager 109. The eUICC subscription manager 109 could send the eUICC 107 a digital signature processed using a digital signature algorithm 221 and the eUICC subscription manager private key 222. The eUICC 107 could verify the digital signature using a eUICC subscription manager public key 220 (which could be recorded with an eUICC 107 in a step 301). The eUICC 107 could also receive data encrypted with a eUICC profile key 107b, and successful decryption of the data by the eUICC 107 using a symmetric ciphering algorithm 211 could confirm the eUICC subscription manager 109 also holds the eUICC profile key 107b. Note that a system 300 could include multiple eUICC keys 107b, such that a first eUICC profile key 107b is used with a step 301 and step 205 in FIG. 3, and a second eUICC profile key 107b could be used with a subsequent step 206 below. Other possibilities exist as well for an eUICC 107 and an eUICC subscription manager 109 to perform a 2-way authentication in a step 205 and a step 302b in FIG. 3 without departing from the scope of the present invention.

In another exemplary embodiment, where data received from an MNO 104 does not include a plaintext first key K 203 for inclusion in a profile 107d, for a third action in a step 302b, the eUICC subscription manager 109 could send the eUICC identity 107a (or the module identity 110) and the eUICC public key 214 to the MNO 104. In this embodiment, the MNO 104 could also use the key ciphering algorithm 216 depicted and described in connection with FIG. 2e above in order to encrypt the first key K 203 with the eUICC public key 214. The output of an MNO 104 using a key ciphering algorithm 216 could comprise a ciphertext 208c of an encrypted first key K 203. Thus, at a step 302b for the embodiment described in this paragraph, the eUICC subscription manager 109 could receive the first key K 203 for a profile 107d as ciphertext 208c (instead of a plaintext first key K 203 for profile 107d in FIG. 2a), In this manner, the first key K 203 in a profile 107d could be recorded as ciphertext 208c, which is also depicted and described as an optional format for the first key K 203 in FIG. 2a and FIG. 2e.

In an exemplary embodiment, the MNO 104 can send the ciphertext 208c only after a user 113 conducts a separate authentication step 308b below. In other words, a step 308b could also be used concurrently with a step 302b, where the step 302b includes the receipt of an encrypted first key K 203 in a ciphertext 208c. In this manner, the MNO 104 can retain control over the release of an encrypted first key K 203, such that the first key K 203 in a ciphertext 208c is only received by an eUICC subscription manager 109 in a step 302 or a eUICC 107 in a step 205 after a user 113 (associated with the module 101 with the eUICC 107) authenticates with the MNO 104. In this embodiment, a separate authentication step 308b below can be optionally omitted, and the use of an encrypted second key K 204a in ciphertext 208b can also be omitted. In this embodiment, a user 113 of the module 101 can access the wireless network 102 of the mobile network operator 104 using the first key K 203 which has been (i) encrypted by the mobile network operator 104 using a key ciphering algorithm 216 in a step 302b, and (ii) only available to module 101 or eUICC 107 (or eUICC subscription manager 109) after a user 113 conducts an authentication step 308b with MNO 104.

After the eUICC subscription manager 109 receives and/or processes all the data for a profile 107d, including subsets of data from a MNO 104 described for this step 302b above, a fourth action in a step 302b could comprise the eUICC subscription manager 109 ciphering a profile 107d using a profile ciphering algorithm 210, in order to convert profile 107d with plaintext into a profile 107c with ciphertext. Some elements in a profile 107c could remain plaintext as well, such as the exemplary profile identity 107e. The eUICC subscription manager 109 could use an eUICC profile key 107b, where the eUICC profile key 107b in a profile ciphering algorithm 210 can be different than an eUICC profile key 107b used to authenticate eUICC 107 with eUICC identity 107a. Or, the same eUICC profile key 107b could be used to both cipher profile 107d and authenticate eUICC 107. Note that this fourth action in a step 302b could also take place at an earlier time than at step 302b, such that eUICC subscription manager 109 could assemble and cipher the profile 107d into a profile 107c at an earlier time, such as before receiving the eUICC identity 107a, or concurrent with a step 301a. Other possibilities exist as well for the timing and sequence for an eUICC subscription manager to assemble and process a profile 107c without departing from the scope of the present invention.

After a step 302b, the eUICC subscription manager 109 can send the authenticated eUICC 107 a profile 107c in a step 205, as depicted in FIG. 3. Either the eUICC subscription manger 109 or the eUICC 107 can select the profile 107c to be received by the eUICC 107. In one embodiment, a module 101 can search for radio beacons from base stations 103 for wireless networks 102 surrounding the module 101, and upon finding new possible wireless network 102 to connect with, the module 101 or eUICC 107 could query or request the eUICC subscription manager 109 for a profile 107c associated with a mobile network operator 104 for a radio beacon observed by the module 101. Commercial business arrangements among the user of module 101, the eUICC subscription manager 109, and the mobile network operator 104 can determine the availability of a profile 107c for a module 101 with an eUICC 107.

In another embodiment, the eUICC subscription manager 109 could periodically send the module 101 and/or eUICC 107 new profiles 107c as they become available to a user 113 of a module 101 or available to the eUICC subscription manager 109. In a preferred embodiment, the eUICC subscription manager 109 can send the profile 107c to the module 101 using a network application 101x, where the network application 101x forwards the data to the eUICC 107. As described above in this FIG. 3, the network application 101x could communicate with the eUICC 107 using the operating system 101h as illustrated in FIG. 1e, and other possibilities exist as well. Note that eUICC subscription manager 109 sends the profile 107c, where the network access credentials (including the first key K 203) are encrypted with an eUICC profile key 107b, and in this manner intermediate nodes on the IP network 111 would not feasibly be able to read the data within the profile 107c.

In an exemplary embodiment, the eUICC subscription manager 109 can send the module 101 a pointer, uniform resource locator (URL), domain name, or related address for a location of the eUICC profile 107c in a step 205 as opposed to the actual, full profile 107c. In this embodiment, the module 101 could receive the pointer, uniform resource locator, domain name, or related address for the location of the eUICC profile 107c and subsequently download the eUICC profile 107c from an IP address associated with the pointer, uniform resource locator, domain name, or related address for a location of the eUICC profile 107c.

As depicted in FIG. 3, after receiving the profile 107c from the eUICC subscription manager 109 in a step 205, the eUICC 107 can receive data for decrypting the profile 107c in a step 303. Note that if eUICC profile key 107b (in the form of a symmetric key as illustrated in FIG. 2b) has already be shared between the eUICC 107 and the eUICC subscription manager 109 before a step 206 below, then a step 303 could separately be omitted. For example, if an eUICC profile key 107b has been recorded with an eUICC 107 in a module 101 by a manufacturer of module 101, then that eUICC profile key 107b could be used in a step 206 below, and a separate step 303 could be omitted. In other exemplary embodiments, the eUICC 107 can receive data for processing or deriving the eUICC profile key 107b for a step 206 below using the step 303 illustrated in FIG. 3. A step 303 can include the receipt by eUICC 107 of either (i) an encrypted eUICC key 218, or (ii) data for a key exchange. The encrypted eUICC key 218 received by an eUICC 107 in a step 303 could comprise an eUICC profile key 107b that is ciphered using a key ciphering algorithm 216 illustrated in FIG. 2e. For embodiments where data for a key exchange is received in a step 303, the algorithms used with a key exchange could comprise a Diffie Hellman key exchange, or an Elliptic Curve Diffie Hellman key exchange (ECDH).

An eUICC 107 within a module 101 could use a ECDH key exchange in a step 303 when ECC algorithms are utilized for eUICC public key 214, eUICC private key 215, and eUICC subscription manager private key 222 and eUICC subscription manager public key 220. A summary of ECDH is included in the Wikipedia article titled "Elliptic Curve Diffie-Hellman" (http://en.wikipedia.org/wiki/Elliptic_curve_Diffie %E2%80%93Hellman from Sep. 24, 2013, which is herein incorporated by reference. An ECDH key exchange in a step 303 could comprise the message received by a eUICC 107 including a common base point G. The base point G could also be sent from an eUICC 107 to eUICC subscription manager 109. The base point G for an ECDH key exchange in a step 303 could also be recorded with the eUICC in a step 301 above, and in this case the message at a step 303 received by an eUICC 107 could comprise a signal to initiate or use a key exchange for deriving the eUICC profile key 107b. Note that the eUICC subscription manager 109 and the eUICC 107 could take additional steps to process the eUICC profile key 107b after an ECDH key exchange at step 303, such as taking the output of an ECDH key exchange and inputting that output into a secure hash algorithm in order to obtain the eUICC profile key 107b. Other algorithms besides an ECDH or Diffie Hellman key exchange can be utilized as well at a step 303, including a key exchange according to the American National Standards Institute (ANSI) standard X-9.63.

After completing a step 303, an eUICC 107 operating in a module 101 could read and utilize the eUICC profile key 107b. In embodiments where the eUICC profile key 107b in a step 303 above comprises an encrypted eUICC key 218, a step 217 from FIG. 2e can be utilized by the eUICC 107 in order to decrypt the eUICC key 218 into a plaintext of eUICC profile key 107b. The plaintext eUICC profile key 107b can be used by the eUICC 107 in a step 206 to decrypt (x) the profile 107c received in a step 205 above into (y) a profile 107d. The use of an eUICC profile key 107b for a step 206 is also depicted and described in connection with FIG. 2a above and also FIG. 2b. Plaintext within a profile 107d can be read after a step 206, although in exemplary embodiments and as illustrated in FIG. 2a, the profile 107d can continue to record ciphertext 208b and ciphertext 208c.

In an exemplary embodiment, after a step 206 in FIG. 3 to convert received profile 107c to profile 107d, if (A) a ciphertext 208c that includes the first key K 203 is present in profile 107d (as depicted in FIG. 2a above), then (B) eUICC 107 could also use a key deciphering algorithm 217 on ciphertext 208c in order to extract the plaintext first key K 203. Note that ciphertext 208a could be ciphered by an eUICC subscription manager 109 (using a profile ciphering algorithm 210) and ciphertext 208b and/or ciphertext 208c could be encrypted by a mobile network operator 104 (using a key ciphering algorithm 216). In other words, a module 101 with an eUICC 107 can use (i) a profile deciphering algorithm 206 with an eUICC profile key 107b to decrypt ciphertext 208a, (ii) a key deciphering algorithm 217 with an eUICC private key 215 to decrypt ciphertext 208c, and/or (ii) a key K deciphering algorithm 207 with a symmetric key 127 to decrypt ciphertext 208b.

After reading plaintext in profile 107d, module 101 could then utilize the profile 107d to conduct a first authentication 304 with the mobile network operator 104. As depicted in FIG. 3, the first authentication 304 can comprise (i) module 101 sending an attach message 305 with network module identity 202, (ii) the eUICC 107 and module 101 receiving a RAND 118, (iii) the eUICC 107 using a step 306 in order to calculate a RES 119, and (iv) the module 101 sending the RES 119. Although not illustrated in FIG. 3, a first authentication 304 could include other data such as receiving the equivalent of an "OK" message upon successful authentication, the receipt of additional network parameters 202 after successful authentication, etc. The module 101 can use a profile 107d from a step 206 above in order to conduct the first authentication 304. The profile 107d in an eUICC 107 could be selected and activated in order to connect with a wireless network 102 associated with mobile network operator 104. As contemplated herein and throughout the present invention, an activated profile 107d can comprise a selected and enabled network access application state as illustrated in Figure D.1 of ETSI TS 103 383 v.2013-02 for the activated profile 107d, and other possibilities exist as well. As illustrated in FIG. 3 after a step 206, the module 101 can use a network application 101x in order to attach to the wireless network 102 and communicate with the mobile network operator 104.

Within a first authentication 304, the module 101 can send a first attach message 305, and the first attach message 305 can include the first network module identity 202. With a 4G LTE network, the first attach message 305 could comprise a radio resource connection request message, or a similar message could be utilized with other wireless networking standards as well, such as LTE Advanced or WiMAX. An exemplary radio resource connection request is described in section 5.3.3 within ETSI TS 136 331 v.10.7 entitled "LTE; Evolved Universal Terrestrial Radio Access (E-UTRA); Radio Resource Control (RRC); Protocol Specification", which is herein incorporated by reference. Although not illustrated in FIG. 3, the module 101 and wireless network 102/mobile operator 104 could take additional related steps before sending the exemplary first attach message 305, such as, but not limited to, module 101 synchronizing a clock 160 with wireless network 102, module 101 sending a message on a random access control channel (RACH) in order to have a timeslot and frequencies for sending the first attach message 305, etc.

As depicted in FIG. 3, after receiving and processing the first attach message 305, the mobile network operator can send a first random number (RAND) 118. Although not illustrated in FIG. 3, a network authentication token "AUTN" and a sequence number could be sent with the first RAND 118. An exemplary format for the use of a RAND 118 with a response RES 119 is described in ETSI standard TR 131 900 v.10.0.0 and related documents. In a first authentication 304 the module 101 and the eUICC 107 can receive the first RAND 118. The eUICC 107 can conduct a step 306 with an input of the first RAND 118 and the first key K 203 in order to calculate a first RES 119. The use of a RAND 118 with a RES 119 in a step 306 could comprise a general use of a message digest authentication, and another exemplary message digest authentication is also described in IETF RFC 2617, titled "HTTP Authentication: Basic and Digest Access Authentication". After receiving the exemplary first RAND 118 message, in order to conduct a first authentication 304, module 101 using an eUICC 107 could take steps to demonstrate to MNO 104 that module 101 has access to the same first key K 203 as recorded by the MNO 104 in a step 302a or step 302b above. MNO 104 could record the expected RES 119 value with a set of authentication vectors 117 for the first network module identity 202, as depicted in FIG. 1d and FIG. 1e.

Module 101 can properly respond to a challenge/nonce (such as a first RAND 118) in a message digest authentication by sending a secure hash value calculated using (i) the challenge/nonce and (ii) the first key K 203. The secure hash value can comprise the first RES 119. In exemplary embodiments, eUICC 107 and wireless network 102 could use algorithms specified in ETSI TS 135 205-209, as well as subsequent and related standards, in order for module 101 using eUICC 107 to (i) calculate a secure hash value, and (ii) process related steps for a first authentication 304. After processing a first RES 119 in a step 306 using the first key K 203, the eUICC 107 could send the first RES 119 to the network application 101x in module 101. Module 101 could then send the first RES 119 to the mobile network operator 104 using the wireless network 102, as depicted in FIG. 3 and thereby complete a first authentication step 304 for the module 101.

In another embodiment for a first authentication step 304, (i) module 101 could send (i) the first network module identity 202 a digital signature processed using a digital signature algorithm 221 and the eUICC private key 215, and (ii) MNO 104 could verify the digital signature using a digital signature algorithm 221 and the eUICC public key 214. Other possibilities exist as well for steps within a first authentication 304 using a eUICC private key 215 with the first network module identity 202 or the eUICC identity 107a in a first authentication step 304 without departing from the scope of the present invention. In an exemplary embodiment, as depicted in FIG. 1f above, the eUICC 107 could include an IP address 106c with an interface identifier 106e associated with the eUICC 107, and in this case the module 101 could send the first RES 119 value from the eUICC 107 to the MNO 104 through the wireless network 102.

In a step 308a the mobile network operator 104 can receive the first RES 119. A server 105 such as a mobility management entity (MME) for the mobile operator network 104 associated with the wireless network 102 could compare the received first RES 119 with an internally recorded RES 119 from the authentication vector 117. As noted above, the authentication vector 117 could be received by the server 105 from the HSS of the mobile network operator 104 before a step 308a. If the received first RES 119 matches the internally stored first RES 119 value, the wireless network 102 and mobile network operator 104 can consider or process that the module 101 is authenticated for a step 308a. The wireless network 102, the MNO 104, and the module 101 can take subsequent steps (not shown) for the module 101 to access the IP network 111, in order to conduct authentication of the module 101 or a user associated with the module 101 with a second factor in a step 308b below.

In a step 308b, the mobile network operator 104 can conduct a separate authentication of either a user 113 associated with a module 101 or the module 101 using a second factor. In other words, the mobile network operator 104 can use a step 308b to authenticate the user 113 of module 101 or the module 101 using steps and a process that is different than the first authentication 304. Note that this use of a separate authentication step 308b can be different than conventional technology used in authenticating a module 101 in a step 304, since other values and tokens besides the first key K 203 can be used in the authentication step 308b. The additional authentication step 308b can be useful for a mobile network operator 104 to authenticate a module 101 with an eUICC 107 and profile 107d, since the profile 107d with the first key K 203 may be transferred to module 101 in a communications channel outside the control of mobile network operator 104. As one example, the profile 107d with the first network key K 203 could be transferred to an eUICC 107 from the eUICC subscription manager 109 using an IP network 111, as depicted in FIG. 3 in a step 205. The mobile network operator 104 may not have control over the IP network 111 used in a step 205. The mobile network operator 104 may not have control over the security keys and algorithms used to encrypt the profile 107d into a profile 107c, and thus the security of the first key K 203 upon which the MNO 104 depends for authentication and ciphering of data with module 101 may be outside the control of MNO 104. As one example, the MNO 104 may not be able to separately authenticate the identity of a user of module 101 with the eUICC 107, before the profile 107d was received by module 101 and eUICC 107 in a step 205.

Consequently, without a separate authentication step 308b the user 113 of module 101 with the eUICC 107 may be unknown to MNO 104, and a separate identity of the user 113 or module 101 (other than network module identity 202) may preferably be authenticated in a step 308b. Thus, a MNO 104 may use a separate authentication step 308b in order to authenticate a user 113 of module 101 with the eUICC 107 and the first key K 203 in exemplary embodiments. The user 113 can have a contractual or business relationship with MNO 104 in order to pay for voice and/or data services from the MNO 104, and thus the MNO 104 can preferably identify and authenticate a user 113 in a step 308b.

A step 308b can comprise the authentication and/or secure identification of (i) a user 113 of module 101 or (ii) module 101 using a second factor. Although a step 308b is depicted in FIG. 3 as being performed after a first authentication 304, a step 308b could be performed before a step 304 (including with a step 302b as described in step 302b above). The use of a second factor in an authentication step 308b can comprise a two-factor authentication, where the first factor can be the successful completion of authentication using a step 304 and step 308a described above. The steps for authenticating a user 113 or module 101 in a step 308b could comprise many different forms without departing from the scope of the present invention. In one embodiment, where the user 113 of module 101 comprises a subscriber to telecommunication and data services from MNO 104, the user 113 could present identification to a representative of the MNO 104 in a step 308b. The identification could be in the form of a physical identity such as, but not limited to, a drivers license or a passport (along with a value that can be associated with the eUICC profile 107d such as the module identity 110 or the eUICC identity 107a). The representative of the MNO 104 could record the identification in a web browser with connectivity to a database shared by a server 105.

In another embodiment of an authentication of a user 113 of module 101 (with the eUICC profile 107d recorded with an eUICC 107 in module 101 from a step 205) could enter information into a web page provided by MNO 104, where the user 113 first (i) authenticates on the web page and then (i) enters identification information for the module 101 or eUICC 107. The user 113 could first authenticate with the MNO 104 via a web page by entering a valid identity and a password (where the identity and password for the web page in a step 308b could be previously established between the user 113 and the MNO 104 before a step 308b). In another embodiment for a step 308b, a user 113 could call a telephone number operated by or associated with a MNO 104 and provide identification information via voice or entering information such as dual-tone multi-frequency (DTMF) digits via interactive voice response (IVR). The identification information could include either a credit card number or a personal identification number (PIN) for the user 113 (where the PIN may be previously shared or established between the user 113 and the mobile network operator 104). The user 113 could also send a text message to MNO 104 from module 101 (i) using the module 101 authenticated link with MNO 104 established in a first authentication 304, where (ii) the text message include identification information for a user 113.

In accordance with preferred exemplary embodiments for the verification of an identity of user 113 in a step 308b (including an authentication of user 113 in a step 308b), the user 113 can send data to a MNO 104 from module 101 using a data connection via wireless network 102 associated with (and established after) the first authentication 304. In this manner, data and voice connectivity between the MNO 104 and module 101 could be established with a first authentication step 304, and the user 113 and MNO 104 can conduct an authentication step 308b (or equivalently a verification of an identity of the user 113) to confirm the identity of the user 113 via the established data and voice connectivity using the wireless network 102. In other words, the user 113 could verify or authenticate an identity of the user 113 of module 101 through the wireless network 102 in a step 308b, where (a) module 101 had conducted a first authentication step 304 and 308a with MNO 104 using the first key K 203 recorded in a profile 107d, in order to (b) support or conduct a separate verification or authentication of a user 113. In an exemplary embodiment, the user 113 could enter identifying information for a step 308b in a web page accessed through a user interface 101j on module 101, where data connectivity for the web page is provided to module 101 through the wireless network 102 after a first authentication step 304.

The authentication or verification of user 113 identity in a step 308b can comprise authenticating module 101 with a second factor, where the first factor can comprise the first key K 203 and the second factor can comprise information provided by a user 113 in a step 308b. Other possibilities exist as well for those of ordinary skill in the art for (a) a user 113 of module 101 with the first key K 203 to (b) authenticate or verify an identity of the user 113 in a step 308b without departing from the scope of the present invention. In these exemplary embodiments for a user 113 to authenticate or verify an identity for the user 113 for module 101 with the MNO 104, the MNO 104 could record information or data received from the user 113 in a database, such that a server 105 for MNO 104 sends the symmetric key 127 in a step 309 below after an identity of the user 113 is verified or authenticated in a step 308b. In exemplary embodiments illustrated in FIG. 3, the module 101 can access the wireless network 102 with the first key K 203 in order to (i) establish communication with the IP network 111, (ii) support authentication of a user 113 in a step 308b through the IP network 111, and then (iii) subsequently receive a symmetric key 127 in order to decrypt a ciphertext 208b with a second key K 204a.

In other exemplary embodiments, module 101 could comprise a module supporting "machine-to-machine" applications and communications, and the module could be different than a traditional mobile phone or smartphone for (i) placing voice telephone calls or (ii) supporting a user interface 101j in the form of a touch screen and web browser. The module 101 could include a sensor 101f for collecting data and an actuator 101y for controlling or changing a state associated with a monitored unit for the module 101. In these embodiments, and as depicted and described in connection with FIG. 1a, module 101 can be associated with an M2M service provider 115, and the M2M service provider 115 could be associated with a plurality of modules 101, as opposed to an individual with a telephone number for voice services to module 101.

Each of the different modules 101 in the plurality of modules 101 could include different values for module identities 110, eUICC identities 107a, profile identities 107e, and the first network module identities 202. In these embodiments for a step 308b where the module 101 supports M2M applications for an M2M service provider 115, in a step 308b in FIG. 3, the MNO 104 could verify that (a) module 101 with eUICC 107 and the profile 107d from a step 304 is (b) properly associated with an M2M service provider 115. In exemplary embodiments, the MNO 104 could conduct a step 308b by securely or properly determining that an identity from module 101 is associated with M2M service provider 115, and an exemplary identity for module 101 include any of a module identity 110, an eUICC identity 107a, a profile identity 107e, and/or the first network module identity 202.

In exemplary embodiments where module 101 supports M2M application and the module 101 is associated with an M2M service provider 115, MNO 104 could take several possible actions in a step 308b for authenticating or verifying that an identity from module 101 in FIG. 3 is associated with an M2M service provider 115. The proper association of an identity of module 101 with M2M service provider 115 may be necessary or useful for contractual and business relationships between MNO 104 and M2M service provider 115, such as, but not limited to, allowing MNO 104 to bill or invoice M2M service provider 115 for data services that MNO 104 provides to module 101. In a first exemplary embodiment for a step 308b in FIG. 3 where module 101 supports M2M applications with a M2M service provider 115, MNO 104 could securely send to M2M service provider 115 an identity of module 101, such as, but not limited to module identity 110, eUICC identity 107a, profile identity 107e, and/or the first network module identity 202 through an IP network 111. The MNO 104 could also send the identity of module 101 in a query or request message. Although not illustrated in FIG. 3, the MNO 104 could also send the M2M service provider 115 a digital signature received from module 101 before a step 308b, where the digital signature was (i) processed by module 101 using a digital signature algorithm 221 and an eUICC private key 215, and (ii) sent from the module 101 to the MNO 104.

In a step 308b, the M2M service provider 115 could (i) receive the identity of module 101 (such as, but not limited to module identity 110, eUICC identity 107a, profile identity 107e, and/or the first network module identity 202), (ii) verify or determine the identity of module 101 properly belongs to M2M service provider 115, and (iii) send a response confirming the module 101 with the identity is validly associated the M2M service provider 115. The response from the M2M service provider 115 (or data within a message from M2M service provider 115 to MNO 114) for a step 308b can comprise a second factor for MNO 104 in authenticating module 101 with eUICC 107 and profile 107d. In this manner, MNO 104 can confirm module 101 with the first network identity 202 is authenticated or verified as belonging to or being associated with M2M service provider 115 in a step 308b.

In another exemplary embodiment for a step 308b, the M2M service provider 115 could also send MNO 104 a list of pre-authorized identities for one or a plurality of modules 101 before a step 308b (and in this case the list can comprise the second factor to authenticate module 101). MNO 104 could query the list of identities received upon receiving an identity of module 101, such as, but not limited to, the first network module identity 202 received in the first attach message 305. Other possibilities exist as well for an MNO 104 to authenticate or verify that an identity of module 101 is associated with a M2M service provider 115 in a step 308b without departing from the scope of the present invention.

After successfully verifying or confirming in a step 308b that module 101 in FIG. 3 is associated with a known user 113 or M2M service provider 115, MNO 104 can send a symmetric key 127 in a step 309. A network application 101x in the module 101 can receive the symmetric key 127 and the module 101 can forward the symmetric key 127 to the eUICC 107. As depicted and described in connection with FIG. 2a and FIG. 2c, the symmetric key 127 can be used by module 101 to decrypt the ciphertext 208b, where the ciphertext 208b can include a second key K 204a. The symmetric key 127 can also previously be used by MNO 104 to encrypt the ciphertext 208b. The ciphertext 208b could be delivered to eUICC subscription manager 109 for including the ciphertext 208b in the profile 107d, as described above in step 302a. The ciphertext 208b could be sent to module 101 from the eUICC subscription manager 109 across the IP network 111 as profile 107c in a step 205 as described above in this FIG. 3.

In exemplary embodiments, the MNO 104 can send the symmetric key 127 in a step 309 through the wireless network 102, where the connection between module 101 and MNO 104 could be initiated by the first attach message 305 and authenticated by a first authentication 304. Since the MNO 104 controls the nodes and ciphering steps for the transmission of symmetric key 127, the symmetric key 127 can be securely sent by MNO 104 and received by module 101 with ciphering and keys used at the data-link layer under the control of MNO 104 (whereas MNO 104 may not control the keys and ciphering of sending the first key K 203). Also note no entities, including the module 101, a user 113, an M2M service provider 115, an eUICC subscription manager 109, or unauthorized third parties could feasibly read the ciphertext 208b with the second key K 204a until they receive the symmetric key 127.

In an exemplary embodiment of a step 309 in FIG. 3, the symmetric key 127 can first be encrypted with a key ciphering algorithm 216. An encrypted symmetric key 127 ciphered with the key ciphering algorithm 216 could be received by module 101 in a step 309. As described in connection with a key ciphering algorithm 216 in FIG. 2e, the MNO 104 could select and read the eUICC public key 214 (using a received associated identity such as the first network module identity 202), and use an asymmetric ciphering algorithm 219 to encrypt the symmetric key 127. The module 101 could receive the encrypted symmetric key 127 and decrypt the symmetric key 127 in a step 309 by using a key deciphering algorithm 217 with the eUICC private key 215 and the asymmetric ciphering algorithm 219. For a step 309 in FIG. 3, the use of encryption for a symmetric key 127 with an asymmetric ciphering algorithm 219 is optional, and the symmetric key 127 could be sent in a form where encryption is applied at the data-link layer according to standards for the wireless network 102. Other possibilities exist as well for a module 101 to securely receive a symmetric key 127 in a step 309 without departing from the scope of the present invention. As described above in connection with a step 302b, in exemplary embodiments, the module 101 receives the symmetric key 127 after the MNO 104 authenticates or verifies that a user 113 or M2N service provider 115 is associated with module 101, and until the receipt of the symmetric key 127 the ciphertext 208b cannot be feasibly decrypted.

After a step 309, a module 101 with an eUICC 107 can use the symmetric key 127 to decrypt ciphertext 208b, where ciphertext 208b can include the second key K 204a. A module 101 or eUICC 107 can use a key K deciphering algorithm 207 with input from the received symmetric key 127 and the ciphertext 208b from profile 107d to output a plaintext second key K 204. Although not illustrated in a step 207 in FIG. 3, but as illustrated in a step 207 in FIG. 2a, a module 101 can use an eUICC 107 to also decrypt a second network module identity 209a for the second key K 204 using the symmetric key 127. The second network module identity 209a can be recorded in the ciphertext 208b. The second network module identity 209a can be different than the first network module identity 202, such as a different number or value for an IMSI. The second network module identity 209a can be the same length as the first network module identity 202. The use and operation of a key K deciphering algorithm 207 is also depicted and described in connection with FIG. 2a and FIG. 2e above.

The module 101 or eUICC 107 can record the plaintext second key K 204 in a nonvolatile memory such as, but not limited to, flash memory 101w such that the plaintext second key K 204 remains available to module 101 after power or a battery 101k is removed from module 101. The plaintext second key K 204 could also be recorded in a protected memory within module 101, such that the operating system 101h or CPU 101b may prevent read or write access to the protected memory by other processes than the eUICC 107. In other words, with a protected memory, other applications such as, but not limited to, applications that are downloaded from an "app store" or equivalent and installed by end users on the module 101 may be prevented by the operating system 101h from having access to the plaintext second key K 204 recorded in the protected memory.

In another embodiment, a module 101 may optionally not store the plaintext second key K 204 in nonvolatile memory, such that the second key K 204 continues to be recorded for a long-term basis only as ciphertext 208*b* in a nonvolatile memory such as flash 101*w*. The module 101 could perform a key K deciphering algorithm 207 each time a plaintext second key K 204 is needed for authentication purposes, including related key derivation of a CK and IK plus other derived keys. In this manner (by storing the second key K 204 in ciphertext 208*b* in module 101) a plaintext second key K 204 may not be (i) stored in module 101 for a relatively long time such as several hours or longer, and also (ii) recorded outside a nonvolatile memory.

In another embodiment, (A) the plaintext second key K 204 is recorded only in a volatile memory within CPU 101*b* such as a register or cache memory, where access to the register or cache memory is limited to the eUICC 107, and (B) after a successful authentication using the second key K 204, such as, but not limited to, a second authentication 311 below, the plaintext second key K 204 is flushed from the register or cache memory within CPU 101*b*. In this manner, after (A) a first time that module 101 conducts a step 207 to obtain a plaintext second key K 204 and the module 101 completes a full power cycling, then (B) the plaintext second key K 204 may not be recorded in any of a volatile memory, a non-volatile memory, or a protected memory within module 101 (but module 101 could record an encrypted second key K 204*a* in a ciphertext 208*b*).

For the embodiments where the second key K 204 is not recorded as plaintext in a nonvolatile memory within module 101, the module 101 can perform a step 207 with a ciphertext 208*b* recorded in a nonvolatile memory a second time to process or obtain the plaintext second key K 204. In other words, the second key K 204 can be recorded on a long-term basis as a ciphertext 208*b* for eUICC 107 within module 101, in an exemplary embodiment, thereby increasing the security of the second key K 204. In this case, either (i) the symmetric key 127 could be recorded in a nonvolatile memory 101*w* in order to allow decrypting of the ciphertext 208*b*, or (ii) the module 101 could receive the symmetric key 127 a second time by conducting a step 309 a second time. The module 101 can reconnect with the wireless network 102 and the MNO 104 using the first network identity 202 and the first key K 203 a second time, after the module 101 has already received the symmetric key 127 a first time. The MNO 104 may optionally authenticate the user 113 or M2M service provider 115 a second time such as a second step 308*b* (before sending the symmetric key 127 a second time) in order to confirm a second use of the first key K 203 is authorized.

After a module 101 with an eUICC 107 processes a key K deciphering algorithm 207 to obtain a plaintext second key K 204, the module 101 can connect with the wireless network 102 and mobile network operator 104 using the second network module identity 209 and the second network key 204. The module 101 using a network application 101*x* could send a second attach message 305 with the second network module identity 209. In another embodiment, the module 101 could send the second attach message 305 with the first network module identity 202, and in this case the MNO 104 could record from the previous steps 302*b* and 308*b* that a key K associated with the first network module identity 202 should change to the second key K 204.

But, given existing deployed infrastructure and systems for a mobile network operator 104, the use of two different keys K with the same network module identity may be more difficult to support, and for this case and with preferred embodiments, the module 101 attaches with the MNO 104 the second time with the second network module identity 209 that has been deciphered from (i) a ciphertext 208*b* in a step 207 above, or (ii) a ciphertext 208*a* in a step 206 above. The second attach message 305 can be equivalent to the first attach message 305, but with a change of module 101 sending the second network module identity 209. With a 4G LTE network, the second attach message 305 could comprise a radio resource connection request message, or a similar message could be utilized with other wireless networking standards as well, such as LTE Advanced or WiMAX. An attach message such as 305 in FIG. 3 could also comprise module 101 using a globally unique temporary identity (GTUI) that can be associated with the second network module identity 209. Other possibilities exist as well for the format or structure of an attach message 305 without departing from the scope of the present invention.

After sending the second attach message 305, the module 101 with a eUICC 107 can conduct a second authentication 310 with the mobile network operator 104. The module 101 and eUICC 107 could take the equivalent steps as the first authentication 304 depicted and described in this FIG. 3, but with a difference of using the second network module identity 209 and the second key K 204. In a second authentication 310, the mobile network operator 104 could send the module 101 a second RAND value 118 through the wireless network 102. A server 105 associated with MNO 104, such as, but not limited to, a HSS could have previously processed an authentication vector 117 comprising at least (i) the second RAND value 118, (ii) a network authentication token AUTN and sequence number (not shown), and (iii) a response value RES 119 for the second network module identity 209 and the second key K 204. The server 105 or HSS associated with the MNO 104 could send the authentication vector 117 to a server or MME that module 101 communicates with through the wireless network 102. The module 101 could receive the second RAND 118 using the network application 101*x*, and forward the second RAND 118 to the eUICC 107. The communication steps between a network application 101*x* and an eUICC 107 in FIG. 3 could also use the steps depicted and described in connection with FIG. 1*e*.

At a step 311, the eUICC 107 could calculate the second RES 119 using (i) the second RAND 118 received and (ii) the second key K 204. After receiving the exemplary second RAND 118 message, in order to conduct a second authentication 310, module 101 using an eUICC 107 could take steps to demonstrate to MNO 104 that module 101 has access to the same second key K 204 as recorded by the MNO 104 in an authentication vector 117. The MNO could record the second key K 204 in an authentication vector 117 a step 302*a* or step 302*b* above. Module 101 can properly respond to a challenge/nonce (such as a second RAND 118) in a message digest authentication by sending a secure hash value calculated using (i) the challenge/nonce and (ii) the second key K 204. The secure hash value can comprise the second RES 119. In exemplary embodiments, the eUICC 107 and wireless network 102 could use algorithms specified in ETSI TS 135 205-209, as well as subsequent and related standards, in order for module 101 using eUICC 107 to (i) calculate a secure hash value, and (ii) process related steps for a second authentication 310. After processing a second RES 119 in a step 311 using the second key K 204, the eUICC 107 could send the second RES 119 to the network application 101*x* in module 101. Module 101 could then send the second RES 119 to the mobile network operator 104 using the wireless network 102, as depicted in FIG. 3 and thereby complete a second authentication step 310 for the module 101. In an exemplary embodiment, as depicted in FIG. 1*f* above, the eUICC 107 could include an IP address 106*c* with an interface identifier 106*e* associated with the eUICC 107, and in this case the module 101 could send the second RES 119 value from the eUICC 107 to the MNO 104 through the wireless network 102.

At a step 312, the mobile network operator can receive the second RES 119 from the module 101 using the wireless network 102. A server 105 for the mobile operator network 104 associated with the wireless network 102 could compare the received second RES 119 with an internally recorded RES 119. The server 105 could receive an authentication vector 117 comprising at least the second RAND 118, second RES 119, and AUTN token for the second network module identity 209 before sending the second RAND 118 in a step 310 above. If the received second RES 119 matches the internally stored second RES 119 value, the wireless network 102 and mobile network operator 104 can consider or process that the module 101 is authenticated for a step 312. The wireless network 102, the MNO 104, and the module 101 can take subsequent steps (not shown) for the module 101 to access the IP network 111, including allowing module 101 to place and receive telephone calls and/or access the public Internet.

In an exemplary embodiment that utilizes the steps illustrated in FIG. 3, the first key K 203 can comprise a null value or the number zero, which is contemplated in standards and supported by commercial wireless networks 102 in order to support emergency services for a module 101 without a valid UICC or eUICC. The MNO 104 and wireless network 102 can provide limited access to the IP network 111, such that a user 113 of module 101 with a null or zero value for the first key K 203 could performs steps to authenticate or verify the user 113 identity in a step 308*b*. The limited access to the IP network 111 may not include access to the public Internet, but could include access to a server such as a web server for the user 113 to enter identification information. The data-link layer may not be encrypted due to the use of a null value for the first key K 203, but the application or transport layer could secure communication from a web browser on the module 101 to the web server, such as using transport layer security (TLS). Other possibilities exist as well for ciphering or securing data at the application or transport layer in a step 308*b* to authenticate a user 113 without encryption at the data-link layer (such as without encryption by the wireless network 102 due to a null value for first key K 203). In this embodiment where the first key K 203 comprises a null or zero value, after authentication of a user 113 or M2M service provider 115 in a step 308*b*, the second key K 204 used with a second authentication 310 can comprise a regular key K such as a non-null value or a random number.

FIG. 4

FIG. 4 is a flow chart illustrating exemplary steps for a module to use an eUICC and authenticate with a wireless network, in accordance with exemplary embodiments. The processes and operations, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 401, a module 101 can connect with a first wireless network 102. The first wireless network 102 could comprise a public land mobile network, a local area network such as WiFi, or the use of white-space spectrum. The module 101 could connect with the first wireless network 102 in order to obtain access to IP network 111 which could comprise the public Internet, although the IP network 111 could comprise a private network in some embodiments. Although not depicted in FIG. 4, a step 401 could also comprise the module 101 connecting to a wired network through USB interface 101v. Upon conclusion of a step 401 the module 101 can use an IP address such as IP address 106b in FIG. 1f in order to communicate with an eUICC subscription manager 109. As illustrated in FIG. 1f, in an exemplary embodiment the eUICC 107 could also have an IP address 106c after a step 401, although the use of an IP address for eUICC 107 is not required and the module 101 can be associated with one IP address for all external communications.

The module 101 can then use a step 205 in order to receive an eUICC profile 107c. The eUICC profile 107c could be received from the eUICC subscription manager 109 using the wireless network 102 and/or IP network 111 from a step 401 above. The module 101 could record the received eUICC profile 107c with the eUICC 107, including sending the eUICC profile 107c to the eUICC 107 or sharing memory 101e or 101w between the eUICC 107 and a network application 101x. The module 101 could use a network application 101x in order to receive the eUICC profile 107 from the eUICC subscription manager in a step 205, as depicted and described in connection with FIG. 3. The module 101 with an eUICC 107 could then decrypt the profile 107c in a step 206 using an eUICC profile key 107b. The eUICC profile key 107b could be recorded with an eUICC 107 before a step 206. The module 101 and/or eUICC 107 could receive the eUICC profile key 107b using a step 303 as depicted and described in connection with FIG. 3. The eUICC profile key 107b could be received using a key exchange, such as a Diffie-Hellman key exchange or an ECDH key exchange. Or, the eUICC profile key 107b could be recorded with the eUICC 107 by a module manufacturer. Other possibilities exist as well for a module 101 to record an eUICC profile key 107b before a step 206 without departing from the scope of the present invention. A module 101 and/or an eUICC 107 could use a profile deciphering algorithm 206 in a step 206, as depicted and described in connection with FIG. 2a and FIG. 2b. Upon conclusion of a step 206, a profile 107d could be recorded in an eUICC 107.

In a step 402, a module 101 can then select and activate the profile 107d from a step 206 in order to connect with a second wireless network 102. A module 101 could take several possible steps in order to select and activate the profile 107d. A module 101 could use radio 101z to search for radio beacons from base stations 103 for wireless networks 102 surrounding the module 101, and upon finding the second wireless network 102 to connect with, the module 101 could select the profile 107d. The profile 107d could include values in the set of network parameters 201 that match or conform with values transmitted by the wireless network 102, such as using the same mobile country code (MCC) and mobile network code (MNC) as recorded in the profile 107d. A module 101 could receive an instruction from an eUICC subscription manager 109 in order to activate the profile 107d, where the instruction could be received through the first wireless network 102 in a step 401 above.

In another embodiment, a module 101 or eUICC 107 could query the eUICC subscription manager 109 through the first wireless network 102 before activating the profile 107d in a step 402. Commercial business arrangements among the user 113 of module 101, the eUICC subscription manager 109, and the mobile network operator 104 can determine the timing for activating a profile 107d for a module 101 with an eUICC 107 in a step 402, such as a user 113 entering a new contract for service with a MNO 104 for the profile 107d. As contemplated herein and throughout the present invention, an activated profile 107d can comprise a selected and enabled network access application state as illustrated in Figure D.1 of ETSI TS 103 383 v.2013-02 for the activated profile 107d. Other possibilities exist as well for a module 101 to activate a profile 107d in a step 402 without departing from the scope of the present invention.

In a step 304 in FIG. 4, a module 101 using eUICC 107 can conduct a first authentication 304 with the second wireless network 102, using the first key K 203 recorded in the activated profile 107d. The module 101 could also send the first network module identity 202 from a profile 107d to the mobile network operator 104 in a step 304 in FIG. 4. The second wireless network 102 in a step 304 in FIG. 4 can be associated with a mobile network operator 104. The use of a first authentication 304 is also depicted and described in connection with FIG. 3 above. As noted in a first authentication 304, the first key K 203 could comprise a key with a null value in an exemplary embodiment, although a random number could be used for a first key K 203 as well. As depicted in FIG. 4, the steps 401 through 304 could comprise substeps within a step 403. The combined substeps comprising a step 403 can be used by a module 101 in exemplary embodiments including an embodiment illustrated in FIG. 6 below.

Although not depicted in FIG. 4, the mobile network operator 104 can conduct a separate step 308b to authenticate module 101 or a user 113 of module 101 using a second factor after a step 304. As described in a step 308b above, the second factor could comprise verifying or authenticating an identity of a user 113 associated with module 101. Note that the authentication of a user 113 can be conducted through the module 101 accessing a server 105 or a web page through the IP network 111 via the second wireless network 102 after the first authentication 304 using the first key K 203 (including embodiments where the first key K 203 comprises a null value).

In a step 309, the module 101 can receive a key from the second wireless network. The key in a step 309, as depicted in FIG. 3 above, can comprise a symmetric key 127 in order to decrypt a ciphertext 208b within profile 107d. As also contemplated and described in connection with a step 309 in FIG. 3, the key could comprise a module 101 receiving a ciphertext that includes a symmetric key 127 that has been ciphered with a key ciphering algorithm 216 using an asymmetric ciphering algorithm 219 and the eUICC public key 214, as illustrated in FIG. 2e. For a key ciphering algorithm 216 used with a step 309, (i) the symmetric key 127 can comprise the plaintext (as opposed to the eUICC profile key 107b depicted in FIG. 2e), and (ii) the MNO 104 could operate the key ciphering algorithm 216 instead of the eUICC subscription manager 109 depicted. In this embodiment of a step 309, a module 101 and/or an eUICC 107 could receive the key in the form of a ciphertext of symmetric key 127 in a step 309 and decrypt the ciphertext of symmetric key 127 with the eUICC private key 215 in order to read a plaintext symmetric key 127.

In a step 207 in FIG. 4, the module 101 and/or eUICC 107 can decrypt the ciphertext 208b with the second key K 204a using the symmetric key 127. The module 101 can use a key K deciphering algorithm 207 as depicted and described in connection with FIG. 2c above in order to read and record a plaintext second key K 204 from the ciphertext 208b in the profile 107d, where the profile 107d was previously decrypted and recorded using a step 206 above. As depicted in FIG. 2a, the ciphertext 208b can also include a second network module identity 209a, so the eUICC 107 can also read the plaintext second network module identity 209 in a step 207, if a second network module identity 209a is included in a ciphertext 208b. In an exemplary embodiment, the second plaintext key K 204 is recorded in a protected, nonvolatile memory such as, but not limited to, a flash memory 101w. In this embodiment, the protected nonvolatile memory could comprise a memory address designated by the module 101, CPU 101b, operating system 101h, a module program 101i, or the eUICC 107 as a memory address that can only be written and read by the eUICC 107. Other possibilities exist as well to those of ordinary skill in the art for a plaintext second key K 204 to be recorded in a protected, nonvolatile memory in a step 207 without departing from the scope of the present invention.

In another embodiment, as described in a step 207 in FIG. 3, the module 101 could record the encrypted second key K 204a in a nonvolatile memory, along with a symmetric key 127 (or an encrypted symmetric key 127 ciphered by a key ciphering algorithm 216). The module 101 or eUICC 107 could decrypt the encrypted symmetric key 127 in order to decrypt the ciphertext 208b that contains the second key K 204a each time the module 101 or eUICC 107 needs to read a plaintext second key K 204 for an conducting an authentication step 310, plus the subsequent derivation of additional keys such as CK and IK, Kasme, Kupenc, etc. using the plaintext second key K 204 and a RAND 118 value.

After reading a plaintext second key K 204 from a ciphertext 208b in a step 207 using the symmetric key 127, the module 101 and/or eUICC 107 can conduct a second authentication 310 step using the plaintext second key K 204, in order to authenticate with the second wireless network 102. The second wireless network 102 can comprise the same wireless network 102 the module 101 communicates with in a step 304 above. The use of a plaintext second key K 204 in a second authentication 310 step is depicted and described in connection with FIG. 3. Although not illustrated in FIG. 4, the module 101 could send a detach message or equivalent to temporarily disconnect from the second wireless network 102 after a step 309 and before a step 310 illustrated in FIG. 4. A step 310 can comprise the module 101 sending a radio resource connection request to the second wireless network 102 with a network module identity associated with the second key K 204. A step 310 can be completed by a module 101 and/or an eUICC 107 sending a RES 119 value calculated using (i) a RAND 118 received and (ii) the second key K 204.

Although not illustrated in FIG. 4, after a step 310 by a module 101 and/or an eUICC 107, the MNO 104 could verify the RES 119 and then the module 101 and the wireless network 102 associated with the MNO 104 could take subsequent steps for a module 101 to have access to the IP network 111 including the public Internet. The module 101 and/or eUICC 107 could derive session keys (such as, but not limited to a key CK) for encrypting data through the wireless network using a RAND 118 received in a step 310 and the second key K 204, and the module 101 and/or eUICC 107 could also derive an integrity key for a session (such as, but not limited to, an integrity key IK). Using an authenticated module 101 from a step 310, the MNO 104 can meter services rendered to a module 101 after a step 310 in order to bill or invoice a user 113 or M2M service provider 115.

FIG. 5a

Figure 5A:
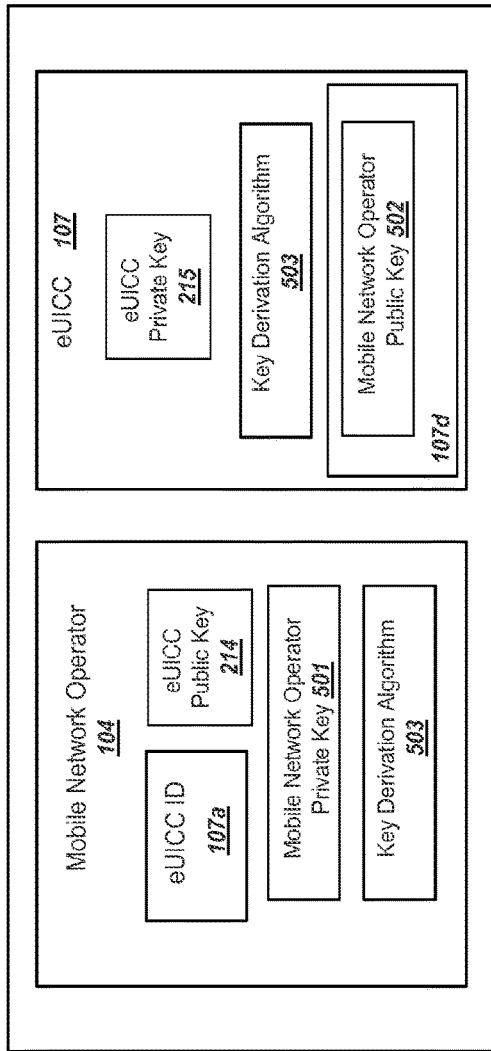
FIG. 5a is a graphical illustration of a public keys, private keys, and a key derivation algorithm, in accordance with exemplary embodiments.

FIG. 5a is a graphical illustration of a public keys, private keys, and a key derivation algorithm, in accordance with exemplary embodiments. An eUICC 107 within a module 101 can include an eUICC private key 215, which can be associated with an eUICC public key 214. The eUICC private key 215 and eUICC public key 214 can comprise a public key infrastructure (PKI) key pair for eUICC 107. The MNO 104 can record the eUICC public key 214 along with an eUICC identity 107a, such that the MNO 104 can properly associate one of a plurality of eUICC public keys 214 with the proper eUICC 107. Although not illustrated in FIG. 5a, a MNO 104 could record the eUICC public key 214 and an associated eUICC identity 107a in a database. The MNO 104 could receive the eUICC public key 214 and the eUICC identity 107a from an eUICC subscription manager 109 through an IP network 111 in a step 302a or step 302b of FIG. 3. The use of, source, and additional details regarding an eUICC public key 214 and eUICC private key 215 are also depicted and described in connection with FIG. 2d above.

The mobile network operator 104 could also be associated with an MNO private key 501 and an MNO public key 502, which could comprise a PKI key pair for the mobile network operator. The mobile network operator 104 could process or derive the PKI key pair using steps and algorithms equivalent to the steps and algorithms for an eUICC 107 to obtain the eUICC public key 214 and eUICC private key 215. The PKI keys depicted in FIG. 5a could be processed using RSA algorithms or elliptic curve cryptography (ECC) algorithms, and other possibilities exist as well for the format of PKI keys without departing from the scope of the present invention. The public keys in FIG. 5a can comprise keys recorded in an X.509 certificate, although the use of an X.509 certificates with public keys 214 and 502 are not required. The public key 214 and 502 in the form of an X.509 certificate can optionally be signed by a certificate authority. As illustrated in FIG. 5a, the mobile network operator public key 502 can be recorded in the eUICC profile 107d. The MNO 104 could send the MNO public key 502 to the eUICC subscription manager 109 in a step 302a or 302b depicted and described in FIG. 3, and the eUICC subscription manager 109 could include the MNO public key 502 in the profile 107d. An eUICC profile 107d could also include the additional data for an eUICC profile 107d as depicted and described in FIG. 2a, in addition to the MNO public key 502.

As illustrated in FIG. 5a, the MNO 104 and eUICC 107 can both record a key derivation algorithm 503. Exemplary key derivation algorithm 503 could support a Diffie Hellman key exchange, an Elliptic Curve Diffie Hellman (ECDH) key exchange (ECDH), or similar algorithms for each node to mutually derive a key using public and private keys. For embodiments where (A) eUICC public key 214, eUICC private key 215, MNO public key 502, and MNO private key 501 utilize (i) elliptic curve cryptography (ECC) and (ii) a common, shared elliptic curve, then (B) a key derivation algorithm 503 in FIG. 5a can comprise an algorithm for conducting an ECDH key exchange. The use of an ECDH key exchange was also described and contemplated between an eUICC subscription manager 109 and an eUICC 107 in step 303 in FIG. 3 above. For embodiments where a key derivation algorithm 503 supports a Diffie Hellman key exchange, the key derivation algorithm 503 could record a multiplicative group of integers modulo p, where p is prime, and g is a primitive root mod p. In exemplary embodiments, p can be sufficiently large, such as, but not limited to, and exemplary prime number of at least 250 digits, and g can be a small number, such as, but not limited to, the number 5. In exemplary embodiments, additional values pertaining to the operation of a key derivation algorithm 503 can be transferred between two nodes using a token 505 described in a FIG. 5b and FIG. 5c below.

FIG. 5b

Figure 5B:
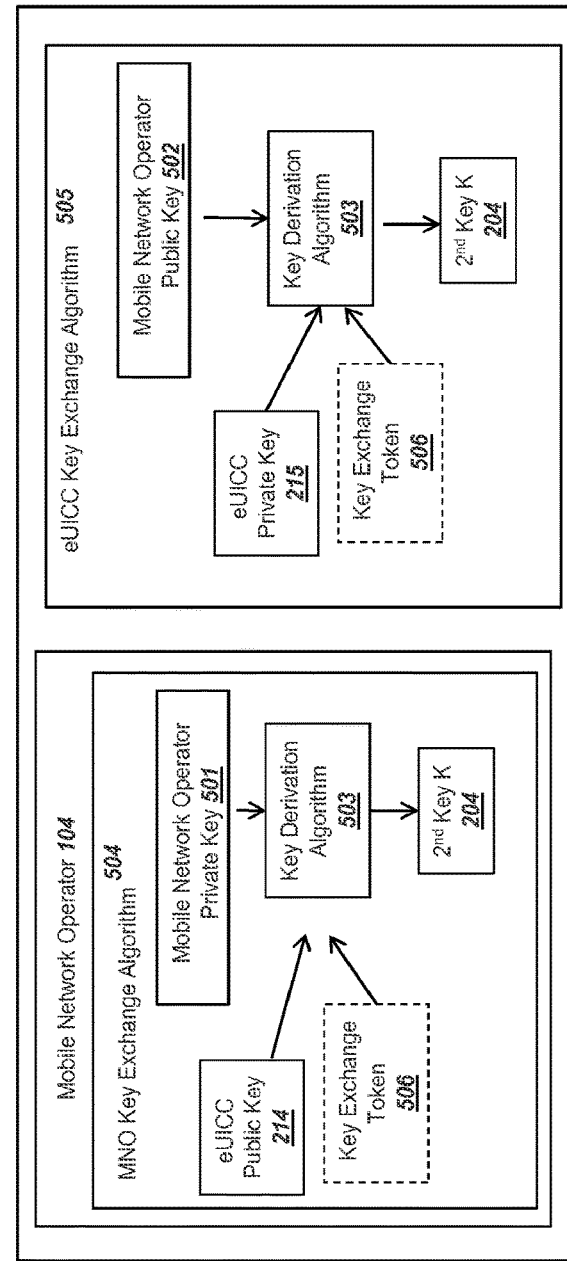
FIG. 5b is a graphical illustration of deriving a second key K using public keys, private keys, and a key derivation algorithm, in accordance with exemplary embodiments.

FIG. 5b is a graphical illustration of deriving a second key K using public keys, private keys, and a key derivation algorithm, in accordance with exemplary embodiments. A mobile network operator 104 could process a MNO key exchange algorithm 504 in order to output or determine a second key K 204. A module 101 with an eUICC 107 could process an eUICC key exchange algorithm 505 in order to output or determine the same second key K 204. The MNO key exchange algorithm 504 and the eUICC key exchange algorithm 505 could include a key derivation algorithm 503, and a key derivation algorithm 503 is also depicted and described in connection with FIG. 5a above. The MNO 104 and module 101 could share or communicate a key exchange token 506 in order to operate the key exchange algorithm 505. In this manner, a module 101 with an eUICC 107 and a mobile network operator 104 could mutually derive or share the second key K 204 without MNO 104 transmitting or sending the second key K 204, even in an encrypted form such as a second key K 204a in a ciphertext 208b, to either (i) eUICC subscription manager 109 in a step 302a or step 302b, or (ii) to a module 101 in a profile 107c.

For a MNO key exchange algorithm 504, a mobile network operator 104 using a server 105 could input the mobile network operator private key 501, the eUICC public key 214, and a key exchange token 506 into a key derivation algorithm 503 in order to output the second key K 204. Note that the key derivation algorithm 503 in both a MNO key exchange algorithm 504 and an eUICC key exchange algorithm 505 can include additional or separate processing steps than those contemplated in a Diffie-Hellman key exchange and an ECDH key exchange. Additional steps than those contemplated in a Diffie-Hellman key exchange or ECDH key exchange for a key derivation algorithm 503 include transforming key output by these key exchange protocols into a key length and format compatible and suitable for a key K for use with wireless networks. In a key derivation algorithm 503, the output of a Diffie-Hellman key exchange and an ECDH key exchange could be input into a secure hash algorithm, such as SHA-256, which could then be truncated to select a 128 bit second key K 204 using a key derivation algorithm 503. For a MNO key exchange algorithm 504, the security key exchange token 506 can depend upon the algorithm used in a key derivation algorithm 503.

For embodiments where key derivation algorithm 503 comprises a Diffie-Hellman key exchange, the key exchange token 506 can comprise integer values of p and g. Or, with a Diffie-Hellman key exchange the security key exchange token 506 sent from a MNO 104 could comprise a value equal to g^a mod p where (x) the values or p and g have been previously shared between MNO 104 and eUICC 107, and (y) the value "a" can comprise the MNO private key 501. A security key exchange token 506 received by MNO 104 for input into a key derivation algorithm for a eUICC 107 could comprise a value of g^b mod p, where b comprises the eUICC private key 215. For embodiments where key derivation algorithm 503 comprises an ECDH key exchange, the key exchange token 506 can be a common base point G. The base point G could also be (i) recorded in an eUICC profile 107d, or (ii) sent from a mobile network operator 104 to module 101, or (iii) sent from the module 101 to the mobile network operator 104. Other algorithms besides an ECDH or Diffie Hellman key exchange can be utilized as well at a step 503, including a key exchange according to the American National Standards Institute (ANSI) standard X-9.63, and a key exchange token 506 could include a number or value associated with these other algorithms for a key derivation algorithm 503.

For an eUICC key exchange algorithm 505, a module 101 with an eUICC 107 could input the eUICC private key 215 and the mobile network operator public key 502 into a key derivation algorithm 503. Note that the input into the key derivation algorithm 503 could also optionally include a key exchange token 506. The key derivation algorithm 503 in an eUICC key exchange algorithm 505 could accept the input and output the second key K 204. The key derivation algorithm 503 in an eUICC key exchange algorithm 505 could be equivalent to the key derivation algorithm 503 in a MNO key exchange algorithm 504 described above. The key exchange token 506 in an eUICC key exchange algorithm 505 could comprise a value similar to the key exchange token 506 used in a MNO key exchange 504 described above. In a Diffie-Hellman key exchange for a key derivation algorithm 503 in a eUICC key exchange algorithm 505, the key exchange token 506 can comprise a value of either (i) integers p and g as described in a MNO key exchange 504, or (ii) number g^a mod p. In an ECDH key exchange for key derivation algorithm 503 in a eUICC key exchange algorithm 505, the key exchange token 506 can comprise a base point G. A key derivation algorithm 503 can output a second key K 204. Other possibilities exist as well for the use of PKI keys and tokens in key exchange algorithms for those of ordinary skill in the art without departing from the scope of the present invention.

FIG. 5c

Figure 5C:
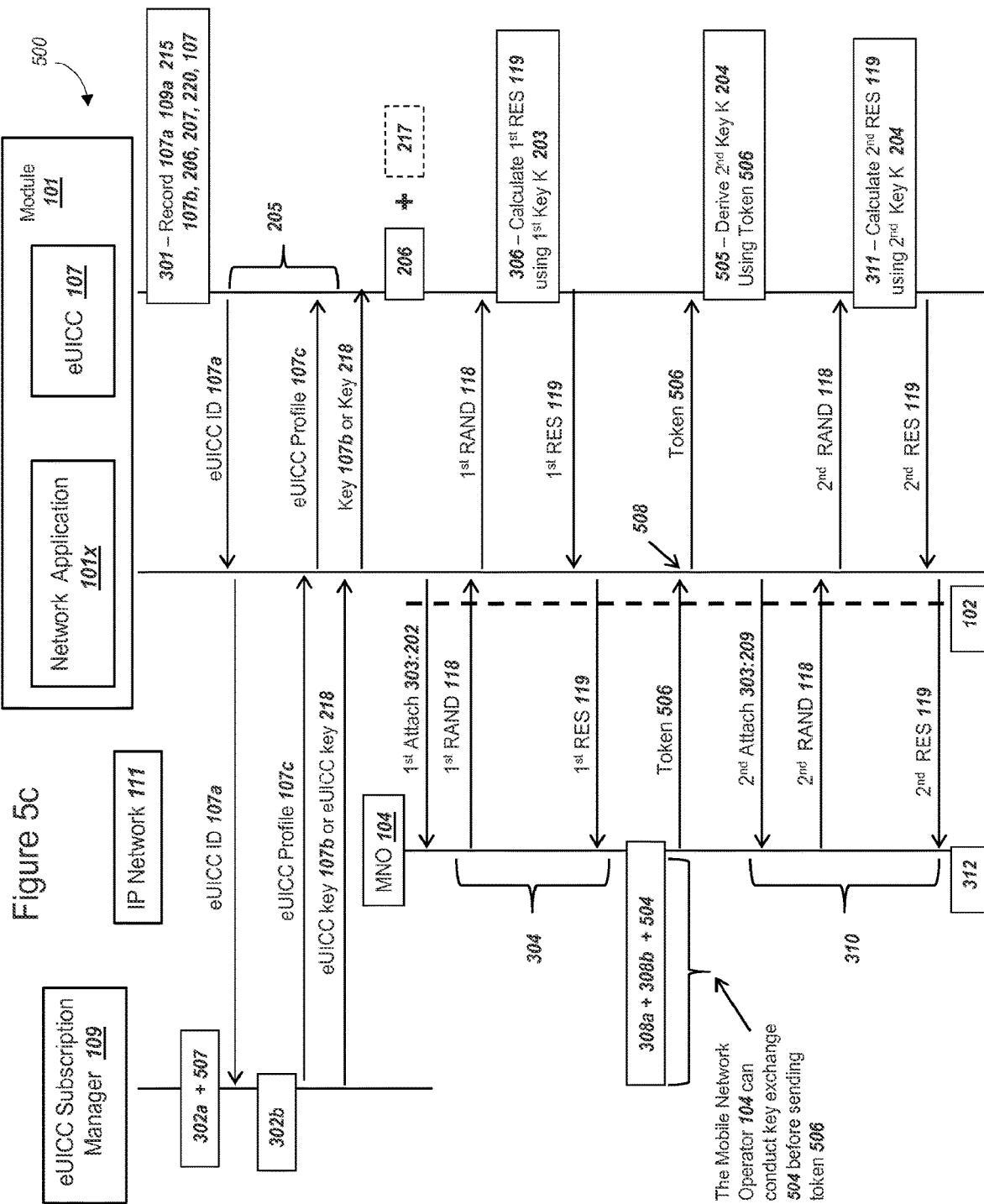
FIG. 5c is a simplified message flow diagram illustrating an exemplary system with exemplary data sent and received by a module with an eUICC, in accordance with exemplary embodiments; and, FIG. 6 is a flow chart illustrating exemplary steps for a module to use an eUICC and authenticate with a wireless network, in accordance with exemplary embodiments.

FIG. 5c is a simplified message flow diagram illustrating an exemplary system with exemplary data sent and received by a module with an eUICC, in accordance with exemplary embodiments. System 500 can include an eUICC subscription manager 109, an IP network 111, a mobile network operator 104, a mobile device 101. A module 101 can include a network application 101x and an eUICC 107. The operation of a system 500 can be similar to a system 300 in FIG. 3, except for the steps noted in this FIG. 5c where different steps can be taken than those within a FIG. 3. As depicted for a system 500 in FIG. 5c, like numerals for steps and messages for a system 500 in FIG. 5c can comprise like steps and messages within a FIG. 3. Different numerals discussed below can comprise different steps or messages for a system 500. Many of the same steps common for a system 500 in FIG. 5c and a system 300 in FIG. 3 will be summarized in this FIG. 5c, while differences between the two systems (including the use of different numerals for different steps or messages) are described in more detail herein. As described in a step 302a and 302b in FIG. 3, a mobile network operator 104 can send the eUICC subscription manager 109 information for a profile 107d in a step 302a or 302b, where the information can include the network parameters 201, the first network module identity 202, and the first key K 203. The listed exemplary data for a profile 107d from the previous sentence are also discussed for a profile 107d in FIG. 2a.

For a step 507 in a system 500, the MNO 104 can omit sending an encrypted second key K 204a in a ciphertext 208b within the data for the profile 107d. In other words, the profile 107d can omit the second key K 204 in either a plaintext or ciphertext form after a step 507 in a system 500. The second key K 204 for a module 101 with eUICC 107 can be derived by a mobile network operator 104 in a MNO key exchange algorithm 504 and an eUICC key exchange algorithm 505 below in FIG. 5c. Thus, in an embodiment illustrated in FIG. 5c, the second key K 204 for a second authentication 310 does not need to be transferred to the eUICC subscription manager 109 from MNO 104 for the eUICC subscription manager 109 to include in a profile 107d. Similarly, in a system 500, the second key K 204 does not need to be transferred to the eUICC 107 in a profile 107c. In embodiments where (x) the MNO sends network access credentials such as the first and second network module identities 202 and 209a and a first key K 203 are sent in a step 302b, then (y) a step 507 to omit the sending of the second key K 204 could take place with a step 302b instead of the step 302a as depicted. The MNO 104 can send the first and second network module identities 202 and 209a and a first key K 203 in a step 302a or a step 302b to the eUICC subscription manager 109. The MNO 104 can send to the eUICC subscription manager 109 the first and second network module identities 203 and 209a and a first key K 203 in a profile 107d in a step 302a or 302b, and the eUICC subscription manager 109 could receive the first and second network module identities 202 and 209a and a first key K 203 in a step 302a or a step 302b. Other possibilities for combinations of data sent from a MNO 104 to an eUICC subscription manager 109 in a step 302a, 302b, and 507 without departing from the scope of the present invention.

As depicted in FIG. 5c, an eUICC 107 in module 101 could perform steps 301, then step 205 to receive a profile 107c, then receive an eUICC profile key 107b, and then convert the profile 107c into a profile 107d using the eUICC profile key 107b in a step 206. The eUICC profile key 107b could also be (i) ciphered with a key ciphering algorithm 216, sent from the eUICC subscription manager 109 as an encrypted eUICC profile key 218, (ii) and then deciphered by a module 101 and/or eUICC 107 with a step 217, as described in connection with FIG. 2e above. The module 101 and/or an eUICC 107 could (i) receive an encrypted eUICC profile key 107b in the form of an key 218 and (ii) use a key deciphering algorithm 217 to decrypt the encrypted eUICC profile key 107b in order (iii) to read a plaintext eUICC profile key 107b and then (iv) use the plaintext eUICC profile key 107b to decrypt the ciphertext 208a.

As depicted in FIG. 5c, after a module 101 sends a eUICC identity 107a and receives an eUICC profile 107c in a step 205, the module 101 can conduct a step 206 in order to decrypt a ciphertext 208a that can include a first key K 203 using an eUICC profile key 107b. For the embodiments contemplated in FIG. 5c, where the second key K 204 can be derived or determined using a key exchange in steps 504 and 505 below, the second network module identity 209a can be included in the ciphertext 208a (as opposed to being included in the ciphertext 208b as depicted in FIG. 2a). One reason can be that a ciphertext 208b can be omitted from an eUICC profile 107d in embodiments where the second key K 204 can be mutually derived by the eUICC 107 and the MNO 104, so there may be no need to include a separate ciphertext 208b within the eUICC profile 107d.

After reading a first network module identity 202 and the first key K 203, the module 101 can conduct a first authentication 304. Note that the first key K 203 can comprise key with a null value, as contemplated in wireless network 102 standards which support the use of emergency services where a module 101 may not include a valid first key K 203. In this case where the first key K 203 comprises a null value, the use of a ciphertext 208a can also be optionally omitted, such that the receipt of an eUICC profile key 107b and the use of a ciphertext 208a could also be optionally omitted and a profile 107c could include plaintext for the first key K 203 and network module identity 202. As depicted and described in connection with FIG. 3, a module 101 and MNO 104 could conduct a first authentication step 304 in order to authenticate the module 101 using the first key K 203. The first key K could comprise a non-null value in exemplary embodiments. A step 306 to calculate a first RES 119 value using the first key K 203 from a profile 107d could be included in a first authentication step 304.

The mobile network operator 104 could compare the first received RES 119 with a recorded RES 119 in order to authenticate the module 101 with the eUICC 107 in a step 308a. A mobile network operator 104 can authenticate the module 101 using a step 308a in order to provide access to the IP network 111, and the access to the IP network 111 can be limited (such as, but not limited to excluding access to the public Internet after a step 308a). The module 101 could use access to the limited or restricted IP network 111 in order for a user 113 of module 101 to conduct an authentication with the mobile network operator 104 using a second factor, as described in a step 308b in FIG. 3.

After authenticating the module 101 with the first network module identity 202 and the first key K 203 in a step 308a, the mobile network operator 104 could authenticate a user 113 or verify a M2M service provider 115 is associated with the module 101 in a step 308b. The authentication of a user 113 or M2M service provider 115 in a step 308b could comprise authenticating module 101 and/or eUICC 107 with a second factor, where the second factor comprises or includes a secure association of a user 113 or M2M service provider 115 with the module 101. As described in FIG. 3 above, a step 308b could result in the secure association of an identity for the user 113 or the M2M service provider 115 with an identity of the module 101. After conduction a step 308b as depicted and described in connection with FIG. 3 above, the MNO 104 can record the second network module identity 209 in the eUICC profile 107d is associated with a particular user 113 or a particular M2M service provider 115.

In a step 308b, the MNO 104 can also determine (i) the first network module identity 202 used in step 304 is associated with other identities such as module identity 110, profile identity 107e, eUICC identity 107a, and the second network module identity 209. By (i) authenticating a user 113 or (ii) verifying an identity for module 101 is associated with a M2M service provider 115 in a step 308b, MNO 104 can determine the second network module identity 209 (used in a subsequent authentication step 310) belongs to or is associated with a particular user 113 or M2M service provider 115. In other words, without a separate authentication step 308b in FIG. 5 and FIG. 3, MNO 104 may not be able to securely determine that the second network module identity 209 from a profile 107d belongs to a particular user 113 or M2M service provider 115. For embodiments where the module 101 is associated with a M2M service provider 115, then a step 308b in FIG. 5c could comprise the MNO 104 verifying that an identity received in a first authentication 304 (such as, but not limited to, the first network module identity 202) is associated with an M2M service provider 115, such as checking the identity in a list of identities for modules 101 belonging to M2M service provider 115.

After successfully authenticating or verifying an identity of a user 113 or an M2M service provider 115 is associated with module 101 in a step 308b, MNO 104 could process an MNO key exchange algorithm 504 in order to record a second key K 204 for use in a subsequent second authentication 310 for module 101. The second authentication 310 can use different network access credentials (i) associated with the module 101 and (ii) obtained by module 101 using an eUICC key exchange algorithm 505. Although not illustrated in FIG. 5c, a MNO 104 could obtain the data for processing a MNO key exchange algorithm 504 in several different ways. A MNO 104 could receive the eUICC public key 214 for an MNO key exchange algorithm 504 from either (i) the module 101 or eUICC 107 directly after the first authentication 304 or (i) the eUICC subscription manager 109 in a step 302b above, where the eUICC subscription manager 109 could record the eUICC public key 214. Other possibilities exist as well for a MNO 104 to receive an eUICC public key 214 associated with an identity for module 101 such as the eUICC identity 107a. The recording of an eUICC public key 214 with an MNO 104 is also depicted and described in connection with FIG. 5a above.

For a MNO key exchange algorithm 504 in FIG. 5c, the MNO 104 could also input a key exchange token 506 and a MNO private key 501, in addition to the eUICC public key 214, as illustrated in FIG. 5b above. After performing a MNO key exchange algorithm 504 in FIG. 5c, the MNO 104 can record the second key K 204 for the second module identity 209 (which is associated with the first module identity 202 in the profile 107d). As contemplated for a key exchange token 506 in FIG. 5a and FIG. 5c, the key exchange token 506 could be any of the cases (A) initially processed, derived, or determined by the MNO 104, (B) shared between the MNO 104 and module 101 with the eUICC 107, such as, but not limited to, recording the key exchange token 506 in the profile 107d, or (C) initially processed, derived, or determined by module 101. FIG. 5c illustrates an embodiment for case (A) with key exchange token 506, where the MNO 104 derives or determines the key exchange token 506 value and subsequent sends the key exchange token 506 value to the module 101 with the eUICC 107. The MNO 104 can send the key exchange token 506 in a message 508, and a network application 101x for the module 101 can receive the key exchange token 506 in the message 508 and forward the key exchange token 506 to the eUICC 107. For case (A) the MNO 104 can omit sending the key exchange token 506 until after the user 113 or M2M service provider 115 for module 101 has been successfully authenticated or verified in a step 308b.

In a related embodiment to the embodiment depicted in FIG. 5c, for case (B) with key exchange token 506, a separate message 508, to communicate or transfer the key exchange token 506 between the MNO 104 and module 101 after a step 504, can optionally be omitted, since both sides (MNO 104 and module 101) could record the key exchange token 506 before a step 505 by a module 101 with an eUICC 107 below. For case (B), the MNO 104 could send a signal in a message 508 to the module 101 that the authentication step 308b of a user 113 or an M2M service provider 115 has been successfully completed, and thus module 101 could proceed with an eUICC key exchange algorithm 505 using the recorded key exchange token 506.

For case (C) with key exchange token 506, the eUICC 107 could derive or determine the key exchange token 506 and subsequently send the key exchange token 506 to the MNO in a message 508. In this case (C), the MNO 104 could receive the key exchange token 506 (i) before processing the MNO key exchange algorithm 504, and (ii) using the connection with the module 101 from the first authentication 304. For case (C), the MNO 104 can require the successful completion of an authentication step 308b for a user 113 or M2M service provider 115 before accepting the key exchange token 506 from the module 101.

In another exemplary embodiment, step 504 and step 505 can use different values for the key exchange token 506, and both MNO 104 and module 101 can send the tokens 506 in a message 508 to the other node. In exemplary embodiments, a message 508 comprising the key exchange token 506 can be transferred through the IP network 111, where access to the IP network 111 can be enabled by the first authentication 304 with the first key K 203. Other possibilities exist as well for the transfer of a key exchange token 506 between a MNO 104 and a module 101 with an eUICC 107 for conducting a key exchange without departing from the scope of the present invention.

As depicted in FIG. 5c, a module 101 with an eUICC 107 can conduct an eUICC key exchange algorithm 505 in order to determine or read a second key K 204. As depicted and described for an eUICC key exchange algorithm 505 in FIG. 5b above, the module 101 can input an MNO public key 502, an eUICC private key 215, and the key exchange token 506 into a key derivation algorithm 503 in order to output the second key K 204. Note that the number, value, or sequence of bits for the second key K 204 determined by a MNO 104 in a step 504 can be equal to the number, value, or sequence of bits for the second key K 204 determined by a module 101 with an eUICC 107 in a step 505. The mutual derivation of the second key K 204 by a MNO 104 in a step 504 and a module 101 in a step 505 can be different and superior to conventional technology for either (i) a physical UICC or (ii) an eUICC, since the second key K 204 does not need to be transferred in either physical or electronic form, where the electronic form could include encrypting the second key K 204 into a ciphertext. Supporting the derivation of a second key K 204 as depicted and described herein can be superior to the electronic or physical distribution of a key K, since a different second key K 204 can be utilized by repeating steps 504 and 505 a second time, such as with a different key exchange token 506. In this manner, the second key K 204 associated with the second network module identity 209 could be rotated or changed periodically, thereby increasing the security of a system 500 compared to the use of a static, non-changing second key K 204 for the lifetime of a module 101 with a profile 107d.

After a step 505 in FIG. 5c, the subsequent steps and messages for communication between the module 101 and the MNO 104 can be the same or equivalent to those in FIG. 3 after a step 207. In other words, the second key K 204 as used by a module 101 and/or eUICC 107 for embodiments in a FIG. 5c can be equivalent or similar to the processing and recording steps depicted and described in FIG. 3, upon module 101 with an eUICC 107 reading the second key K 204 in a step 207 in FIG. 3. In a system 500, the module 101 or eUICC 107 could record the second key K 204 in a protected, nonvolatile memory as described in a step 207 of FIG. 3. Other possibilities exist as well without departing from the scope of the present invention for the location or techniques of storing the second key K 204 resulting from a step 505.

As depicted and described in connection with FIG. 6 below, the module 101 could record the second key K 204 in a volatile memory (and not storing the second key K 204 in nonvolatile memory), including potentially only within a register or cache memory of CPU 101b. In this manner, the security of the derived second key K 204 can be enhanced, since upon or after power off of a module 101, a third party could not probe or read nonvolatile memory looking for the second key K 204. Since a volatile memory could be flushed upon loss of power or other circumstances, a MNO 104 and module 101 could repeat the steps 504 and 505, respectively, including the transfer of a key exchange token 506, a subsequent time when a module 101 needs to process or derive a new, subsequent second key K 504. In other words, a module 101 can conduct a step 505 with a different key exchange token 506 at a later time after the first instance of a step 505 in order to derive a different, subsequent second key K 204.

After deriving the second key K 204 in a step 505 in FIG. 5c, the module 101 with the eUICC 107 can authenticate with the MNO 104 using the wireless network 102, the second network module identity 209, the second key K 204. The module 101 could conduct a second authentication 310 with the mobile network operator using the second key K 204, as depicted in FIG. 5c, which is also equivalent to the second authentication 310 depicted in FIG. 3 above. Note that the module 101 could detach or disconnect from the wireless network 102 (i) after a sending/receiving a message 508 with key exchange token 506 and (ii) before sending the exemplary second attach message 303 with the second network module identity 209.

The eUICC 107 within module 101 could use (i) the second key K 204 from a step 505, and (ii) a second RAND 118 value from the MNO 104 to calculate a second RES 119 value in a step 311. The eUICC 107 can send the second RES 119 to the network application 101x, and the module 101 can send the second RES 119 to the mobile network operator 104 through the wireless network 102. The MNO 104 could compete the second authentication in a step 312 by verifying the second RES 119 is correct using (i) the second key K 204 derived by the MNO 104 in a step 504 above, and (ii) the second RAND 118 value sent to the module 101. Upon successful authentication using the second key K 204, as depicted and described in connection with FIG. 3, the module 101 and MNO 104 could take subsequent steps after a step 312 for the module 101 to have access to the IP network 111 and also the public Internet.

In another embodiment contemplated in FIG. 5c, the mobile network operator 104 can send the second key K 204 to the module 101 using the wireless network 102 in a message 508. In other words, the exemplary token 506 in FIG. 5c could comprise the second key K 204, as opposed to an exemplary key exchange token 506. In this embodiment, the use of a key derivation algorithm 503 in a step 504 could use input of a random number from random number generator 128 into the key derivation algorithm 503 (instead of PKI keys), and the output could be the second key K 204. Or, the key derivation algorithm 503 in a step 504 could simply assign a random number to the second key K 204. After a step 308b and step 504, the mobile network operator 104 could send the second key K 204 in a message 508. The second key K 204 in a message 508 could be encrypted using a key ciphering algorithm 216. The message 508 with the second key K 204 as the token 506 could be received by the module 101 and decrypted using a key deciphering algorithm 217. In another embodiment, the token 506 received by a module 101 could comprise (i) the second key K 204 as plaintext at the application layer, but (ii) ciphered at the data-link layer using the first RAND value from a step 304 and the first key K 203. Other possibilities exist as well for a token 506 to comprise a second key K 204 without departing from the scope of the present invention.

The order of many of the steps and messages depicted within a system 500 could be changed without departing from the scope of the present invention. For example, a step 504 could also be conducted concurrently with a step 302b (instead of with a step 308b), such that a mobile network operator 104 could calculate a second key K 204 using a MNO key exchange algorithm 504 at the same time when MNO 104 sends the first network module identity 202 and first key K 203 to the eUICC subscription manager 109. After receiving (i) an eUICC identity 107a from an eUICC subscription manager 109 and (ii) and an eUICC public key 214 in a step 302b, the mobile network operator 104 can process a MNO key exchange algorithm 504 in order to calculate or process a second key K 204.

In an exemplary embodiment, a mobile network operator 104 could receive a list of eUICC public keys 214 and eUICC identities 107a from an M2M service provider 115 before eUICC subscription manager 109 receives the eUICC identity 107a in a step 205. The MNO 104 could use the data received from a M2M service provider 115 (including a list of eUICC identities 107a and eUICC public keys 214) in order to derive the second key K 204 using a MNO key derivation algorithm 504 and the key exchange token 506. The MNO 104 could send the key exchange token 506 to an eUICC subscription manger 109 before the eUICC subscription manager 109 participates in a step 205 as illustrated in FIG. 5c, and the eUICC subscription manager 109 could include the key exchange token 506 with the eUICC profile 107c, such that module 101 could receive the key exchange token 506 in the eUICC profile 107c.

In this embodiment (which can also comprise a case (B) for the transfer of key exchange token 506 for a message 508 as described above), a module 101 using an eUICC 107 with profile 107d and key exchange token 506 could potentially derive the second key K 204 before a step 308b, but in preferred embodiments the mobile network operator 104 does not allow the use of the second key K 204 until after an authentication step 308b of a user 113 or M2M service provider 115. In another embodiment, the values for the first network module identity 202 and the second network module identity 209 could be the same or equal, such that the module 101 uses the same network module identity for both first authentication 304 and a second authentication 310. In this case, the MNO 104 can support a change in key K used with the first network module identity 202 from the first key K 203 to the second key K 204. The first key K 203 can be included in a profile 107d, but the second key K 204 can be derived by an MNO 104 using a step 504 and a module 101 using a step 505. Other possibilities exist as well for a MNO 104 and a module 101 to mutually derive a second key K 204 for use with an eUICC 107 without departing from the scope of the present invention.

FIG. 6

FIG. 6 is a flow chart illustrating exemplary steps for a module to use an eUICC and authenticate with a wireless network, in accordance with exemplary embodiments. An exemplary system 500 depicted and described in connection with FIG. 5c can also support the repeated derivation of a second key K 204 for a MNO 104 and module 101 with an eUICC 107. The use and support for different second keys K 204 over time can increase security, since the second key K 204 can be securely and periodically rotated, thereby enhancing the security and efficiency of a system 500, compared to either (i) physically changing a UICC each time a new key K is desired, or (ii) querying, downloading, and selecting a new profile 107c or profile 107d each time the use of a different key K is desired (including steps to communicate and record a second key K 204 in the profile 107d). In other words, the use of multiple second keys K 204 over time can be accomplished for the same profile 107d.

A step 403 in FIG. 6 can comprise a module 101 with an eUICC 107 conducting the substeps for a step 403 as depicted and described in connection with FIG. 4. In a step 403, a module 101 could connect with a first wireless network 102, receive an eUICC profile 107c, decrypt the profile 107c using an eUICC profile key 107b, activate the profile 107d, and authenticate with a second wireless network 102 using a first key K 203 from the profile 107d. As noted above, other possibilities exist as well for a module 101 to record an eUICC profile 107d, such as the loading of a profile 107d by a manufacturer, without departing from the scope of the present invention.

After successful authentication of the module 101 at the conclusion of a substep 304 in a step 403, a user 113 associated with the module 101 could conduct an authentication step 308b with the mobile network operator 104. A step 308b can be useful for a mobile network operator 104 to authenticate or securely associate (i) a module 101 with (ii) a legal entity contractually responsible for the services used by a module 101. The use of a step 308b is also described in FIG. 3. Note that module 101 could be associated with an M2M service provider 115 instead of a mobile phone subscriber such as an individual, and in this case the M2M service provider 115 could take steps before a step 308b in order to inform or confirm with MNO 104 that module 101 with an identity such as module identity 110 or the first network module identity 202 belongs to or is associated with the M2M service provider 115.

In other words, a MNO 104 may not have control over the distribution or recipient of a profile 107c from an eUICC subscription manager 109 in a step 403, and a user authentication in a step 308b allows a MNO 104 to confirm, verify, or establish a contractual relationship with a user 113. Business contracts and procedures for an MNO 104 to provide service to a module 101 with an eUICC 107 with profile 107d could require that a user 113 successfully completes an authentication step 308b (with example steps described in FIG. 3 above), before the MNO 104 provides service such as voice calls or access to the public Internet. The second factor in a step 308b can be data communicated between the MNO 104 and the user 113 to confirm an identity of the user 113. Examples of data for the second factor in a step 308b are described in connection with a step 308b in FIG. 3. The first factor contemplated in a system 300 or system 500 can be the successful receipt of a RES 119 value in a first authentication 304. Upon conclusion of the step 308b the MNO 104 could securely determine and record that a module 101 with the first network module identity 202 and/or the second network module identity 209 from the profile 107d is associated with an authenticated user 113.

The module 101 could then perform a step 508 in order access a key exchange token 506. As described for a key exchange token 506 in FIG. 5c, the module 101 could receive the token 506 in a step 508 (case A), or the module 101 could send the token 506 in a step 508 (case B). Step 508 can comprise sending or receiving the message 508 from FIG. 5c. The key exchange token 506 could comprise a key exchange token 506 as depicted and described in connection with FIG. 5b. Or, as described for a message 508 in FIG. 5c, the key exchange token 506 could comprise the second key K 204, such as the second key K 204 encrypted by MNO 104 with a key ciphering algorithm 216 and decrypted by the module 101 with the eUICC 107 using a key deciphering algorithm 217. The key exchange token 506 at a step 508 could comprise parameters for a key derivation algorithm 503, such as a base point G if elliptic curve cryptography PKI keys are used with MNO public key 502, MNO private key 501, eUICC public key 214, and eUICC private key 215.

In another exemplary embodiment, key exchange token 506 with a Diffie Hellman key exchange for a key derivation algorithm 503 could comprise a multiplicative group of integers modulo p, where p is prime and g is primitive root mod p. Other possibilities for a key exchange token 506 in a message 508 exist as well without departing from the scope of the present invention, including the use of multiple values and numbers for a key exchange token 506. The key exchange token 506 transfer between MNO 104 and module 101 in a step 508 can use the second wireless network after the module 101 authenticates with the first key K 203, and thus the data-link layer for transfer of the key exchange token 506 could be ciphered using the first key K 203 (where a cipher key for the data-link layer is derived from the first key K 203 and a RAND 118 from a first authentication 304).

A module 101 with an eUICC 107 could then perform a step 505, which could comprise an eUICC key exchange algorithm 505 as depicted in FIG. 5c using (i) the token 506 from a message 508 above, and (ii) the eUICC private key 215 and MNO public key 502. The output from an eUICC key exchange algorithm 505 can comprise the second key K 204. In an exemplary embodiment, the second key K 204 output from the eUICC key exchange algorithm 505 is recorded within a memory of module 101 on a temporary basis. After obtaining and reading the second key K 204 from a step 505, the module 101 can conduct a second authentication 310 with the MNO 104 using the second key K 204. The second key K 204 can be associated with a second network module identity 209, which could be recorded in the profile 107c and profile 107d for the eUICC 107 from a step 403 above. Exemplary details and steps for a second authentication 310 using the second key K 204 are depicted and described in connection with FIG. 3 and FIG. 5c above.

After the conclusion of the second authentication 310, the module 101 could have access to the public Internet through the IP network 111 of the wireless network 102. After a step 310 and before a subsequent step 601 below, the module 101 could continue using the second key K 204 with the second network identity 209 in many additional repeated steps 310, such that module 101 could use the second key K 204 for an exemplary period of time such as several days or several months, and other possibilities exist as well for the continued use of a second key K 204 after a step 310 and before a step 601 in FIG. 6. For example, a module 101 could repeat a step 311 in a second authentication 310 multiple times with the same wireless network 102 using the same number of value for the second key K 204 during a period of time before a step 601.

At a step 601 in FIG. 6, a module 101 or a MNO 104 could determine if the use of a new second key K 204 is required or preferred. There could be several reasons that a different second key K 204 may be periodically preferred. Exemplary reasons include (i) the second key K 204 may only be temporarily stored within a volatile memory in CPU 101b, such that a power cycle of module 101 or CPU 101b could flush the volatile memory, and in this case module 101 and MNO 104 may need to derive a new second key K 204, (ii) ownership of module 101 may change, and business or legal contracts could stipulate that a previous second key K 204 with the prior owner of module 101 may no longer be valid and thus a new second key K 204 may be required, (iii) a MNO 104 and a module 101 or M2M service provider 102 may prefer to periodically rotate the second key K 204 in order to increase security of a system 500. For example, a module 101 may have a planned lifetime of more than a decade, and given the speed of change for mobile networking technology, a module 101 may prefer to support the change in a second key K 204 for accessing a wireless network 102 without downloading and installing a new, different profile 107d. Other possibilities exists as well for exemplary reasons why a module 101 and/or a MNO 104 could determine that the use of a new, second key K 204 is preferred or required in a step 601 without departing from the scope of the present invention. If a module 101 or MNO 104 determine a value of "no" for a step 601, then the module 101 could continue periodically performing repeated second authentication 310 steps using the same second key K 204, as illustrated in FIG. 6.

As depicted in FIG. 6, upon determination of a value of "yes" for a step 601, a module 101 could return to a step 508 and receive another key exchange token 506. As depicted in FIG. 6, the module 101 could use a first authentication 304, which could comprise an authentication with the first key K 203. A return to the first authentication 304 with the first key K 203 could be omitted in some embodiments, and thus the box for 304 depicted in FIG. 6 is a dashed line.

In this embodiment where module 101 or MNO 104 determine or evaluates that a new second key K 204 is preferred at a step 601, the module 101 could return to a step 508 by attaching with the wireless network 102 again using the first network module identity 202 and the first key K 203. For example, if the second key K 204 is not available (such as being flushed from being stored only in a volatile memory, a potential error condition such as a reset of module 101, or the second key K 204 is no longer preferred to be used), then the module 101 with the eUICC 107 could use data recorded in the profile 107d to reconnect with the wireless network 102. For example, the first key K 203 and the first network identity 202 may be recorded in generally accessible nonvolatile memory, such as, but not limited to, a flash memory 101w within module 101 and subsequently the first key K 203 and the first network identity 202 could be used in a step 304 before a return to a step 508. Or, the module 101 and MNO 104 could continue to use the previous second key K 204 (if available) for a communications link to transfer the key exchange token 506, and thus the use of a step 304 with the first key K 203 is optional.

Upon return to a step 508 module 101 and MNO 104 could transfer a key exchange token 506 as described in a step 508 in FIG. 6 above. Upon return to a step 508, the module 101 and MNO 104 could transfer a key exchange token 506 that has a different value or number from a key exchange token 506 transferred earlier (in order to support the derivation of a different second key K 204 than from a previous iteration). Using the new, different value for the key exchange token 506, the module 101 with the eUICC 107 could derive a new, different second key K 203. In this manner and by using the steps illustrated in FIG. 6, a second key K 204 could operate as a key K for "temporary use", and a different second key K 204 for use in a subsequent authentication 310 could be obtained by a repeated use of a step 505 with a new, different key exchange token 506 for module 101 connecting with the same wireless network 102.

The module 101 and MNO 104 could continue to use the same network module identity (such as a second network module identity 209) upon a return to steps 508 through 310, or the MNO 104 could also send the module 101 a new, different network module identity in a message 508 upon a return to steps 508 through 310. A MNO 104 and a module 101 can repeat the use the steps 508 through 601 depicted and described in this FIG. 6 in order to derive a series over time of second keys K 204 for the module 101 with the eUICC 107. Each member of the series (comprising a different second key K 204) could be associated with the second network module identity 209, and the second network module identity 209 could remain constant or can also change to different numbers or values for use in a step 310. Supporting a change in the second key K 204 can both increase the flexibility and security of a system 500 and related systems for a user and a mobile network operator 104.

CONCLUSION

Various exemplary embodiments have been described above. Those skilled in the art will understand, however, that changes and modifications may be made to those examples without departing from the scope of the claims.

What is claimed is:

1. A mobile device for communicating with a wireless network, the mobile device comprising:
   a first memory configured to store an embedded universal integrated circuit card (eUICC) identity;
   a random number generator operably connected to a processor connected to a second memory configured to generate a random number for an eUICC private key corresponding to an eUICC public key;
   a radio including one or more transmit antennas and one or more receiving antennas configured to:
   a. transmit, to a subscription manager, the eUICC identity and the eUICC public key; and
   b. receive, from the subscription manager, i) an eUICC profile comprising network parameters, a key K, and a subscriber identity and ii) a symmetric key; and
   an eUICC associated with the eUICC identity and configured to:
   a. derive a profile key using an elliptic curve Diffie Hellman (ECDH) key exchange with the eUICC private key and a subscription manager public key;
   b. decrypt a first portion of the eUICC profile using the profile key;
   c. receive the symmetric key from a network application operating in the mobile device;
   d. decrypt a second portion of the eUICC profile using the symmetric key, the second portion comprising the key K and the subscriber identity, wherein the first portion and the second portion are distinct; and
   e. generate a response value for authentication of the mobile device with the wireless network using the key K.

2. The mobile device of claim 1, wherein the eUICC is further configured to receive a profile identity for the eUICC profile as a plaintext.

3. The mobile device of claim 1, wherein the eUICC operates within a universal integrated circuit card within the mobile device.

4. The mobile device of claim 1, wherein the random number generator is configured to generate the random number in response to input from at least one of a clock and a sensor.

5. The mobile device of claim 1, wherein the random number generator is configured to generate the random number from a seed value, wherein the seed value comprises data from at least one of a sensor, the radio, a bus, a clock, a physical interface, the memory, and an operating system.

6. The mobile device of claim 1, wherein the network application is configured to communicate with i) the wireless network and ii) the eUICC in the mobile device using a system bus.

7. The mobile device of claim 1, wherein the eUICC comprises computer executable instructions for a processor in the mobile device, and wherein the computer executable instructions are stored within the memory.

8. The mobile device of claim 1, wherein the eUICC comprises a package soldered onto a circuit board of the mobile device.

9. The mobile device of claim 1, further comprising a user interface configured to receive user identification information before the mobile device receives the symmetric key.

10. The mobile device of claim 1, wherein the first portion of the eUICC profile includes the network parameters, the network parameters comprising a list of numbers associated with a mobile network operator.

11. The mobile device of claim 1, wherein the network parameters comprise a mobile country code (MCC) and a mobile network code (MNC) associated with the wireless network.

12. The mobile device of claim 1, wherein the radio is further configured to receive, from the subscription manager, the eUICC profile using transport layer security.

13. The mobile device of claim 1, wherein the subscriber identity comprises an International Mobile Subscriber Identity (IMSI).

14. The mobile device of claim 1, wherein the radio is further configured to receive, from the subscription manager, a ciphertext for the symmetric key, wherein the mobile device is configured to decrypt the ciphertext using at least the eUICC private key.

15. The mobile device of claim 1, wherein the mobile device further comprises at least one of a wireless handset, a cellular phone, a smartphone, a tablet computer, a laptop, a tracking device, and a circuit board with the radio.

16. The mobile device of claim 1, wherein the second memory is the same memory as the first memory.

17. The mobile device of claim 1, wherein the one or more receiving antennas are the one or more transmit antennas.

* * * * *